US011338544B2

(12) United States Patent
Young et al.

(10) Patent No.: US 11,338,544 B2
(45) Date of Patent: *May 24, 2022

(54) ABSORBENT AND RESILIENT FIBROUS STRUCTURES

(71) Applicant: The Procter & Gamble Company, Cincinnati, OH (US)

(72) Inventors: Christopher Michael Young, Loveland, CO (US); Michael Gomer Stelljes, Mason, OH (US); Michael Donald Suer, Cincinnati, OH (US); Timothy James Klawitter, North Bend, OH (US); James Roy Denbow, Mason, OH (US); Steven Lee Barnholtz, West Chester, OH (US); Jeffrey Glen Sheehan, Symmes Township, OH (US); Paul Dennis Trokhan, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/785,883

(22) Filed: Oct. 17, 2017

(65) Prior Publication Data

US 2018/0105993 A1 Apr. 19, 2018

Related U.S. Application Data

(60) Provisional application No. 62/409,202, filed on Oct. 17, 2016.

(51) Int. Cl.
*D04H 1/26* (2012.01)
*D04H 1/425* (2012.01)
(Continued)

(52) U.S. Cl.
CPC .............. *B32B 5/145* (2013.01); *B31F 1/16* (2013.01); *B32B 5/08* (2013.01); *B32B 5/26* (2013.01);
(Continued)

(58) Field of Classification Search
CPC .. D21H 27/004; D21H 27/002; D21H 27/005; D21H 27/00; D21H 27/007;
(Continued)

(56) References Cited

U.S. PATENT DOCUMENTS 4,100,324 A 7/1978 Anderson et al.
4,515,703 A 5/1985 Haq
(Continued)

FOREIGN PATENT DOCUMENTS

WO WO 2010/021572 A1 2/2010
WO 2012024460 A1 2/2012

OTHER PUBLICATIONS

Lexico, "Paper", accessed on May 6, 2020. (Year: 2020).*
(Continued)

*Primary Examiner* — Jeremy R Pierce
*Assistant Examiner* — Christine X Nisula
(74) *Attorney, Agent, or Firm* — C. Brant Cook

(57) ABSTRACT

Articles, such as sanitary tissue products, including fibrous structures, and more particularly articles including fibrous structures having a plurality of fibrous elements wherein the article exhibits differential cellulose content throughout the thickness of the article and methods for making same are provided.

12 Claims, 22 Drawing Sheets

(51) Int. Cl.

| | | |
|---|---|---|
| *D04H 1/4374* | (2012.01) | |
| *B32B 5/08* | (2006.01) | |
| *B32B 5/26* | (2006.01) | |
| *B32B 29/02* | (2006.01) | |
| *D21H 27/30* | (2006.01) | |
| *B32B 5/14* | (2006.01) | |
| *D21H 27/00* | (2006.01) | |
| *D21H 15/10* | (2006.01) | |
| *D21H 27/02* | (2006.01) | |
| *D04H 1/407* | (2012.01) | |
| *D04H 1/593* | (2012.01) | |
| *D04H 1/60* | (2006.01) | |
| *B31F 1/16* | (2006.01) | |
| *D01D 5/18* | (2006.01) | |
| *D21H 21/20* | (2006.01) | |
| *B32B 27/10* | (2006.01) | |
| *B32B 27/12* | (2006.01) | |
| *B32B 27/32* | (2006.01) | |
| *D21H 13/10* | (2006.01) | |
| *D04H 1/4218* | (2012.01) | |
| *D04H 1/4309* | (2012.01) | |
| *D04H 1/435* | (2012.01) | |
| *D04H 1/4358* | (2012.01) | |
| *B31F 1/12* | (2006.01) | |
| *D01D 5/098* | (2006.01) | |

(52) U.S. Cl.
CPC .............. *B32B 27/10* (2013.01); *B32B 27/12* (2013.01); *B32B 27/32* (2013.01); *B32B 29/02* (2013.01); *D01D 5/18* (2013.01); *D04H 1/26* (2013.01); *D04H 1/407* (2013.01); *D04H 1/425* (2013.01); *D04H 1/4374* (2013.01); *D04H 1/593* (2013.01); *D04H 1/60* (2013.01); *D21H 13/10* (2013.01); *D21H 15/10* (2013.01); *D21H 21/20* (2013.01); *D21H 27/002* (2013.01); *D21H 27/004* (2013.01); *D21H 27/005* (2013.01); *D21H 27/007* (2013.01); *D21H 27/02* (2013.01); *D21H 27/30* (2013.01); *B31F 1/126* (2013.01); *B32B 2250/20* (2013.01); *B32B 2262/0253* (2013.01); *B32B 2262/062* (2013.01); *B32B 2307/54* (2013.01); *B32B 2307/546* (2013.01); *B32B 2555/00* (2013.01); *D01D 5/0985* (2013.01); *D04H 1/4218* (2013.01); *D04H 1/435* (2013.01); *D04H 1/4309* (2013.01); *D04H 1/4358* (2013.01); *Y10T 442/693* (2015.04)

(58) Field of Classification Search
CPC ...... D21H 27/008; D21H 27/02; D21H 27/30; B32B 2307/546; B32B 29/02; B32B 27/12; B32B 27/10; B32B 5/26; B32B 5/02; B32B 9/06; B32B 21/06; B32B 29/005; B32B 2250/02; B32B 2262/067; B32B 21/04; B32B 5/22; B32B 5/022; B32B 5/36; B32B 2262/14; B32B 2250/20; B32B 2262/67; Y10T 442/684; Y10T 442/686; Y10T 442/692; Y10T 442/698; Y10T 442/664; Y10T 442/68; Y10T 442/693; Y10T 442/695; Y10T 442/697; Y10T 442/651; Y10T 442/659; D04H 1/26; D04H 1/4374; D04H 1/425; D04H 13/00
USPC ....... 442/403, 405, 411, 416, 412, 373, 385, 442/389, 413, 415
See application file for complete search history.

(56) References Cited

U.S. PATENT DOCUMENTS

| | | |
|---|---|---|
| 4,623,576 A | 11/1986 | Lloyd et al. |
| 4,637,859 A | 1/1987 | Trokhan |
| 5,455,110 A | 10/1995 | Connor |
| 5,990,377 A | 1/1999 | Chen et al. |
| 6,395,957 B1 | 5/2002 | Chen et al. |
| 6,911,573 B2 | 6/2005 | Chen et al. |
| 7,176,150 B2 | 2/2007 | Kopacz et al. |
| 7,232,794 B2 | 6/2007 | Huyhn et al. |
| 7,789,995 B2 | 9/2010 | Super et al. |
| 7,820,008 B2 | 10/2010 | Edwards et al. |
| 9,034,144 B1 | 5/2015 | Polat et al. |
| 9,296,176 B2 | 3/2016 | Escaffre et al. |
| 10,385,515 B2 | 8/2019 | Young et al. |
| 10,647,088 B2 | 5/2020 | Young et al. |
| 2002/0088592 A1 | 7/2002 | Drew et al. |
| 2003/0114071 A1 | 6/2003 | Everhart et al. |
| 2003/0135179 A1* | 7/2003 | Krautkramer ......... A61F 13/534 604/370 |
| 2003/0200991 A1 | 10/2003 | Keck et al. |
| 2003/0211802 A1 | 11/2003 | Keck et al. |
| 2004/0087237 A1* | 5/2004 | Garnier ................. D21H 27/38 442/413 |
| 2004/0111817 A1 | 6/2004 | Chen et al. |
| 2004/0186448 A1* | 9/2004 | Misek ................... A61F 13/511 604/367 |
| 2005/0129897 A1 | 6/2005 | Zhou et al. |
| 2005/0130536 A1 | 6/2005 | Siebers et al. |
| 2005/0148261 A1 | 7/2005 | Close et al. |
| 2008/0135195 A1* | 6/2008 | Hermans ............. D21H 27/002 162/135 |
| 2009/0022960 A1* | 1/2009 | Suer ....................... D04H 1/44 428/194 |
| 2009/0022983 A1 | 1/2009 | Cabell et al. |
| 2009/0054858 A1 | 2/2009 | Cheng et al. |
| 2009/0084513 A1 | 2/2009 | Barnholtz et al. |
| 2009/0218057 A1 | 3/2009 | Manifold et al. |
| 2009/0218058 A1 | 3/2009 | Manifold et al. |
| 2010/0203291 A1* | 8/2010 | Dyer ..................... D21H 21/22 428/152 |
| 2010/0326612 A1 | 12/2010 | Hupp et al. |
| 2011/0039054 A1 | 2/2011 | Cabell et al. |
| 2011/0039074 A1 | 2/2011 | Cabell et al. |
| 2011/0039469 A1 | 2/2011 | Cabell et al. |
| 2011/0104419 A1 | 5/2011 | Barnholtz et al. |
| 2011/0104444 A1 | 5/2011 | Barnholtz et al. |
| 2011/0104970 A1 | 5/2011 | Barnholtz et al. |
| 2011/0209840 A1* | 9/2011 | Barnholtz ............... D04H 1/56 162/157.2 |
| 2013/0048239 A1* | 2/2013 | Fung .................... D21H 27/005 162/116 |
| 2013/0071630 A1 | 3/2013 | Weisman |
| 2013/0071655 A1 | 3/2013 | Zwick et al. |
| 2013/0302566 A1 | 11/2013 | Barnholtz et al. |
| 2014/0050889 A1 | 2/2014 | Zwick et al. |
| 2015/0176220 A1 | 6/2015 | Ostendorf et al. |
| 2015/0314555 A1 | 11/2015 | Cabell et al. |
| 2016/0174777 A1 | 6/2016 | Wang et al. |
| 2016/0355984 A1 | 12/2016 | Barnholtz et al. |
| 2017/0282525 A1 | 10/2017 | Cabell et al. |
| 2018/0105990 A1 | 4/2018 | Young et al. |
| 2018/0105991 A1 | 4/2018 | Young et al. |
| 2018/0105992 A1 | 4/2018 | Young et al. |
| 2019/0061302 A1 | 2/2019 | Barnholtz et al. |
| 2019/0063004 A1 | 2/2019 | Barnholtz et al. |
| 2019/0338467 A1 | 11/2019 | Young et al. |
| 2020/0276786 A1 | 9/2020 | Young et al. |
| 2020/0276787 A1 | 9/2020 | Young et al. |

OTHER PUBLICATIONS

PCT International Search Report dated Dec. 8, 2017—4 pages.
PCT International Search Report dated Dec. 14, 2017—5 pages.
PCT International Search Report dated Nov. 20, 2017—4 pages.

(56) References Cited

OTHER PUBLICATIONS

PCT International Search Report for dated Dec. 6, 2017—4 pages.
PCT International Search Report dated Dec. 1, 2017—5 pages.
PCT International Search Report dated Dec. 7, 2017—4 pages.
PCT International Search Report dated Dec. 1, 2017—4 pages.
PCT International Search Report dated Dec. 6, 2017—5 pages.
U.S. Appl. No. 15/786,010, filed Oct. 17, 2017, Christopher Michael Young, et al.
U.S. Appl. No. 15/785,894, filed Oct. 17, 2017, Christopher Michael Young, et al.
U.S. Appl. No. 15/785,942, filed Oct. 17, 2017, Christopher Michael Young, et al.
U.S. Appl. No. 15/786,045, filed Oct. 17, 2017, Christopher Michael Young, et al.
U.S. Appl. No. 15/786,094, filed Oct. 17, 2017, Christopher Michael Young, et al.
U.S. Appl. No. 15/786,128, filed Oct. 17, 2017, Christopher Michael Young, et al.
U.S. Appl. No. 15/786,194, filed Oct. 17, 2017, Christopher Michael Young, et al.
All Office Actions, U.S. Appl. No. 15/786,094.
All Office Actions, U.S. Appl. No. 15/786,128.
All Office Actions, U.S. Appl. No. 15/786,194.
All Office Actions, U.S. Appl. No. 16/108,918.
All Office Actions, U.S. Appl. No. 16/108,935.
All Office Actions, U.S. Appl. No. 16/511,395.
All Office Actions; U.S. Appl. No. 15/785,942.
All Office Actions; U.S. Appl. No. 15/786,010.
All Office Actions; U.S. Appl. No. 15/785,894.
All Office Actions; U.S. Appl. No. 15/786,045.
COFORM Kimberly Clark Process, "from http://www.kcprofessional.ca/products/nonwoven-fabrics/medical-nonwovens/coform", dated Mar. 11, 2019, pp. 2.
All Office Actions, U.S. Appl. No. 16/869,998.
All Office Actions; U.S. Appl. No. 16/869,867.
All Office Actions; U.S. Appl. No. 17/329,386.
Unpublished U.S. Appl. No. 17/329,386, filed May 25, 2021, to Christopher Michael Young et al.

* cited by examiner

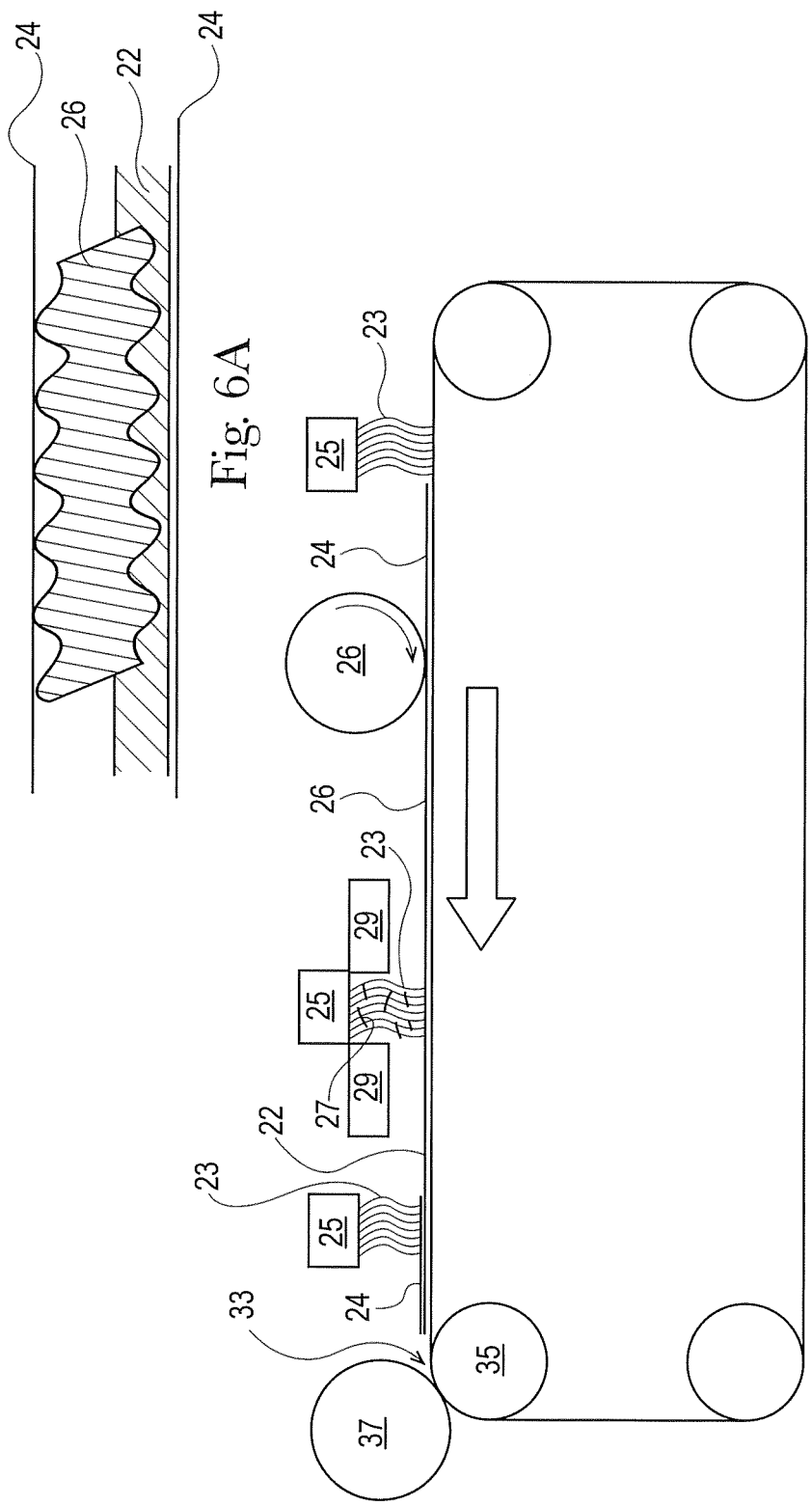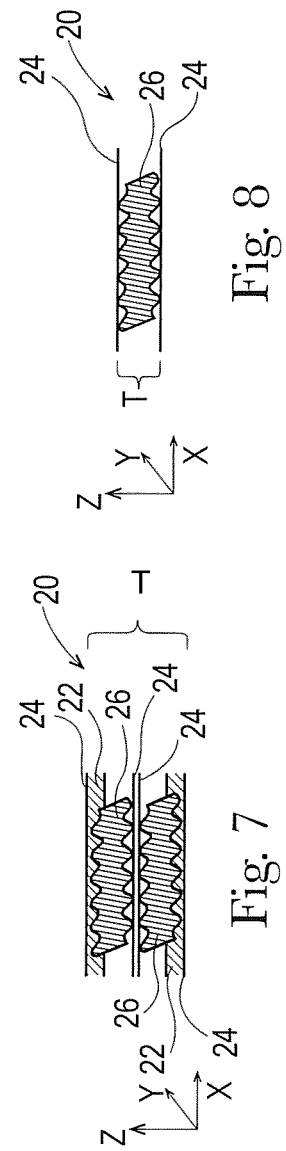

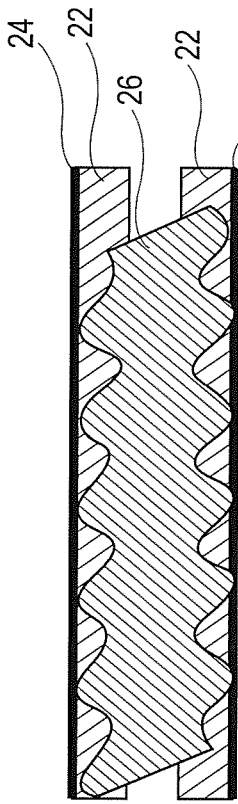
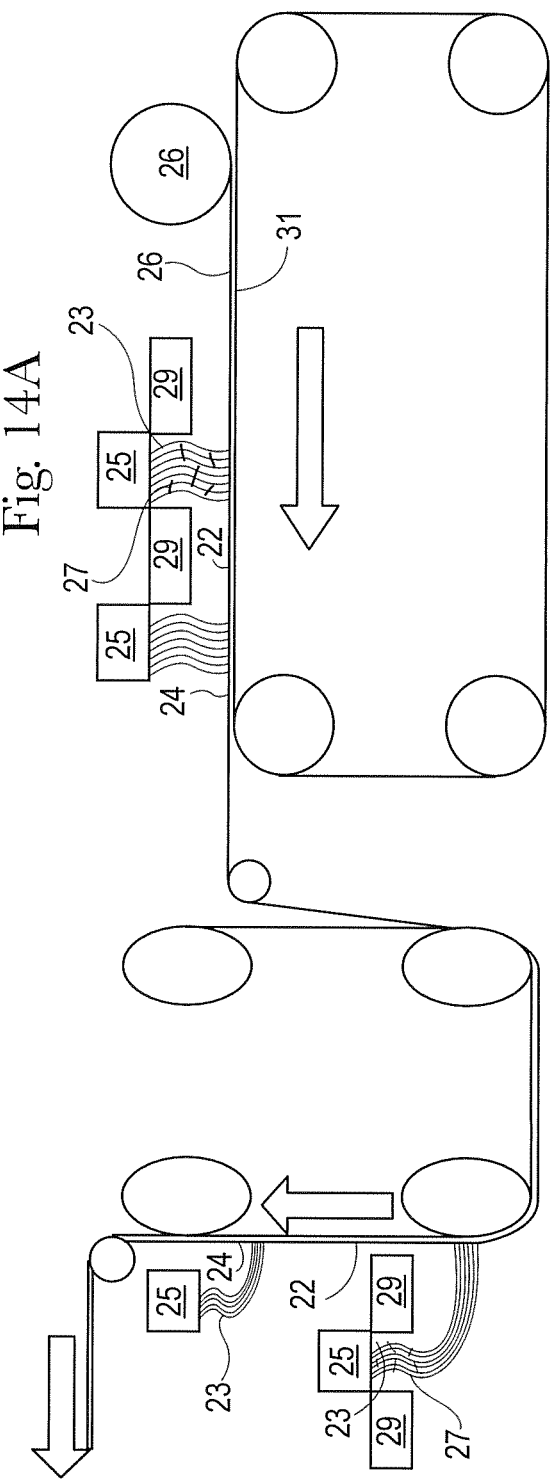
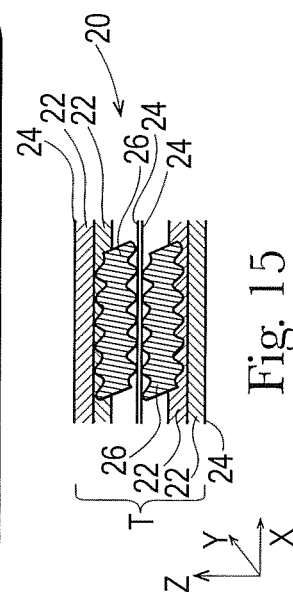
Fig. 13
Fig. 14A
Fig. 14B
Fig. 15

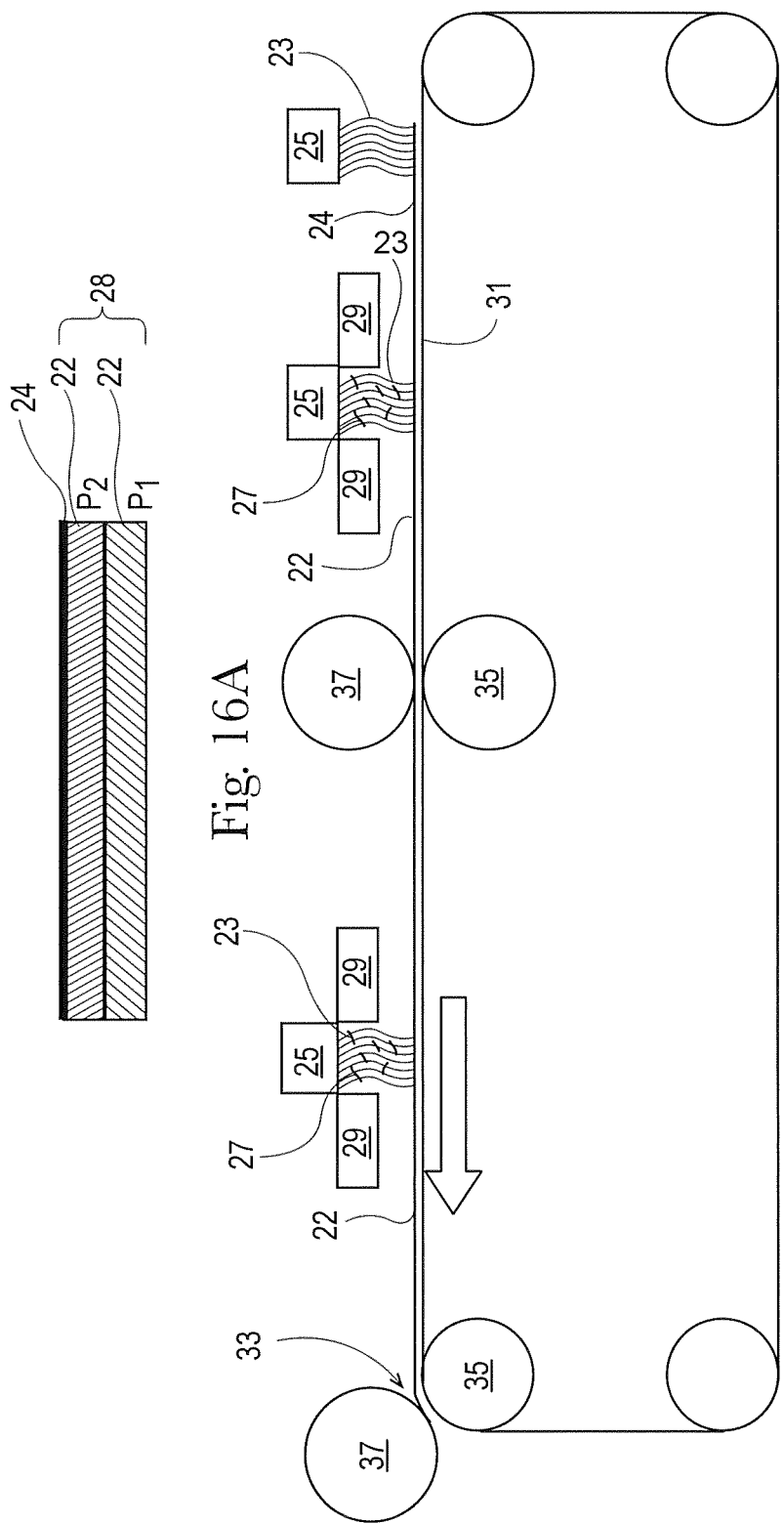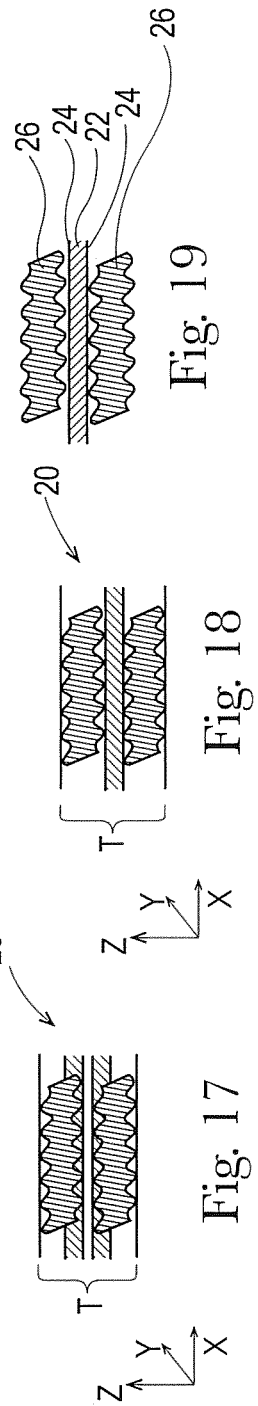

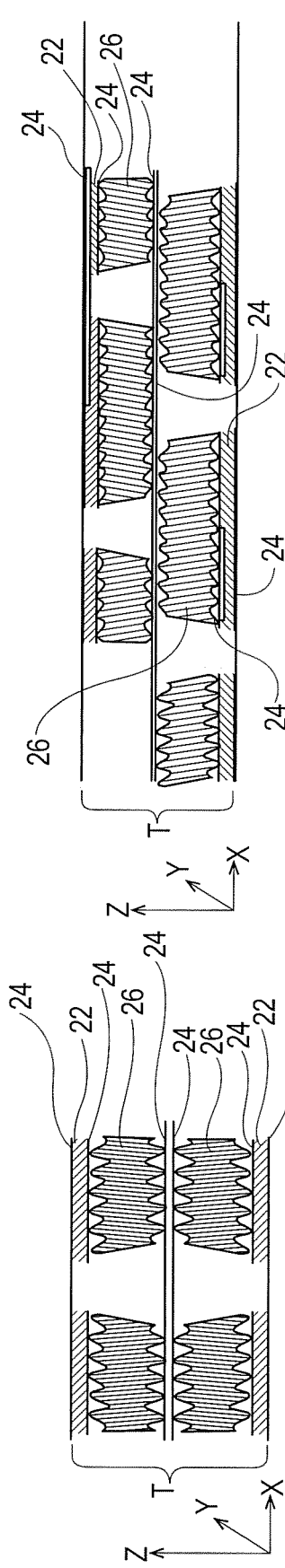
Fig. 20A
Fig. 20B
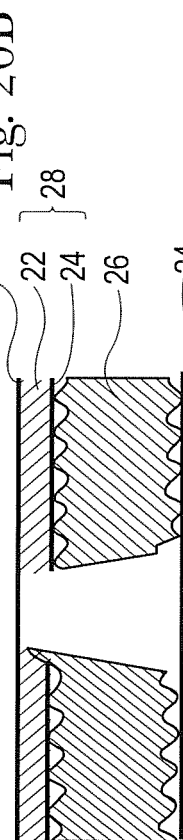
Fig. 21A
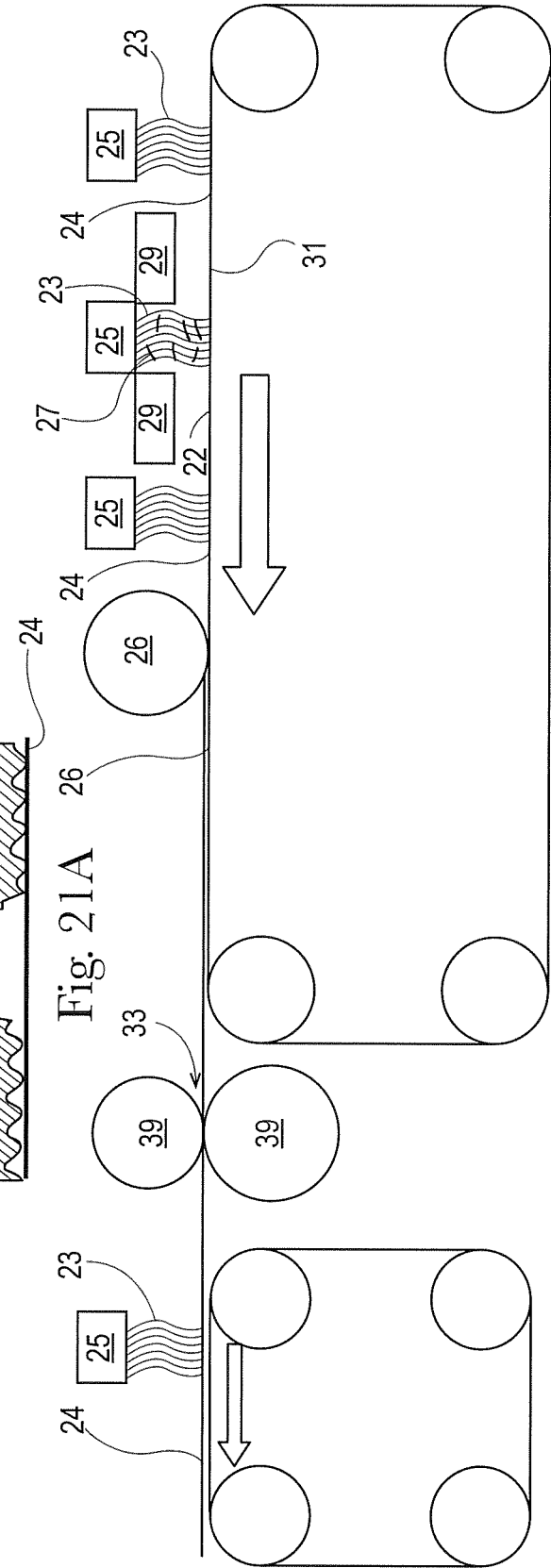
Fig. 21B

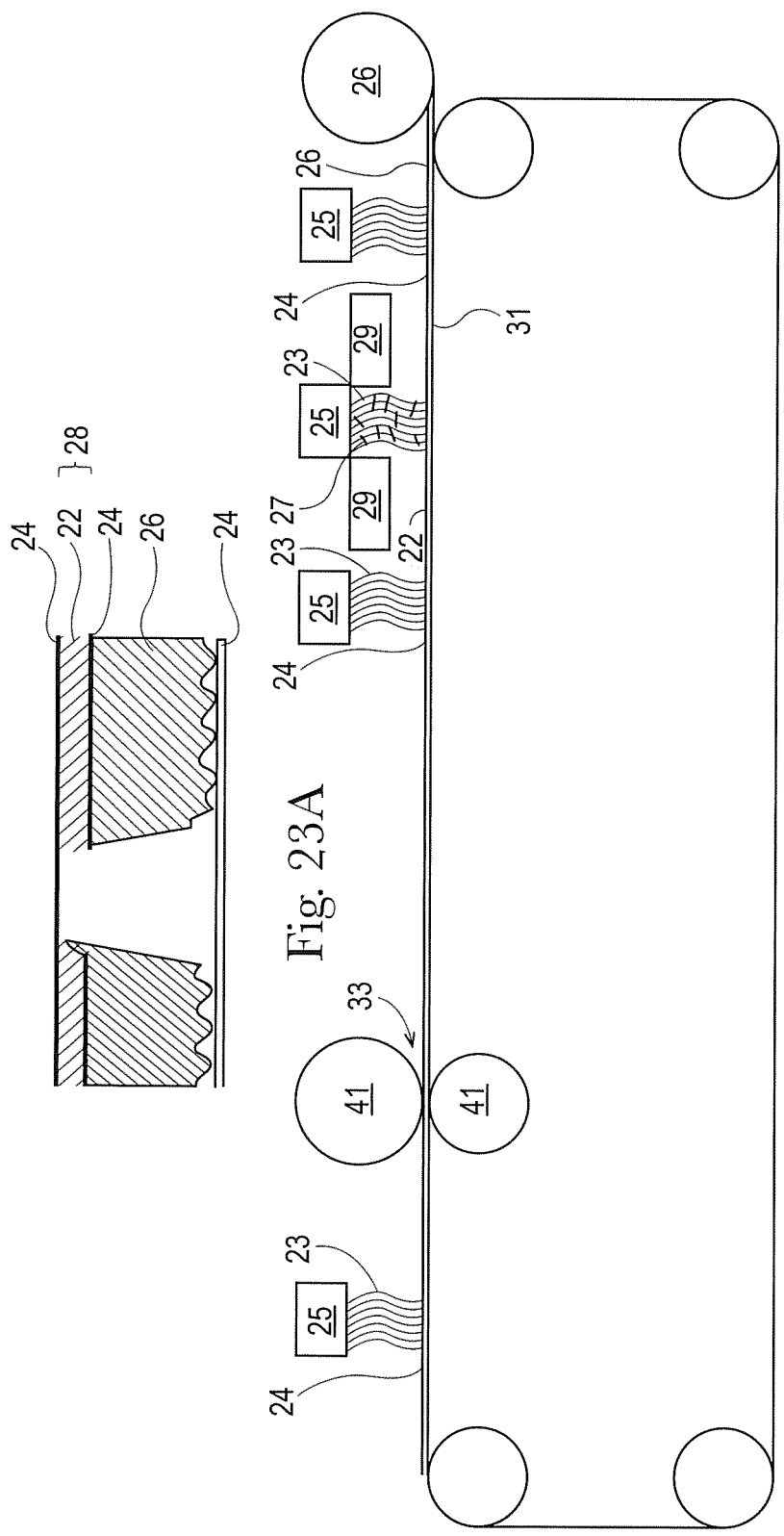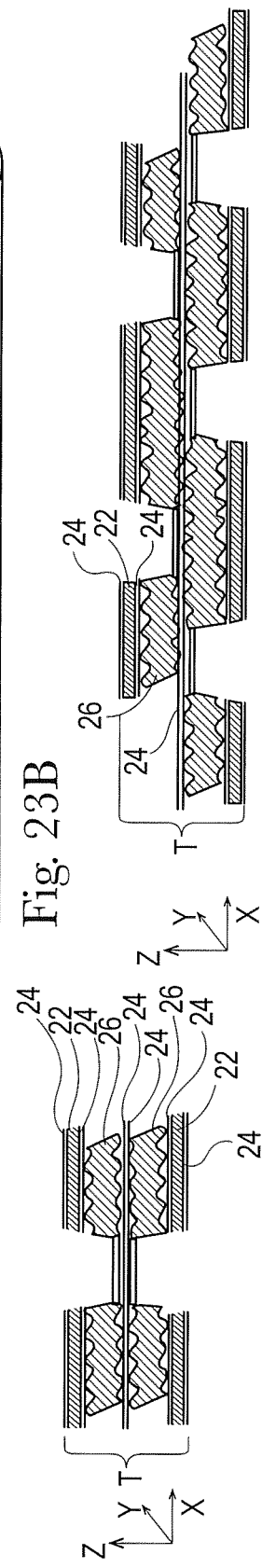

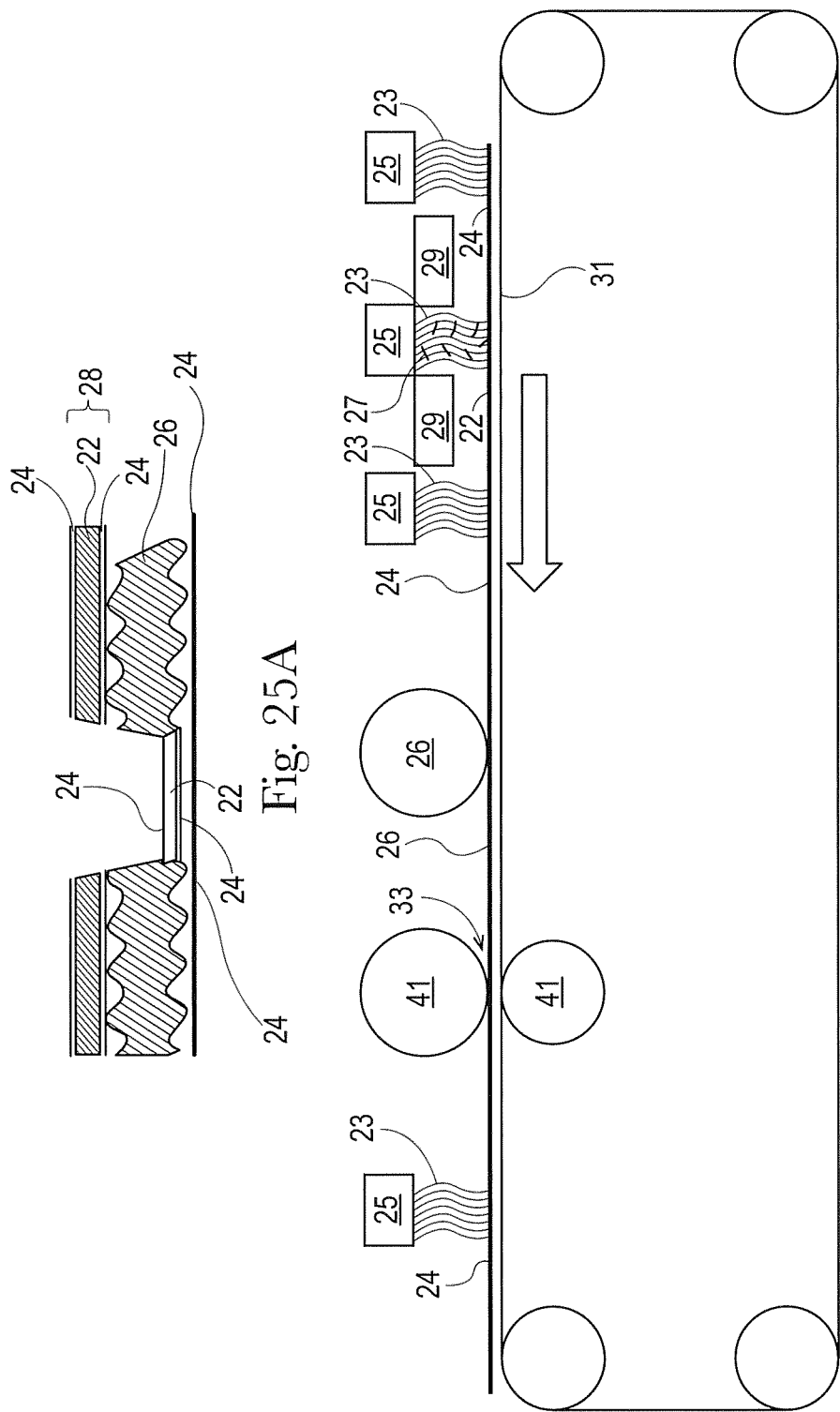

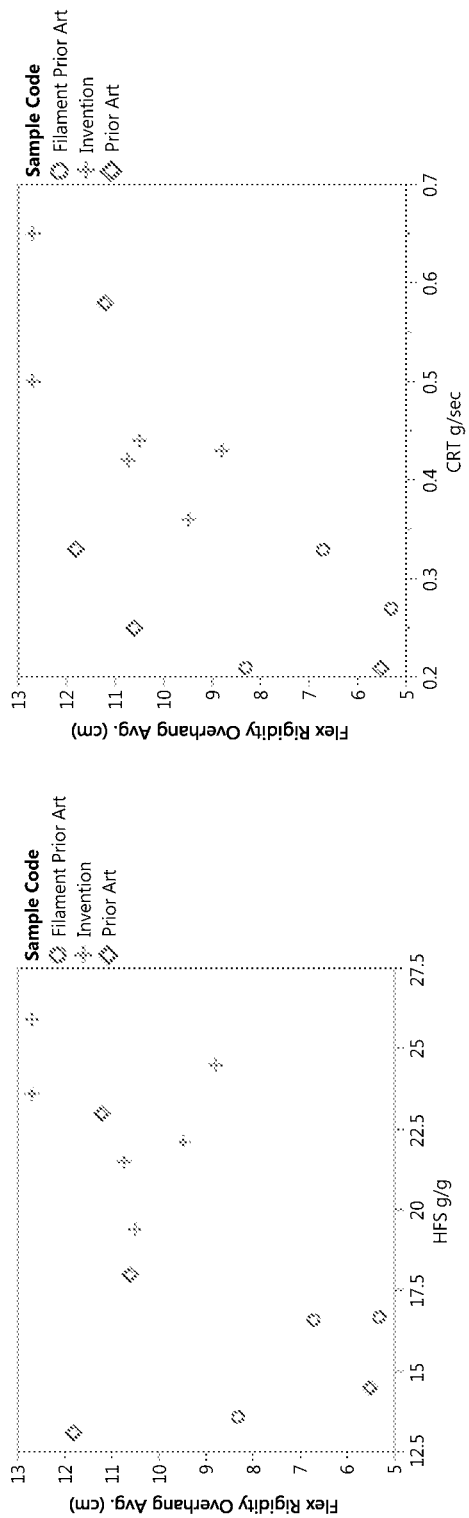
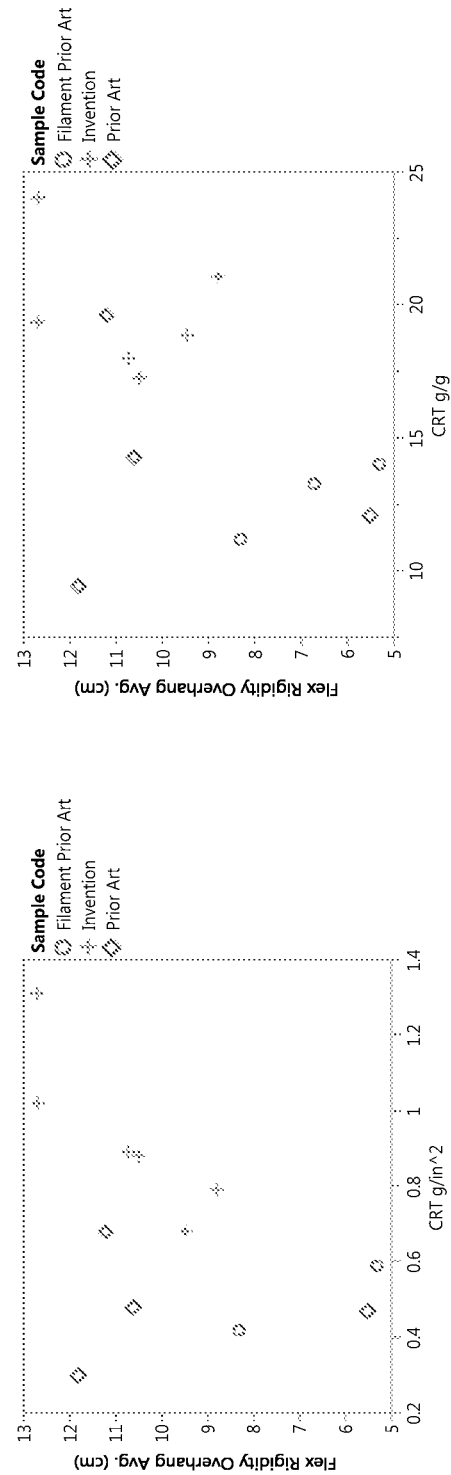
Fig. 34E
Fig. 34F
Fig. 34G
Fig. 34H

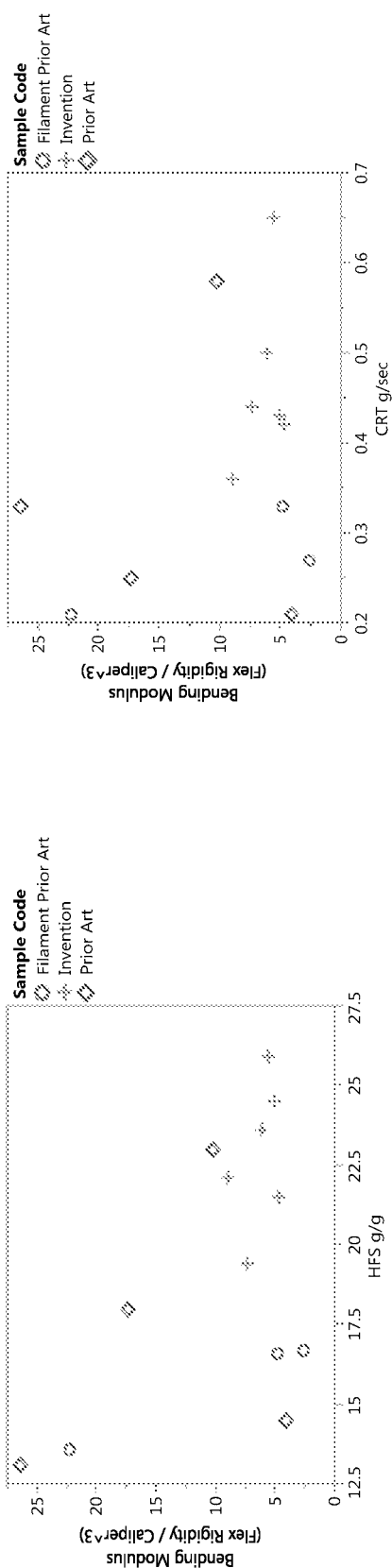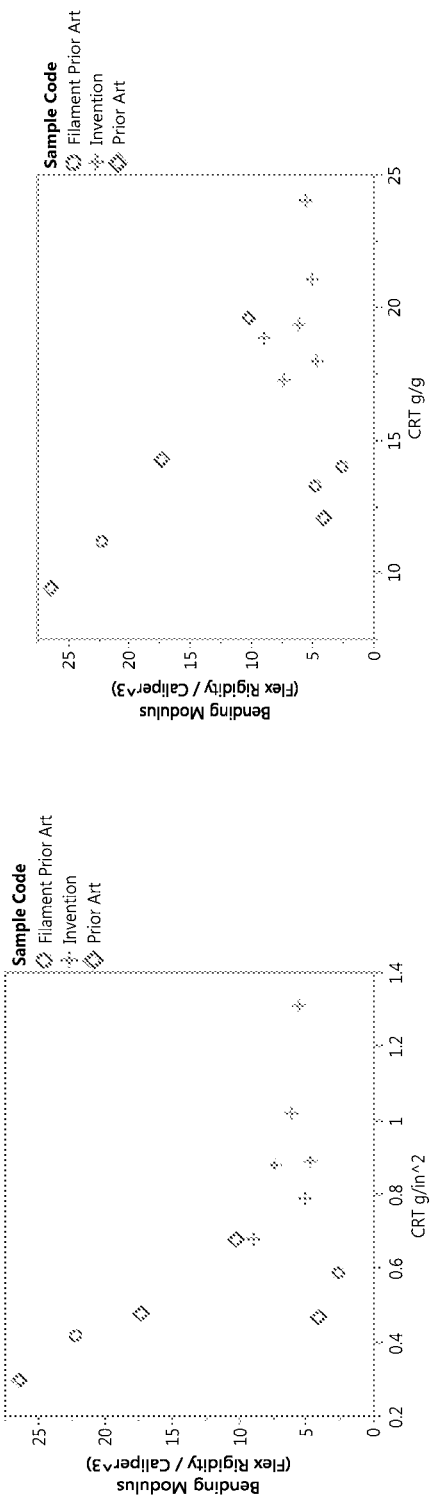
Fig. 34I
Fig. 34J
Fig. 34K
Fig. 34L

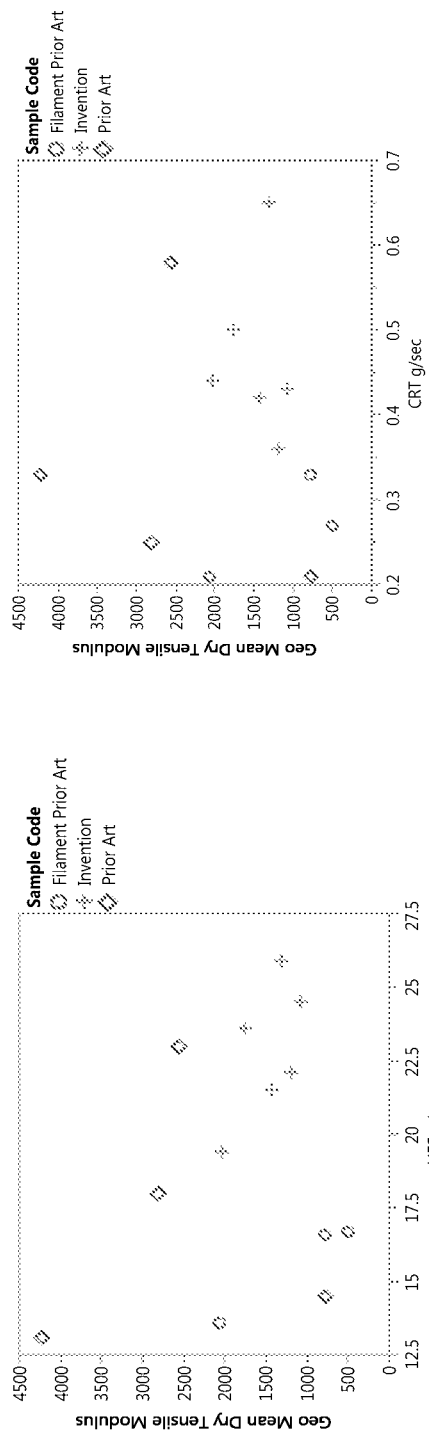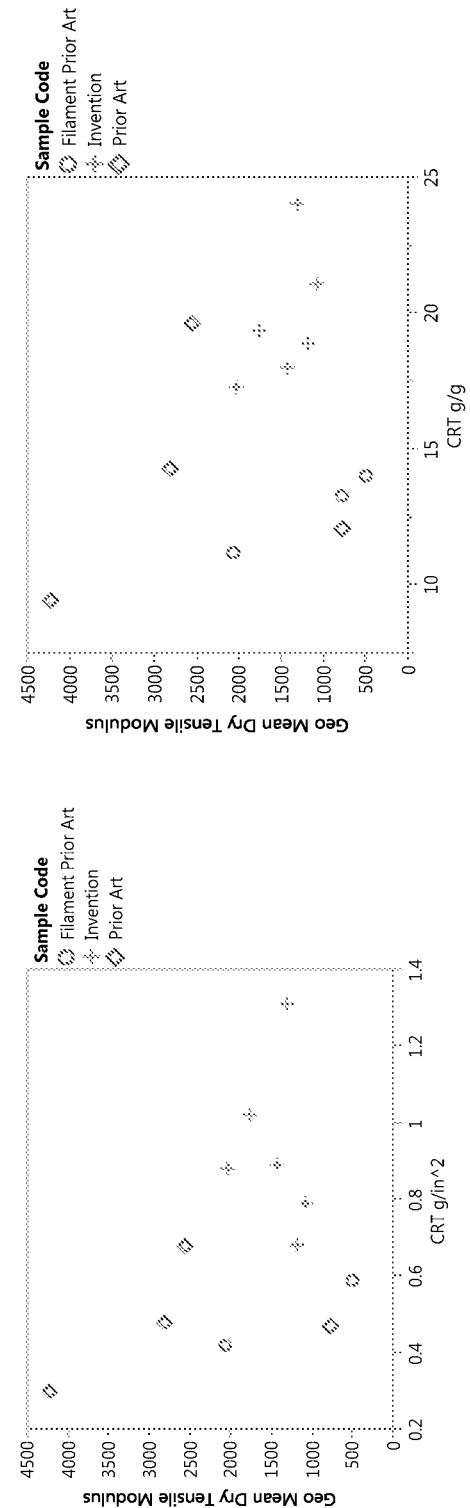
Fig. 34M
Fig. 34N
Fig. 34O
Fig. 34P

ABSORBENT AND RESILIENT FIBROUS STRUCTURES

FIELD OF THE INVENTION

The present invention relates to articles, such as sanitary tissue products, comprising fibrous structures, and more particularly to articles comprising fibrous structures comprising a plurality of fibrous elements wherein the articles exhibit improved bulk and absorbent properties compared to known articles and methods for making same.

BACKGROUND OF THE INVENTION

Consumers of articles, such as sanitary tissue products, for example paper towels, desire improved roll bulk and/or wet and/or dry sheet bulk compared to known sanitary tissue products, especially paper towels, without negatively impacting the softness and/or stiffness and/or flexibility of the sanitary tissue product. In the past, in order to achieve greater roll bulk and/or wet and/or dry sheet bulk in sanitary issue products, such as paper towels, the softness and/or stiffness and/or flexibility of the sanitary tissue products was negatively impacted.

Consumers of articles, such as sanitary tissue products, for example paper towels, desire improved absorbency compared to known sanitary tissue products, especially paper towels, without negatively impacting the softness and/or stiffness and/or flexibility of the sanitary tissue product. In the past, in order to achieve greater absorbency in sanitary issue products, such as paper towels, the softness and/or stiffness and/or flexibility of the sanitary tissue products were negatively impacted.

Consumers of articles, such as sanitary tissue products, for example paper towels, desire improved absorbency compared to known sanitary tissue products, especially paper towels, without negatively impacting the strength of the sanitary tissue product. In the past, in order to achieve greater absorbency in sanitary issue products, such as paper towels, the strength of the sanitary tissue products was negatively impacted.

Consumers of articles, such as sanitary tissue products, for example paper towels, desire improved hand protection during use compared to known sanitary tissue products, especially paper towels, without negatively impacting absorbency. In the past, in order to achieve greater hand protection in sanitary issue products, such as paper towels, the absorbency of the sanitary tissue products was negatively impacted.

Consumers of articles, such as sanitary tissue products, for example paper towels, desire improved roll bulk and/or wet and/or dry sheet bulk compared to known sanitary tissue products, especially paper towels, without negatively impacting the opacity of the sanitary tissue product. In the past, in order to achieve greater roll bulk and/or wet and/or dry sheet bulk in sanitary issue products, such as paper towels, the opacity of the sanitary tissue products was negatively impacted.

Consumers of articles, such as sanitary tissue products, for example paper towels, desire improved reopenability during use compared to known sanitary tissue products, especially paper towels, without negatively impacting absorbency. In the past, in order to achieve improved reopenability in sanitary issue products, such as paper towels, the absorbency of the sanitary tissue products was negatively impacted.

Consumers of articles, such as sanitary tissue products, for example paper towels, desire improved absorbency, especially absorbent capacity, compared to known sanitary tissue products, especially paper towels, without negatively impacting the surface drying of the sanitary tissue product. In the past, in order to achieve greater absorbency in sanitary issue products, such as paper towels, the surface drying of the sanitary tissue products was negatively impacted.

Consumers of articles, such as sanitary tissue products, for example paper towels, desire improved wet sheet bulk during use, compared to known sanitary tissue products, especially paper towels, without negatively impacting the surface drying of the sanitary tissue product. In the past, in order to achieve greater wet sheet bulk in sanitary issue products, such as paper towels, the surface drying of the sanitary tissue products was negatively impacted.

In the past, fibers, such as cellulose pulp fibers, have been used in known fibrous structures to achieve bulk and absorbency properties in articles, such as sanitary tissue products, for example paper towels, but such bulk and absorbency properties have been plagued with negatives as described above, such as softness and/or flexibility and/or stiffness negatives and/or the ability to maintain the bulk properties when wet. Examples of such known articles comprising such fibrous structures are described below.

Articles comprising fibrous structures comprising a plurality of fibrous elements, for example filaments and fibers, wherein the articles exhibit differential cellulose content throughout the thickness of the article are known. One prior art article 10 comprising a fibrous structure comprising a plurality of fibrous elements (filaments and/or fibers) as shown in Prior Art FIG. 1 comprises a meltblown or spunbond polymeric abrasive layer 12 and an absorbent layer 14, such as a paper web, for example a wet-laid fibrous structure, a coform fibrous structure, or an air-laid fibrous structure. In one example, the cellulose content throughout the thickness T (along the z-axis) of the prior art article 10 when the absorbent layer 14 is a paper web, for example a fibrous structure or air-laid fibrous structure is such that a first portion, for example the abrasive layer 12, of the prior art article 10 exhibits a cellulose content of less than 40%, for example about 0% by weight of the fibrous elements in the first portion, and a second portion of the prior art article 10, for example the absorbent layer 14; namely, the wet-laid or air-laid fibrous structure, exhibits a cellulose content of 95% to 100%, for example 100% by weight of the fibrous elements in the second portion.

In another example of Prior Art FIG. 1, the cellulose content throughout the thickness T of the prior art article 10 when the absorbent layer 14 is a coform fibrous structure is such that a first portion, for example the abrasive layer 12, of the prior art article 10 exhibits a cellulose content of less than 40%, for example about 0% by weight of the fibrous elements in the first portion, and a second portion, for example the absorbent layer 14; namely, the coform fibrous structure, exhibits a cellulose content of 40% to less than 95% by weight of the fibrous elements in the second portion.

As shown in Prior Art FIG. 1, the prior art article 10 fails to teach a cellulose content such that the cellulose content of a first portion of the prior art article 10 is from 0% to less than 40% by weight of the fibrous elements in the first portion, the cellulose content of a second portion of the prior art article 10 different from the first portion is from 40% to less than 93% by weight of the fibrous elements in the second portion, and the cellulose content of a third portion of the prior art article 10 different from the first and second portions is 93% to 100% by weight of the fibrous elements in the third portion, and wherein at least the second portion comprises a mixture of filaments and fibers.

Accordingly, there is a need for articles comprising fibrous structures that exhibit novel differential cellulose content that results in the articles exhibiting improved bulk and/or absorbent properties that are consumer acceptable that maintain sufficient such bulk properties when wet during use by consumers and/or without negatively impacting and/or improving the softness and/or flexibility and/or stiffness of such articles and methods for making same.

SUMMARY OF THE INVENTION

The present invention fulfills the need described above by providing articles comprising fibrous structures that exhibit novel cellulose contents such that the articles exhibit improved bulk and/or absorbent properties that are consumer acceptable while still maintaining such bulk properties when wet and/or without negatively impacting and/or improving the softness and/or flexibility and/or stiffness of such articles and methods for making same.

One solution to the problem identified above are articles, such as sanitary tissue products, for example paper towels, that comprise fibrous structures that utilize a plurality of fibrous elements, such as filaments and/or fibers, arranged within the articles such that the articles exhibit cellulose contents, such as within the fibrous elements, for example as cellulose pulp fibers (e.g., wood pulp fibers), that vary throughout the thickness of the articles containing such fibrous structure such that the cellulose content of a first portion of an article is from 0% to less than 40% by weight of the fibrous elements in the first portion (which by default herein means the remainder of fibrous elements present within the first portion do not contain cellulose, for example contain a synthetic polymer, such as a thermoplastic polymer like polypropylene), the cellulose content of a second portion of the article different from the first portion is from 40% to less than 95% by weight of the fibrous elements in the second portion, and the cellulose content of a third portion of the article different from the first and second portions is 95% to 100% by weight of the fibrous elements in the third portion, and wherein at least the second portion comprises a mixture of filaments and fibers. Such an arrangement of cellulose content within the article as described above results in the article exhibiting improved bulk and/or absorbency compared to known fibrous structures while still maintaining or at least maintaining more of the bulk properties when wet compared to known properties and/or without negatively impacting and/or improving the softness and/or flexibility and/or stiffness properties of the article compared to known articles comprising fibrous structures.

It has unexpectedly been found that the arrangement of the fibrous structures and/or fibrous webs (fibrous web plies) within the articles of the present invention and/or type of fibrous structures and/or type of fibrous elements, for example filaments and/or fibers, within the articles of the present invention result in the article of the present invention exhibiting novel properties, such as bulk and/or absorbent properties without negatively impacting the softness and/or flexibility and/or stiffness of the articles.

In one example of the present invention, an article comprising a plurality of fibers, wherein the article exhibits a. a Low Load Wet Resiliency of greater than 0.95 and/or greater than 0.96 and/or greater than 0.100 and/or greater than 0.105 and/or greater than 0.110 and/or greater than 0.114 and/or greater than 0.118 and/or greater than 0.120 as measured according to Wet and Dry Compressive Modulus Test Methods; and b. one or more softness properties selected from the group consisting of:

i. a Bending Modulus of less than 10.00 and/or less than 9.50 and/or less than 9.00 and/or less than 8.50 and/or less than 7.50 and/or less than 6.75 and/or less than 6.25 and/or less than 5.75 and/or less than 5.25 and/or less than 4.75 (mg*cm)/mils$^3$ as measured according to the Flexural Rigidity and Bending Modulus Test Method; and ii. a TS7 Value of less than 17.0 and/or less than 15.50 and/or less than 15.00 and/or less than 14.50 and/or less than 14.00 and/or less than 13.50 and/or less than 13.00 and/or less than 12.50 and/or less than 12.00 and/or less than 11.50 and/or less than 11.00 and/or less than 10.50 as measured according to the Emtec Test Method, is provided.

The present invention provides novel articles comprising fibrous structures comprising fibrous elements that result in the articles exhibiting novel bulk and/or absorbent properties as a result of the articles exhibiting a novel cellulose content, and methods for making same.

BRIEF DESCRIPTION OF THE DRAWINGS

FIG. 6A is a cross-sectional representation of another example of a fibrous web according to the present invention;

FIG. 6B is an example of a process for making the fibrous web of FIG. 6A;

FIG. 7 is a cross-sectional representation of another example of an article according to the present invention;

FIG. 8 is a cross-sectional representation of another example of an article according to the present invention;

FIG. 13 is a cross-sectional representation of another example of an article according to the present invention;

FIG. 14A is a cross-sectional representation of another example of an article according to the present invention;

FIG. 14B is an example of a process for making the article of FIG. 14A;

FIG. 15 is a cross-sectional representation of another example of an article according to the present invention;

FIG. 16A is a cross-sectional representation of another example of an article according to the present invention;

FIG. 16B is an example of a process for making the article of FIG. 16A;

FIG. 17 is a cross-sectional representation of another example of an article according to the present invention;

FIG. 18 is a cross-sectional representation of another example of an article according to the present invention;

FIG. 19 is a cross-sectional representation of another example of an article according to the present invention;

FIG. 20A is a cross-sectional representation of another example of an article according to the present invention;

FIG. 20B is a cross-sectional representation of another example of an article according to the present invention;

FIG. 21A is a cross-sectional representation of another example of a fibrous web according to the present invention suitable for use in the article of FIGS. 20A and 20B;

FIG. 21B is an example of a process for making the fibrous web of FIG. 21A;

FIG. 23A is a cross-sectional representation of another example of a fibrous web according to the present invention suitable for use in the article of FIGS. 22A and 22B;

FIG. 23B is an example of a process for making the fibrous web of FIG. 23A;

FIG. 24A is a cross-sectional representation of another example of an article according to the present invention;

FIG. 24B is a cross-sectional representation of another example of an article according to the present invention;

FIG. 25A is a cross-sectional representation of another example of a fibrous web according to the present invention suitable for use in the article of FIGS. 24A and 24B;

FIG. 25B is an example of a process for making the fibrous web of FIG. 25A;

DETAILED DESCRIPTION OF THE INVENTION

Figure 1:
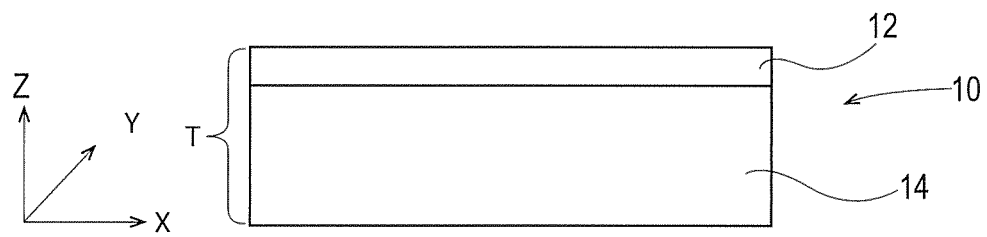
FIG. 1 is a cross-sectional representation of an example of a prior art article.

"Article" as used herein means a consumer-usable structure comprising one or more and/or two or more and/or three or more and/or four or more fibrous webs according to the present invention. In one example the article is a dry article. In addition, the article may be a sanitary tissue product. The article may comprise two or more and/or three or more different fibrous webs selected from the group consisting of: wet-laid fibrous webs, air-laid fibrous webs, co-formed fibrous web, meltblown fibrous web, and spunbond fibrous web. In one example, the article is void of a hydroentangled fibrous web and/or is not a hydroentangled fibrous web. In another example, the article is void of a carded fibrous web and/or is not a carded fibrous web. In addition to the fibrous webs, the articles of the present invention may comprise other solid matter, such as sponges, foams, particle, such as absorbent gel materials, and mixtures thereof.

In one example, two or more fibrous webs (fibrous web plies) of the present invention may be associated together to form the article.

In one example, the article of the present invention comprises one or more co-formed fibrous webs (co-formed fibrous web plies). In addition to the co-formed fibrous web, the article may further comprise one or more wet-laid fibrous webs (wet-laid fibrous web plies). Also in addition to the co-formed fibrous web (co-formed fibrous web ply) with or without one or more wet-laid fibrous webs (wet-laid fibrous web plies), the article may further comprise one or more meltblown fibrous webs (meltblown fibrous web plies).

In another example, the article of the present invention may comprise one or more multi-fibrous element fibrous webs (e.g., a fibrous structure comprising a mixture of filaments and fibers), such as a co-formed fibrous web, and one or more mono-fibrous element fibrous webs (e.g., a fibrous structure comprising only fibers or only filaments, not a mixture of fibers and filaments), such as a paper web, for example a fibrous web and/or a meltblown fibrous web.

In one example, at least a portion of the article exhibits a basis weight of about 150 gsm or less and/or about 100 gsm or less and/or from about 30 gsm to about 95 gsm.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). Non-limiting examples of suitable sanitary tissue products of the present invention include paper towels, bath tissue, facial tissue, napkins, baby wipes, adult wipes, wet wipes, cleaning wipes, polishing wipes, cosmetic wipes, car care wipes, wipes that comprise an active agent for performing a particular function, cleaning substrates for use with implements, such as a Swiffer® cleaning wipe/pad. The sanitary tissue product may be convolutedly wound upon itself about a core or without a core to form a sanitary tissue product roll.

The sanitary tissue products of the present invention may exhibit a basis weight between about 10 g/m$^2$ to about 500 g/m$^2$ and/or from about 15 g/m$^2$ to about 400 g/m$^2$ and/or from about 20 g/m$^2$ to about 300 g/m$^2$ and/or from about 20 g/m$^2$ to about 200 g/m$^2$ and/or from about 20 g/m$^2$ to about 150 g/m$^2$ and/or from about 20 g/m$^2$ to about 120 g/m$^2$ and/or from about 20 g/m$^2$ to about 110 g/m$^2$ and/or from about 20 g/m$^2$ to about 100 g/m$^2$ and/or from about 30 to 90 g/m$^2$. In addition, the sanitary tissue product of the present invention may exhibit a basis weight between about 40 g/m$^2$ to about 500 g/m$^2$ and/or from about 50 g/m$^2$ to about 400 g/m$^2$ and/or from about 55 g/m$^2$ to about 300 g/m$^2$ and/or from about 60 to 200 g/m$^2$. In one example, the sanitary tissue product exhibits a basis weight of less than 100 g/m$^2$ and/or less than 80 g/m² and/or less than 75 g/m² and/or less than 70 g/m² and/or less than 65 g/m² and/or less than 60 g/m² and/or less than 55 g/m² and/or less than 50 g/m² and/or less than 47 g/m² and/or less than 45 g/m² and/or less than 40 g/m² and/or less than 35 g/m² and/or to greater than 20 g/m² and/or greater than 25 g/m² and/or greater than 30 g/m² as measured according to the Basis Weight Test Method described herein.

The sanitary tissue products of the present invention may exhibit a density (measured at 95 g/in²) of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

The sanitary tissue products of the present invention may comprises additives such as softening agents, temporary wet strength agents, permanent wet strength agents, bulk softening agents, silicones, wetting agents, latexes, especially surface-pattern-applied latexes, dry strength agents such as carboxymethylcellulose and starch, and other types of additives suitable for inclusion in and/or on sanitary tissue products.

"Fibrous web" as used herein means a unitary structure comprising one or more fibrous structures that are associated with one another, such as by compression bonding (for example by passing through a nip formed by two rollers), thermal bonding (for example by passing through a nip formed by two rollers where at least one of the rollers is heated to a temperature of at least about 120° C. (250° F.), microselfing, needle punching, and gear rolling, to form the unitary structure, for example a unitary structure that exhibits sufficient integrity to be processed with web handling equipment and/or exhibits a basis weight of at least 6 gsm and/or at least 8 gsm and/or at least 10 gsm and/or at least 15 gsm and/or at least 20 gsm and/or at least 30 gsm and/or at least 40 gsm. The unitary structure may also be referred to as a ply, a fibrous web ply.

"Fibrous structure" as used herein means a structure that comprises a plurality of fibrous elements, for example a plurality of filaments and/or a plurality of fibers, for example pulp fibers, for example wood pulp fibers, and/or cellulose fibrous elements and/or cellulose fibers, such as pulp fibers, for example wood pulp fibers. In addition to the fibrous elements, the fibrous structures may comprise particles, such as absorbent gel material particles. In one example, a fibrous structure according to the present invention means an orderly arrangement of fibrous elements within a structure in order to perform a function. In another example, a fibrous structure according to the present invention is a nonwoven. In one example, the fibrous structures of the present invention may comprise wet-laid fibrous structures, for example embossed conventional wet pressed fibrous structures, through-air-dried (TAD) fibrous structures both creped and/or uncreped, belt-creped fibrous structures, fabric-creped fibrous structures, and combinations thereof, air-laid fibrous structures, such as thermally-bonded air-laid (TBAL) fibrous structures, melt-bonded air-laid (MBAL), latex-bonded air-laid (LBAL) fibrous structures and combinations thereof, co-formed fibrous structures, meltblown fibrous structures, and spunbond fibrous structures, carded fibrous structures, and combinations thereof. In one example, the fibrous structure is a non-hydroentangled fibrous structure. In another example, the fibrous structure is a non-carded fibrous structure.

In another example of the present invention, a fibrous structure comprises a plurality of inter-entangled fibrous elements, for example inter-entangled filaments.

Non-limiting examples of fibrous structures and/or fibrous webs (fibrous web plies) of the present invention include paper.

The fibrous structures of the present invention may be homogeneous or may be layered. If layered, the fibrous structures may comprise at least two and/or at least three and/or at least four and/or at least five layers.

Any one of the fibrous structures may itself be a fibrous web (fibrous web ply) if the fibrous structure exhibits sufficient integrity to be processed with web handling equipment and/or exhibits a basis weight of at least 6 gsm and/or at least 8 gsm and/or at least 10 gsm and/or at least 15 gsm and/or at least 20 gsm and/or at least 30 gsm and/or at least 40 gsm. An example of such a fibrous structure, for example a paper web, for example a fibrous structure exhibiting a basis weight of at least 10 gsm and/or at least 15 gsm and/or at least 20 gsm can be a fibrous web (fibrous web ply) itself.

Non-limiting examples of processes for making the fibrous structures of the present invention include known wet-laid papermaking processes, for example conventional wet-pressed (CWP) papermaking processes and through-air-dried (TAD), both creped TAD and uncreped TAD, papermaking processes, and air-laid papermaking processes. Such processes typically include steps of preparing a fiber composition in the form of a fiber suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of the fibers onto a forming wire, fabric, or belt such that an embryonic web material is formed, after which drying and/or bonding the fibers together results in a fibrous structure and/or fibrous web (fibrous web ply). Further processing of the fibrous structure and/or fibrous web (fibrous web ply) may be carried out such that a fibrous structure and/or fibrous web (fibrous web ply) is formed. For example, in typical papermaking processes, the fibrous structure and/or fibrous web (fibrous web ply) is wound on the reel at the end of papermaking, often referred to as a parent roll, and may subsequently be converted into a fibrous web (fibrous web ply) of the present invention and/or ultimately incorporated into an article, such as a single- or multi-ply sanitary tissue product.

"Multi-fibrous element fibrous structure" as used herein means a fibrous structure that comprises filaments and fibers, for example a co-formed fibrous structure is a multi-fibrous element fibrous structure.

"Mono-fibrous element fibrous structure" as used herein means a fibrous structure that comprises only fibers or filaments, for example a paper web, such as a paper web, for example a fibrous structure, or meltblown fibrous structure, such as a scrim, respectively, not a mixture of fibers and filaments.

"Co-formed fibrous structure" as used herein means that the fibrous structure comprises a mixture of filaments, for example meltblown filaments, such as thermoplastic filaments, for example polypropylene filaments, and fibers, such as pulp fibers, for example wood pulp fibers. The filaments and fibers are commingled together to form the co-formed fibrous structure. The co-formed fibrous structure may be associated with one or more meltblown fibrous structures and/or spunbond fibrous structures, which form a scrim (in one example the scrim may be present at a basis weight of greater than 0.5 gsm to about 5 gsm and/or from about 1 gsm to about 4 gsm and/or from about 1 gsm to about 3 gsm and/or from about 1.5 gsm to about 2.5 gsm), such as on one or more surfaces of the co-formed fibrous structure.

Figure 2A:
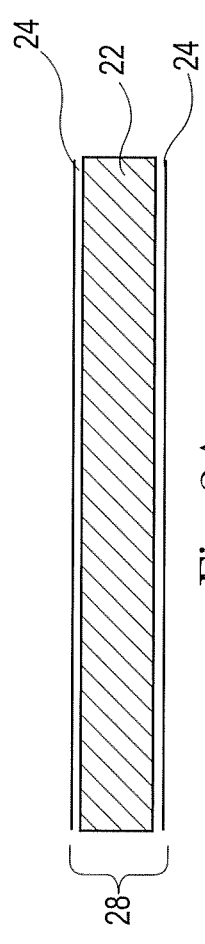
FIG. 2A is a cross-sectional representation of an example of a co-formed fibrous web according to the present invention.
Figure 2B:
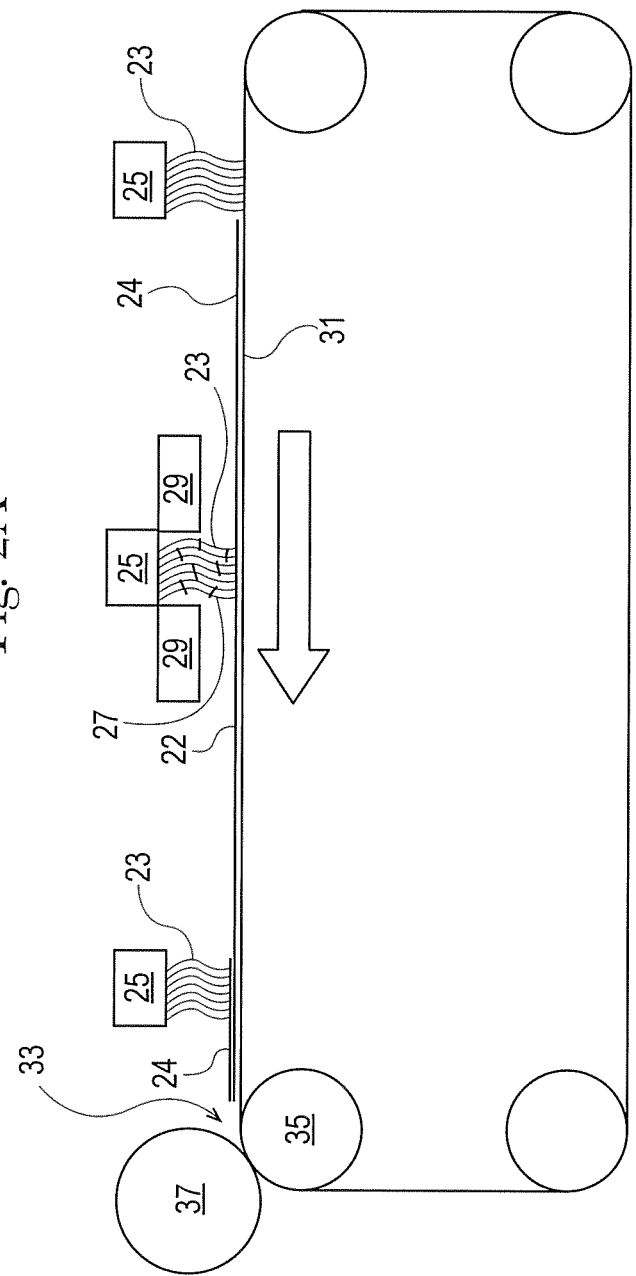
FIG. 2B is an example of a process for making the co-formed fibrous web of FIG. 2A.

The co-formed fibrous structure of the present invention may be made via a co-forming process. A non-limiting example of making a co-formed fibrous structure and/or co-formed fibrous web (co-formed fibrous web ply) comprising a co-formed fibrous structure associated with or without a meltblown fibrous structure, for example a scrim layer of filaments, on one or both surfaces, when present, of the co-formed fibrous structure and process for making is shown in FIGS. 2A and 2B.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

The filaments may be made via spinning, for example via meltblowing and/or spunbonding, from a polymer, for example a thermoplastic polymer, such as polyolefin, for example polypropylene and/or polyethylene, and/or polyester. Filaments are typically considered continuous or substantially continuous in nature.

"Meltblowing" is a process for producing filaments directly from polymers or resins using high-velocity air or another appropriate force to attenuate the filaments before collecting the filaments on a collection device, such as a belt, for example a patterned belt or molding member. In a meltblowing process the attenuation force is applied in the form of high speed air as the material (polymer) exits a die or spinnerette.

"Spunbonding" is a process for producing filaments directly from polymers by allowing the polymer to exit a die or spinnerette and drop a predetermined distance under the forces of flow and gravity and then applying a force via high velocity air or another appropriate source to draw and/or attenuate the polymer into a filament.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, lyocell, glass fibers and polyvinyl alcohol fibers.

Staple fibers may be produced by spinning a filament tow and then cutting the tow into segments of less than 5.08 cm (2 in.) thus producing fibers; namely, staple fibers.

"Pulp fibers" as used herein means fibers that have been derived from vegetative sources, such as plants and/or trees. In one example of the present invention, "pulp fiber" refers to papermaking fibers. In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: eucalyptus fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, rice straw, wheat straw, bamboo, and bagasse fibers can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristle-like outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Basis Weight" as used herein is the weight per unit area of a sample reported in lbs/3000 ft$^2$ or g/m$^2$ (gsm) and is measured according to the Basis Weight Test Method described herein.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Embossed" as used herein with respect to an article, sanitary tissue product, and/or fibrous web (fibrous web ply), means that an article, sanitary tissue product, and/or fibrous web (fibrous web ply) has been subjected to a process which converts a smooth surfaced article, sanitary tissue product, and/or fibrous web (fibrous web ply) to a out-of-plane, textured surface by replicating a pattern on one or more emboss rolls, which form a nip through which the article, sanitary tissue product and/or fibrous web (fibrous web ply) passes. Embossed does not include creping, microcreping, printing or other processes that may also impart a texture and/or decorative pattern to an article, sanitary tissue product and/or fibrous web (fibrous web ply).

"Differential density", as used herein, means a fibrous structure and/or fibrous web (fibrous web ply) that comprises one or more regions of relatively low fibrous element, for example fiber, density, which are referred to as pillow regions, and one or more regions of relatively high fibrous element, for example fiber, density, which are referred to as knuckle regions.

"Densified", as used herein means a portion of a fibrous structure and/or fibrous web (fibrous web ply) that is characterized by regions of relatively high fibrous element, e.g., fiber, density (knuckle regions).

"Non-densified", as used herein, means a portion of a fibrous structure and/or fibrous web (fibrous web ply) that exhibits a lesser fibrous element, e.g., fiber, density (one or more regions of relatively lower fibrous element, e.g., fiber, density) (pillow regions) than another portion (for example a knuckle region) of the fibrous structure and/or fibrous web (fibrous web ply).

"Wet textured" as used herein means that a three-dimensional (3D) patterned fibrous structure and/or 3D patterned fibrous web (3D patterned fibrous web ply) comprises texture (for example a three-dimensional topography) imparted to the fibrous structure and/or fibrous structure's surface and/or fibrous web's surface (fibrous web ply's surface) during a fibrous structure making process. In one example, in a paper web, for example a fibrous structure making process, wet texture may be imparted to a fibrous structure upon fibers and/or filaments being collected on a collection device that has a three-dimensional (3D) surface which imparts a 3D surface to the fibrous structure being formed thereon and/or being transferred to a fabric and/or belt, such as a through-air-drying fabric and/or a patterned drying belt, comprising a 3D surface that imparts a 3D surface to a fibrous structure being formed thereon. In one example, the collection device with a 3D surface comprises a patterned, such as a patterned formed by a polymer or resin being deposited onto a base substrate, such as a fabric, in a patterned configuration. The wet texture imparted to a paper web, for example a fibrous structure is formed in the fibrous structure prior to and/or during drying of the fibrous structure. Non-limiting examples of collection devices and/or fabric and/or belts suitable for imparting wet texture to a fibrous structure include those fabrics and/or belts used in fabric creping and/or belt creping processes, for example as disclosed in U.S. Pat. Nos. 7,820,008 and 7,789,995, coarse through-air-drying fabrics as used in uncreped through-air-drying processes, and photo-curable resin patterned through-air-drying belts, for example as disclosed in U.S. Pat. No. 4,637,859. For purposes of the present invention, the collection devices used for imparting wet texture to the fibrous structures would be patterned to result in the fibrous structures comprising a surface pattern comprising a plurality of parallel line elements wherein at least one, two, three, or more, for example all of the parallel line elements exhibit a non-constant width along the length of the parallel line elements. This is different from non-wet texture that is imparted to a fibrous structure after the fibrous structure has been dried, for example after the moisture level of the fibrous structure is less than 15% and/or less than 10% and/or less than 5%. An example of non-wet texture includes embossments imparted to a fibrous structure and/or fibrous web (fibrous web ply) by embossing rolls during converting of the fibrous structure and/or fibrous web (fibrous web ply). In one example, the fibrous structure and/or fibrous web (fibrous web ply), for example a paper web, for example a fibrous structure and/or wet-laid fibrous web (wet-laid fibrous web ply), is a wet textured fibrous structure and/or wet textured fibrous web (wet textured fibrous web ply).

"3D pattern" with respect to a fibrous structure and/or fibrous web's surface (fibrous web ply's surface) in accordance with the present invention means herein a pattern that is present on at least one surface of the fibrous structure and/or fibrous web (fibrous web ply). The 3D pattern texturizes the surface of the fibrous structure and/or fibrous web (fibrous web ply), for example by providing the surface with protrusions and/or depressions. The 3D pattern on the surface of the fibrous structure and/or fibrous web (fibrous web ply) is made by making the fibrous structure on a patterned molding member that imparts the 3D pattern to the fibrous structure made thereon. For example, the 3D pattern may comprise a series of line elements, such as a series of line elements that are substantially oriented in the cross-machine direction of the fibrous structure and/or sanitary tissue product.

In one example, a series of line elements may be arranged in a 3D pattern selected from the group consisting of: periodic patterns, aperiodic patterns, straight line patterns, curved line patterns, wavy line patterns, snaking patterns, square line patterns, triangular line patterns, S-wave patterns, sinusoidal line patterns, and mixtures thereof. In another example, a series of line elements may be arranged in a regular periodic pattern or an irregular periodic pattern (aperiodic) or a non-periodic pattern.

"Distinct from" and/or "different from" as used herein means two things that exhibit different properties and/or levels of materials, for example different by 0.5 and/or 1 and/or 2 and/or 3 and/or 5 and/or 10 units and/or different by 1% and/or 3% and/or 5% and/or 10% and/or 20%, different materials, and/or different average fiber diameters.

"Textured pattern" as used herein means a pattern, for example a surface pattern, such as a three-dimensional (3D) surface pattern present on a surface of the fibrous structure and/or on a surface of a component making up the fibrous structure.

"Fibrous Structure Basis Weight" as used herein is the weight per unit area of a sample reported in lbs/3000 ft$^2$ or g/m$^2$.

"Ply" as used herein means an individual, integral fibrous structure.

"Plies" as used herein means two or more individual, integral fibrous structures disposed in a substantially contiguous, face-to-face relationship with one another, forming a multi-ply sanitary tissue product. It is also contemplated that an individual, integral fibrous structure can effectively form a multi-ply sanitary tissue product, for example, by being folded on itself.

"Common Intensive Property" as used herein means an intensive property possessed by more than one region within a fibrous structure. Such intensive properties of the fibrous structure include, without limitation, density, basis weight, thickness, and combinations thereof. For example, if density is a common intensive property of two or more different regions, a value of the density in one region can differ from a value of the density in one or more other regions. Regions (such as, for example, a first region and a second region and/or a continuous network region and at least one of a plurality of discrete zones) are identifiable areas visually discernible and/or visually distinguishable from one another by distinct intensive properties.

"X," "Y," and "Z" designate a conventional system of Cartesian coordinates, wherein mutually perpendicular coordinates "X" and "Y" define a reference X-Y plane, and "Z" defines an orthogonal to the X-Y plane. "Z-direction" designates any direction perpendicular to the X-Y plane. Analogously, the term "Z-dimension" means a dimension, distance, or parameter measured parallel to the Z-direction. When an element, such as, for example, a molding member curves or otherwise deplanes, the X-Y plane follows the configuration of the element.

"Substantially continuous" or "continuous" region refers to an area within which one can connect any two points by an uninterrupted line running entirely within that area throughout the line's length. That is, the substantially continuous region has a substantial "continuity" in all directions parallel to the first plane and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Substantially semi-continuous" or "semi-continuous" region refers an area which has "continuity" in all, but at least one, directions parallel to the first plane, and in which area one cannot connect any two points by an uninterrupted line running entirely within that area throughout the line's length. The semi-continuous framework may have continuity only in one direction parallel to the first plane. By analogy with the continuous region, described above, while an absolute continuity in all, but at least one, directions is preferred, minor deviations from such a continuity may be tolerable as long as those deviations do not appreciably affect the performance of the fibrous structure.

"Discontinuous" or "discrete" regions or zones refer to discrete, and separated from one another areas or zones that are discontinuous in all directions parallel to the first plane.

"Molding member" is a structural element that can be used as a support for the mixture of filaments and solid additives that can be deposited thereon during a process of making a fibrous structure, and as a forming unit to form (or "mold") a desired microscopical geometry of a fibrous structure. The molding member may comprise any element that has the ability to impart a three-dimensional pattern to the fibrous structure being produced thereon, and includes, without limitation, a stationary plate, a belt, a cylinder/roll, a woven fabric, and a band.

"Osmotic material" as used herein is a material that absorbs liquids by transfer of the liquids across the periphery of the material forming a gelatinous substance, which imbibes the liquids and tightly holds the liquids. In one example, osmotic materials retain greater than 5 times their weight of deionized water when subjected to centrifugal forces of less than or equal to 3000 G's for 10 to 15 minutes. In comparison, typically capillary absorbents retain about 1 times their weight under similar conditions. Non-limiting examples of osmotic materials include crosslinked polyacrylic acids and/or crosslinked carboxymethyl cellulose.

"Osmotic material-free" as used herein with respect to a fibrous structure and/or article means that the fibrous structure and/or article contains less than an amount of osmotic material that results in the fibrous structure and/or article exhibiting a VFS of greater than 11 g/g as measured according to the Vertical Full Sheet (VFS) Test Method described herein. In one example, an osmotic material-free fibrous structure comprises 0% by dry weight of the fibrous structure and/or article of osmotic material.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Article

An article of the present invention comprises one or more and/or two or more and/or three or more and/or four or more fibrous webs (fibrous web plies), which comprise one or more fibrous structures, according to the present invention.

It has unexpectedly been found that the arrangement of the fibrous structures and/or fibrous webs (fibrous web plies) within the articles of the present invention and/or type of fibrous structures and/or type of fibrous elements, for example filaments and/or fibers, within the articles of the present invention result in the article of the present invention exhibiting novel properties, such as bulk and/or absorbent properties without negatively impacting the softness and/or flexibility and/or stiffness of the articles.

In one example, the articles of the present invention may comprise different combinations of fibrous webs (fibrous web plies) and/or fibrous structures and/or fibrous elements. For example, the articles of the present invention may comprise different combinations (associations) of wet-laid fibrous structures, for example 100% by weight of fibers, such as pulp fibers, for example wood pulp fibers (e.g., cellulosic wood pulp fibers) and co-formed fibrous structures, for example a mixture of filaments and fibers, such as polypropylene filaments and pulp fibers, such as wood pulp fibers (e.g., cellulosic wood pulp fibers), which allows for the creation of both wet and dry bulk, while maintaining a soft and/or flexibility and/or non-stiff sheet. This unique combination of properties is afforded, in this case, by the use of the co-formed fibrous structure, in which continuous filaments are combined with fibers in a way that the resultant bulk density of the sheet is very low. This low bulk density is maintained even when wet due the lack of collapse of the article, as the continuous filaments are not subject to water induced collapse. In contrast, such bulk in wet-laid fibrous structures is created via hydrogen bonding of the fibers within the wet-laid fibrous structure, which collapse if dry forming, such as embossing and/or microselfing, is used to create a soft fibrous structure with dry bulk (resulting in low wet bulk), or will be stiff if wet forming, such as forming the wet-laid fibrous structure on a molding member and/or subjecting the wet-laid fibrous structure to wet microcontraction during forming, is used to create a dry bulk that is resilient when wet.

In one example, the articles of the present invention comprise less than 50% and/or less than 40% and/or less than 30% and/or less than 25% and/or less than 20% and/or less than 15% and/or greater than 0% and/or greater than 5% by weight of filaments, for example thermoplastic filaments such as polyolefin filaments, for example polypropylene filaments.

In another example, the articles of the present invention allow for the optimization of different fibrous structures and/or fibrous webs (fibrous web plies) for different characteristics and/or properties. One example of this is how a very low density, high bulk co-formed fibrous structure that is strong can be placed with a wet formed, high bulk wet-laid fibrous structure that is very absorbent. The resultant article is one which is both highly absorbent, very compressible, and able to spring back after compression. This results in a spongelike article which is resilient under compression yet highly absorbent like a paper towel. Another example, of this is how a very low density, high bulk co-formed fibrous structure can be placed with a wet formed, high bulk wet-laid fibrous structure. The resultant article exhibits high bulk values when dry, are compressible under load and rebound when the load is relieved. Additionally, the resultant article exhibits high bulk, compressibility, and recovery when wet, due to the wet formed nature of the wet-laid fibrous structure and the co-formed fibrous structure, which is impervious to wet collapse.

In another example, the articles of the present invention exhibit very high sheet and/or roll bulk without negatively impacting softness. This high bulk can be achieved through multiple inner fibrous structures and/or fibrous webs (fibrous web plies), with the interior fibrous structures and/or fibrous webs (fibrous web plies) comprised of high loft, pin-holed wet-laid fibrous structures. Co-formed fibrous structures, which contain continuous, thermoplastic filaments and pulp fibers, enable the use of high loft wet-laid fibrous structures because the filaments are used for strength (especially when wet). Furthermore, the commingled nature of the filaments and fibers within the co-formed fibrous structures allows for very high bulk fibrous structures that are both absorbent and soft, as individual fibers are commingled within a network of continuous filaments. Articles like these are very difficult to make via other technologies such as solely wet-laid technology due to the fact that the fibers, such as pulp fibers, must impart strength and bulk and absorbency. These different demands in the past have caused product developers to optimize for some attributes at the expense of others.

In still another example, the articles of the present invention exhibit very high absorbencies without compromising softness of the article. This is achieved through the heterogenous composition of the article; namely, the combination of at least two different fibrous structures, for example at least one co-formed fibrous structure and at least one wet-laid fibrous structure. To allow for high absorbencies, wet-laid fibrous structure making process choices such as fiber furnish mix, fiber refining levels, and molding member, for example belt design upon which the wet-laid fibrous structure is formed, can be chosen to create a lofty, high absorbent capacity wet-laid fibrous structure that is soft and low in strength. The filaments, for example polypropylene filaments, present in the co-formed fibrous structure is relied upon to deliver the strength of the article, while still being soft and/or flexible and/or non-stiff both wet and dry. Additionally, the interspersion of fibers, for example pulp fibers, with the filaments within the co-formed fibrous structure adds to the soft, velvet-like hand feel of the article.

In yet another example, the articles of the present invention exhibit very high absorbencies without compromising strength of the article. This is achieved through the heterogenous composition of the article; namely, the combination of at least two different fibrous structures, for example at least one co-formed fibrous structure and at least one wet-laid fibrous structure. The wet-laid structure can be optimized for high absorbent capacities and/or rates without having to compromise to maintain strength. To allow for high absorbencies, wet-laid fibrous structure making process choices such as fiber furnish mix, fiber refining levels, and molding member, for example belt design upon which the wet-laid fibrous structure is formed, can be chosen to create a lofty, high absorbent capacity wet-laid fibrous structure that is soft and low in strength. The filaments, for example polypropylene filaments, present in the co-formed fibrous structure is relied upon to deliver the strength of the article, while still being soft and/or flexible and/or non-stiff both wet and dry. Additionally, the interspersion of fibers, for example pulp fibers, with the filaments within the co-formed fibrous structure adds to the soft, velvet-like hand feel of the article.

In another example, the articles of the present invention exhibit high absorbent capacity while still maintaining hand protection. This can be achieved by tailoring the density, capillary pressure, and absorbent capacity of the different fibrous structures within the article. In one example, high density and capillary pressure wet-laid fibrous structures on one or both of the exterior surfaces of the article allow for rapid redistribution of water on a surface of the article, while lower density fibrous structure, such as co-formed fibrous structures, in the interior of the article creates storage capacity. In another example, thin, low density fibrous structures on one or more of the exterior surfaces of the article allow for rapid acquisition of water by the inner, more dense, high capillary pressure fibrous structures, such as wet-laid fibrous structures, whose high capillary pressure structures will redistribute the water in the article and not give it back to the exterior surfaces of the article.

In still another example, the articles of the present invention exhibit high bulk/low density without impacting the overall opacity of the articles. This can be achieved by the combining of differential density wet-laid fibrous structures, which have been wet formed such that relatively low density regions and relatively high density regions are formed in the wet-laid fibrous structure, to the extent that the low density regions of the wet-laid fibrous structure have very low basis weight, to the point of making pinholes. This is normally undesirable in wet-laid fibrous structures and/or wet-laid fibrous structure making processes, as the pinholes are detrimental to strength as well as opacity. When this wet-laid fibrous structure is combined with a co-formed fibrous structure the opacity significantly increases, creating a low density and high opacity article.

In yet another example, the articles of the present invention are very reopenable while still maintaining consumer acceptable absorbent properties. This is achieved through the combination of fibrous structures comprising filaments and/or a mixture of filaments and fibers, and wet-laid fibrous structures. In one example, low basis weight filament-containing fibrous structures, such as scrims of filaments, for example scrims of polypropylene filaments, are arranged on one or more of the exterior surfaces of the articles, which in turn further comprises one or more inner fibrous structures comprising wet-laid fibrous structures and co-formed fibrous structures. This combination of materials creates an article exhibits very high bulk absorbency and at the same time exhibits high wet resiliency, allowing it to be easily reopened during use, especially after being wetted.

In still another example, the articles of the present invention exhibit both high absorbent capacity and high surface drying properties. This combination is achieved through the combination of fibrous structures that exhibit different capillary pressures. One example of such an article that exhibits this characteristic is an article that has one or more wet-laid fibrous structure on one or more exterior surfaces of the articles, along with a co-formed fibrous structure as one or more inner fibrous structures within the articles. This low density co-formed fibrous structure core of the articles creates large absorbent capacity, while the wet-laid fibrous structure on the outside of the articles allows for consumer acceptable surface drying.

In even yet another example, the articles of the present invention exhibit both high wet bulk and high surface drying properties. This combination is achieved through the combination of fibrous structures that exhibit high capillary pressure with fibrous structures that exhibit high bulk when wet. One example of such an article that exhibits these characteristics is one that has one or more wet-laid fibrous structures on one or more exterior surfaces of an article, along with a co-formed fibrous structure in the center of the article. The co-formed fibrous structure core does not collapse when wetted, while the wet-laid fibrous structure on the outside of the article allows for consumer acceptable surface drying.

Non-limiting examples of articles of the present invention are described below in more detail.

Figure 3:
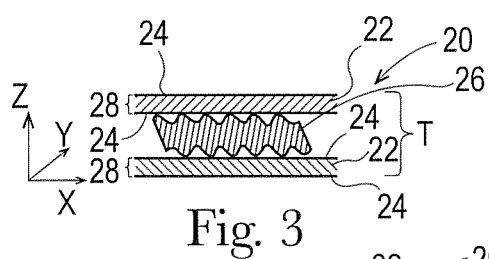
FIG. 3 is a cross-sectional representation of an example of an article according to the present invention.

In one example, as shown in FIG. 3, an article 20 of the present invention comprises three fibrous webs (fibrous web plies): 1) a first fibrous web (fibrous web ply) example of which is shown in FIGS. 2A and 2B comprising a co-formed fibrous structure 22 (a multi-fibrous element fibrous structure) associated with two meltblown fibrous structures 24 (mono-fibrous element fibrous structures), which function as scrims on opposite surfaces of the co-formed fibrous structure 22, 2) a second fibrous web (fibrous web ply) example of which is shown in FIGS. 2A and 2B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22, and 3) a third fibrous web (fibrous web ply) comprising a paper web, for example a fibrous structure 26 (a mono-fibrous element fibrous structure), for example a textured fibrous structure, for example a textured wet-laid fibrous structure, such as a 3D patterned wet-laid fibrous structure, positioned between and associated with at least one and/or both of the first and second fibrous webs, the co-formed fibrous webs 28 (co-formed fibrous web plies). The fibrous webs may be associated with each other in one operation or in multiple operations, such as by combining two of the fibrous webs first and then combining the remaining fibrous web with the already combined fibrous webs. In one example, the article 20 shown in FIG. 3 is made by combining the pre-formed fibrous webs (fibrous web plies).

Figure 4:
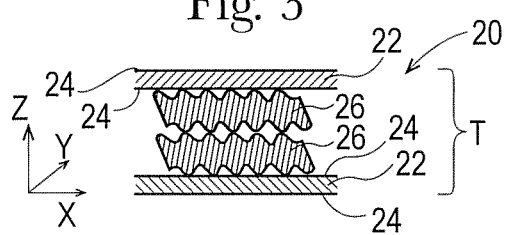
FIG. 4 is a cross-sectional representation of another example of an article according to the present invention.

In one example, as shown in FIG. 4, an article 20 of the present invention comprises four fibrous webs (fibrous web plies) similar to the article shown in FIG. 3 above: 1) a first fibrous web (fibrous web ply) example of which is shown in FIGS. 2A and 2B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22, 2) a second fibrous web (fibrous web ply) example of which is shown in FIGS. 2A and 2B comprising a co-formed fibrous structure 22 (a multi-fibrous element fibrous structure) associated with two meltblown fibrous structures 24 (mono-fibrous element fibrous structures), which function as scrims on opposite surfaces of the co-formed fibrous structure, and 3) third and fourth fibrous webs (fibrous web plies) comprising paper webs, for example wet-laid fibrous structures 26, (mono-fibrous element fibrous structures), for example a textured wet-laid fibrous structure, such as a 3D patterned wet-laid fibrous structure, positioned between and associated with at least one and/or both of the first and second fibrous webs. The fibrous webs may be associated with each other in one operation or in multiple operations, such as by combining two or three of the fibrous webs first and then combining the remaining fibrous webs with the already combined fibrous webs. In one example, the article 20 shown in FIG. 4 is made by combining the pre-formed fibrous webs (fibrous web plies).

Figure 5:
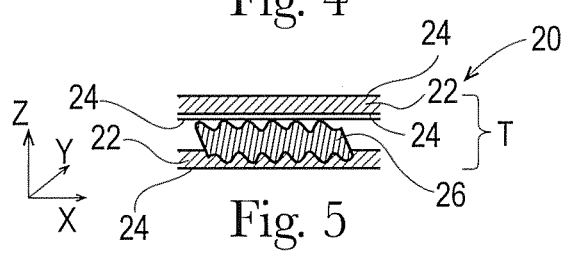
FIG. 5 is a cross-sectional representation of another example of an article according to the present invention.

In one example, as shown in FIG. 5, an article 20 of the present invention comprises two fibrous webs (fibrous web plies): 1) a fibrous web (fibrous web ply) example of which is shown in FIGS. 2A and 2B comprising a co-formed fibrous structure 22 (multi-fibrous element fibrous structure) associated with two meltblown fibrous structures 24, for example two scrim layers of filaments, (mono-fibrous element fibrous structures), which function as scrims on opposite surfaces of the co-formed fibrous structure 22, and 2) a second fibrous web (fibrous web ply) example of which is shown in FIGS. 6A and 6B comprising a co-formed fibrous structure 22 (multi-fibrous element fibrous structure) associated with one meltblown fibrous structure 24, for example a scrim layer of filaments, (mono-fibrous element fibrous structure) on one surface of the co-formed fibrous structure 22 and a paper web, for example a wet-laid fibrous structure 26 (a mono-fibrous element fibrous structure), for example a textured wet-laid fibrous structure, such as a 3D patterned wet-laid fibrous structure on the opposite surface of the co-formed fibrous structure 22. The paper web, for example the wet-laid fibrous structure 26 may be further associated with a meltblown fibrous structure 24, for example a scrim layer of filaments, (mono-fibrous element fibrous structure) on the wet-laid fibrous structure's surface opposite the co-formed fibrous structure 22. The fibrous webs may be associated with each other in one operation, such as by combining the two fibrous webs such that the paper web, for example the wet-laid fibrous structure 26 is positioned between the two co-formed fibrous structures 22 in the article 20. In one example, the article 20 shown in FIG. 5 is made by combining the pre-formed fibrous webs (fibrous web plies).

In one example, as shown in FIG. 7, an article 20 of the present invention comprises two fibrous webs (fibrous web plies): 1) two fibrous webs (fibrous web plies) examples of which are shown in FIGS. 6A and 6B comprising a co-formed fibrous structure 22 (multi-fibrous element fibrous structure) associated with one meltblown fibrous structure 24, for example a scrim layer of filaments, (mono-fibrous element fibrous structure) on one surface of the co-formed fibrous structure 22 and a paper web, for example a wet-laid fibrous structure 26 (a mono-fibrous element fibrous structure), for example a textured wet-laid fibrous structure, such as a 3D patterned wet-laid fibrous structure on the opposite surface of the fibrous structure. The paper web, for example the wet-laid fibrous structure 26 may be further associated with a meltblown fibrous structure 24, for example a scrim layer of filaments, (mono-fibrous element fibrous structure) on the wet-laid fibrous structure's surface opposite the co-formed fibrous structure 22. The fibrous webs may be associated with each other in one operation, such as by combining the two fibrous webs such that the paper webs, for example the wet-laid fibrous structures 26 are positioned between the two co-formed fibrous structures 22 in the article 20. In one example, the article 20 shown in FIG. 7 is made by combining the pre-formed fibrous webs (fibrous web plies).

Figures 9A, 9B, 10, 11, 12:
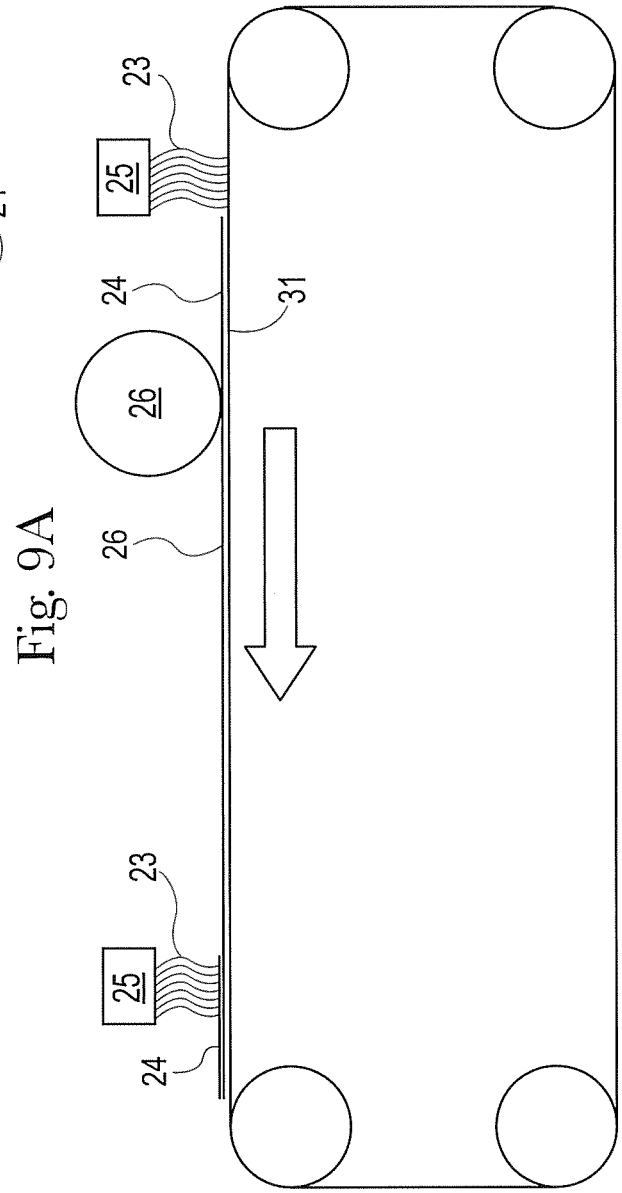
FIG. 9A is a cross-sectional representation of another example of an article according to the present invention.
FIG. 9B is an example of a process for making the article according to FIG. 9A
FIG. 10 is a cross-sectional representation of another example of an article according to the present invention.
FIG. 11 is a cross-sectional representation of another example of an article according to the present invention.
FIG. 12 is a cross-sectional representation of another example of an article according to the present invention.

In one example, as shown in FIG. 8, an article 20 of the present invention comprises a single fibrous web (fibrous web ply): 1) a fibrous web (fibrous web ply) example of which is shown in FIGS. 9A and 9B comprising a paper web, for example a wet-laid fibrous structure 26, such as a textured fibrous structure, (mono-fibrous element fibrous structure) associated with two meltblown fibrous structures 24, for example two scrim layers of filaments, (mono-fibrous element fibrous structures), which function as scrims on opposite surfaces of the wet-laid fibrous structure 26.

In one example, as shown in FIG. 10, an article 20 of the present invention comprises two fibrous webs (fibrous web plies): 1) two fibrous webs (fibrous web plies) examples of which are shown in FIGS. 9A and 9B comprising a paper web, for example a wet-laid fibrous structure 26, such as a textured fibrous structure, (mono-fibrous element fibrous structure) associated with two meltblown fibrous structures 24, for example two scrim layers of filaments, (mono-fibrous element fibrous structures), which function as scrims on opposite surfaces of the paper web, for example the wet-laid fibrous structure 26. In one example, the article 20 shown in FIG. 10 is made by combining the pre-formed fibrous webs (fibrous web plies).

In one example, as shown in FIG. 11, an article 20 of the present invention comprises two fibrous webs (fibrous web plies): 1) a first fibrous web (fibrous web ply) example of which is shown in FIGS. 9A and 9B comprising a paper web, for example a wet-laid fibrous structure 26, such as a textured fibrous structure, (mono-fibrous element fibrous structure) associated with two meltblown fibrous structures 24, for example two scrim layers of filaments, (mono-fibrous element fibrous structures), which function as scrims on opposite surfaces of the wet-laid fibrous structure 26, and 2) a second fibrous web (fibrous web ply) example of which is shown in FIGS. 6A and 6B comprising a co-formed fibrous structure 22 (multi-fibrous element fibrous structure) associated with one meltblown fibrous structure 24, for example two scrim layers of filaments, (mono-fibrous element fibrous structure) on one surface of the co-formed fibrous structure 22 and a paper web, for example a wet-laid fibrous structure 26 (a mono-fibrous element fibrous structure), for example a textured wet-laid fibrous structure, such as a 3D patterned wet-laid fibrous structure on the opposite surface of the fibrous structure. The paper web, for example the wet-laid fibrous structure 26 may be further associated with a meltblown fibrous structure 24, for example a scrim layer of filaments, (mono-fibrous element fibrous structure) on the wet-laid fibrous structure's surface opposite the co-formed fibrous structure 22. The fibrous webs may be associated with each other in one operation, such as by combining the two fibrous webs such that the paper webs, for example the wet-laid fibrous structures 26 are positioned as shown in FIG. 11. In one example, the article 20 shown in FIG. 11 is made by combining the pre-formed fibrous webs (fibrous web plies).

In one example, as shown in FIG. 12, an article 20 of the present invention comprises two fibrous webs (fibrous web plies): 1) a first fibrous web (fibrous web ply) example of which is shown in FIGS. 9A and 9B comprising a paper web, for example a wet-laid fibrous structure 26, such as a textured fibrous structure, (mono-fibrous element fibrous structure) associated with two meltblown fibrous structures 24, for example two scrim layers of filaments, (mono-fibrous element fibrous structures), which function as scrims on opposite surfaces of the wet-laid fibrous structure 26, and 2) a second fibrous web (fibrous web ply) example of which is shown in FIGS. 2A and 2B comprising a co-formed fibrous structure 22 (multi-fibrous element fibrous structure) associated with two meltblown fibrous structures 24, for example two scrim layers of filaments, (mono-fibrous element fibrous structures), which function as scrims on opposite surfaces of the co-formed fibrous structure 22. The fibrous webs may be associated with each other in one operation, such as by combining the two fibrous webs as shown in FIG. 12. In one example, the article 20 shown in FIG. 12 is made by combining the pre-formed fibrous webs (fibrous web plies).

In one example, as shown in FIG. 13, an article 20 of the present invention comprises a single fibrous web (fibrous web ply): 1) a fibrous web (fibrous web ply) example of which is shown in FIGS. 14A and 14B comprising a co-formed fibrous structure 22 (multi-fibrous element fibrous structure) associated with one meltblown fibrous structure 24, for example a scrim layer of filaments, (mono-fibrous element fibrous structure) on one surface of the co-formed fibrous structure 22 and a paper web, for example a wet-laid fibrous structure 26 (a mono-fibrous element fibrous structure), for example a textured wet-laid fibrous structure, such as a 3D patterned wet-laid fibrous structure on the opposite surface of the co-formed fibrous structure 22. The paper web, for example the wet-laid fibrous structure 26 may be further associated with another co-formed fibrous structure 22 which in turn may be associated with another meltblown fibrous structure 24, for example a scrim layer of filaments, (mono-fibrous element fibrous structure) such that the paper web, for example the wet-laid fibrous structure 26 is positioned between the two co-formed fibrous structures 22.

In one example, as shown in FIG. 15, an article 20 of the present invention comprises two fibrous webs (fibrous web plies): 1) two fibrous webs (fibrous web plies) examples of which are shown in FIGS. 6A and 6B comprising a two different co-formed fibrous structures 22 or a variably density (in the z-direction) co-formed fibrous structure 28 example of which is shown in FIGS. 16A and 16B (multi-fibrous element fibrous structure) associated with one meltblown fibrous structure 24, for example a scrim layer of filaments, (mono-fibrous element fibrous structure) on one surface of the co-formed fibrous structure 22 and a paper web, for example a wet-laid fibrous structure 26 (a mono-fibrous element fibrous structure), for example a textured wet-laid fibrous structure, such as a 3D patterned wet-laid fibrous structure on the opposite surface of the fibrous structure. The paper web, for example the wet-laid fibrous structure 26 may be further associated with a meltblown fibrous structure 24, for example a scrim layer of filaments, (mono-fibrous element fibrous structure) on the wet-laid fibrous structure's surface opposite the co-formed fibrous structure 22. The fibrous webs may be associated with each other in one operation, such as by combining the two fibrous webs such that the paper webs, for example the wet-laid fibrous structures 26 are positioned between the two co-formed fibrous structures 22 in the article 20. In one example, the article 20 shown in FIG. 15 is made by combining the pre-formed fibrous webs (fibrous web plies).

In one example, as shown in FIG. 17, an article 20 of the present invention comprises two fibrous webs (fibrous web plies): 1) two fibrous webs (fibrous web plies) examples of which are shown in FIGS. 6A and 6B comprising a co-formed fibrous structure 22 (multi-fibrous element fibrous structure) associated with one meltblown fibrous structure 24, for example a scrim layer of filaments, (mono-fibrous element fibrous structure) on one surface of the co-formed fibrous structure 22 and a paper web, for example a wet-laid fibrous structure 26 (a mono-fibrous element fibrous structure), for example a textured wet-laid fibrous structure, such as a 3D patterned wet-laid fibrous structure on the opposite surface of the fibrous structure. The paper web, for example the wet-laid fibrous structure 26 may be further associated with a meltblown fibrous structure 24, for example a scrim layer of filaments, (mono-fibrous element fibrous structure) on the wet-laid fibrous structure's surface opposite the co-formed fibrous structure 22. The fibrous webs may be associated with each other in one operation, such as by combining the two fibrous webs such that the co-formed fibrous structures 22 are positioned between the two paper webs, for example the two wet-laid fibrous structures 26 in the article 20. In one example, the article 20 shown in FIG. 17 is made by combining the pre-formed fibrous webs (fibrous web plies). The article 20 shown in FIG. 17 is similar to the article 20 shown in FIG. 7, with a different arrangement of the fibrous webs within the article 20.

In one example, as shown in FIG. 18, an article 20 of the present invention comprises three fibrous webs (fibrous web plies): 1) a first fibrous web (fibrous web ply) example of which is shown in FIGS. 2A and 2B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22 forming a co-formed fibrous web 28, 2) second and third fibrous webs (fibrous web plies) comprising paper webs, for example wet-laid fibrous structures 26 (mono-fibrous element fibrous structures), for example a textured fibrous structure, for example a textured wet-laid fibrous structure, such as a 3D patterned wet-laid fibrous structure associated with the co-formed fibrous web 28 (co-formed fibrous web plies). The paper webs, for example the wet-laid fibrous structure 26 may also be associated with one or more meltblown fibrous structures 24, for example one or more scrim layers of filaments, present on one or both of the wet-laid fibrous structure's surfaces. FIG. 19 shows a similar article 20 to that shown in FIG. 18 except that the paper web, for example the wet-laid fibrous structure 26 forms at least one or both of the exterior surfaces of the article 20. In other words, the paper web, for example the wet-laid fibrous structure 26 is not associated with a meltblown fibrous structure 24, for example not associated with a scrim layer of filaments, that forms an exterior surface of the article 20. The fibrous webs may be associated with each other in one operation or in multiple operations, such as by combining two of the fibrous webs first and then combining the remaining fibrous web with the already combined fibrous webs. In one example, the article 20 shown in FIG. 18 is made by combining the pre-formed fibrous webs (fibrous web plies).

In one example, as shown in FIG. 20, an article 20 of the present invention comprises two fibrous webs (fibrous web plies): 1) two fibrous webs (fibrous web plies) examples of which are shown in FIGS. 21A and 21B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22 forming a co-formed fibrous web 28, wherein the co-formed fibrous web 28 is associated with a paper web, for example a wet-laid fibrous structure 26 (mono-fibrous element fibrous structure), for example a textured wet-laid fibrous structure, such as a 3D patterned wet-laid fibrous structure. The combined webs may be embossed in an emboss nip 33 formed by one or more patterned emboss rolls 39, one or more of which may be heated. The paper web, for example the wet-laid fibrous structure 26 may be associated with one or more meltblown fibrous structures 24, for example one or more scrim layers of filaments, present on one or both of the wet-laid fibrous structure's surfaces. The fibrous webs may be associated with each other in one operation, such as by combining the fibrous webs (fibrous web plies) such that the paper webs, for example the wet-laid fibrous structures 26 are positioned between the co-formed fibrous webs 28. In one example, the article 20 shown in FIG. 20 is made by combining the pre-formed fibrous webs (fibrous web plies).

Figure 22A:
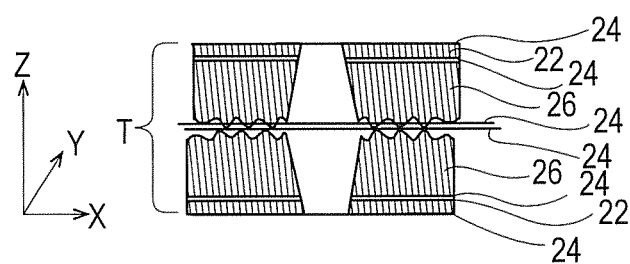
FIG. 22A is a cross-sectional representation of another example of an article according to the present invention.
Figure 22B:
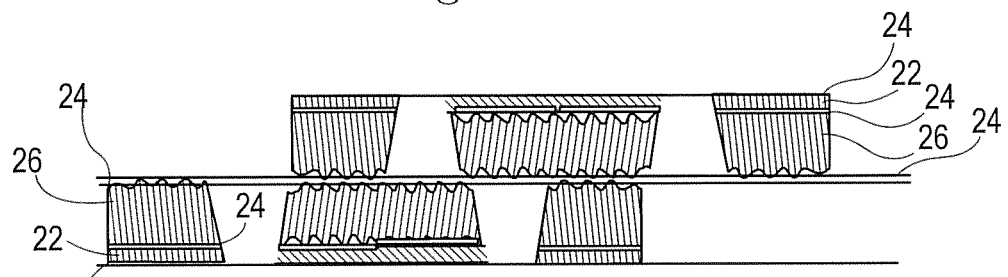
FIG. 22B is a cross-sectional representation of another example of an article according to the present invention.

In one example, as shown in FIGS. 22A and 22B, an article 20 of the present invention comprises two fibrous webs (fibrous web plies): 1) two fibrous webs (fibrous web plies) examples of which are shown in FIGS. 23A and 23B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22 forming a co-formed fibrous web 28, wherein the co-formed fibrous web 28 is associated with a paper web, for example a wet-laid fibrous structure 26 (mono-fibrous element fibrous structure), for example a textured wet-laid fibrous structure, such as a 3D patterned wet-laid fibrous structure. The paper webs, for example wet-laid fibrous structures 26 may be formed on a textured collection device 31 and passed through a nip 33 formed between two rolls 41, for example a heated steel roll and a rubber roll. The paper web, for example the wet-laid fibrous structure 26 may be associated with one or more meltblown fibrous structures 24, for example one or more scrim layers of filaments, present on one or both of the wet-laid fibrous structure's surfaces. The fibrous webs may be associated with each other in one operation, such as by combining the fibrous webs (fibrous web plies) such that the paper webs, for example the wet-laid fibrous structures 26 are positioned between the co-formed fibrous webs 28. In one example, the article 20 shown in FIGS. 22A and 22B is made by combining the pre-formed fibrous webs (fibrous web plies).

In one example, as shown in FIGS. 24A and 24B, an article 20 of the present invention comprises two fibrous webs (fibrous web plies): 1) two fibrous webs (fibrous web plies) examples of which are shown in FIGS. 25A and 25B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22 forming a co-formed fibrous web 28, wherein the co-formed fibrous web 28 is associated with a paper web, for example a wet-laid fibrous structure 26 (mono-fibrous element fibrous structure), for example a textured wet-laid fibrous structure, such as a 3D patterned wet-laid fibrous structure. The paper webs, for example wet-laid fibrous structures 26 may be formed on a textured collection device 31 and passed through a nip 33 formed between two rolls 41, for example a heated steel roll and a rubber roll. The paper web, for example the wet-laid fibrous structure 26 may be associated with one or more meltblown fibrous structures 24, for example one or more scrim layers of filaments, present on one or both of the wet-laid fibrous structure's surfaces. The fibrous webs may be associated with each other in one operation, such as by combining the fibrous webs (fibrous web plies) such that the paper webs, for example the wet-laid fibrous structures 26 are positioned between the co-formed fibrous webs 28. In one example, the article 20 shown in FIGS. 24A and 24B is made by combining the pre-formed fibrous webs (fibrous web plies).

Figure 26A:
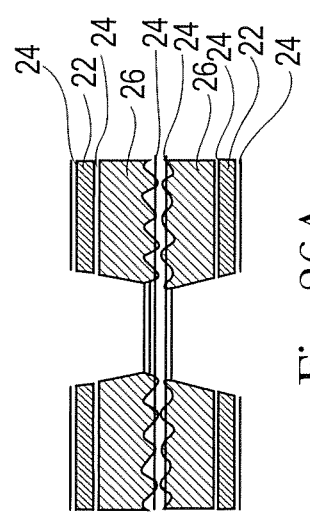
FIG. 26A is a cross-sectional representation of another example of an article according to the present invention.
Figure 26B:
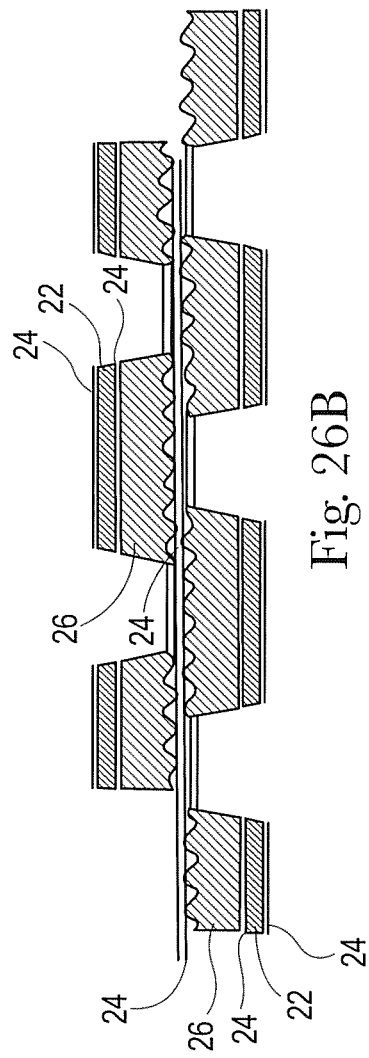
FIG. 26B is a cross-sectional representation of another example of an article according to the present invention.
Figure 27A:
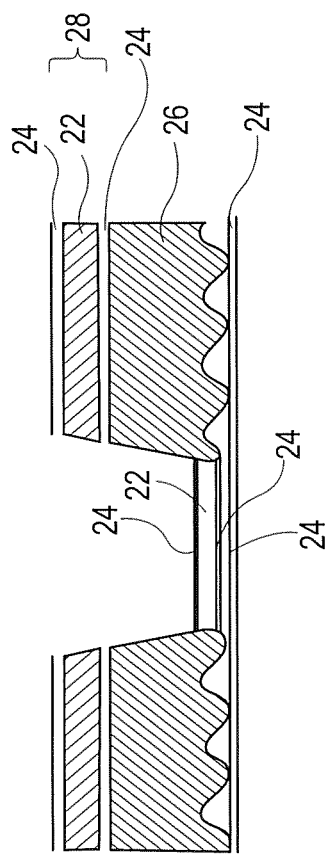
FIG. 27A is a cross-sectional representation of another example of a fibrous web according to the present invention suitable for use in the article of FIGS. 26A and 26B.
Figure 27B:
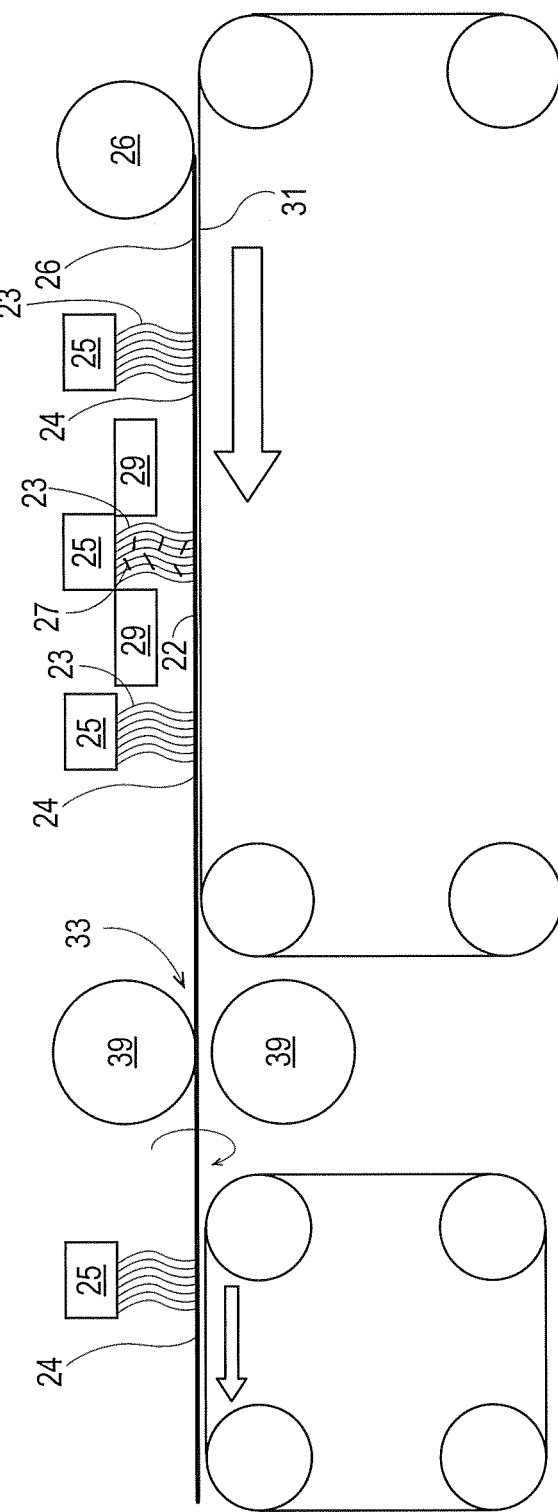
FIG. 27B is an example of a process for making the fibrous web of FIG. 27A.
Figure 28:
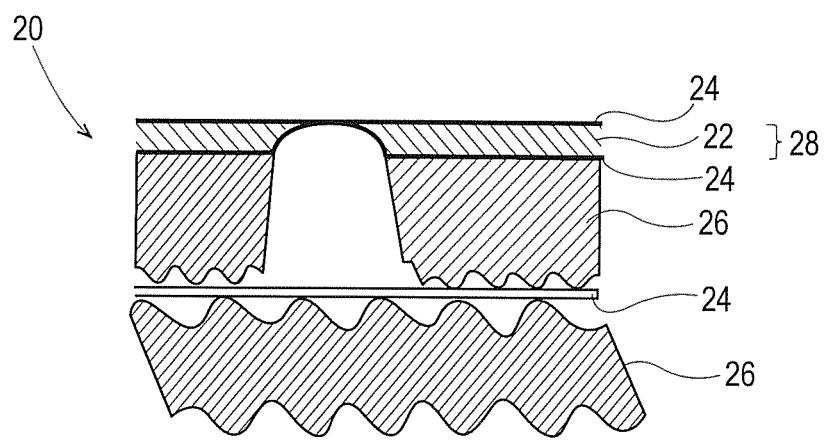
FIG. 28 is a cross-section representation of another example of an article according to the present invention.
Figure 29:
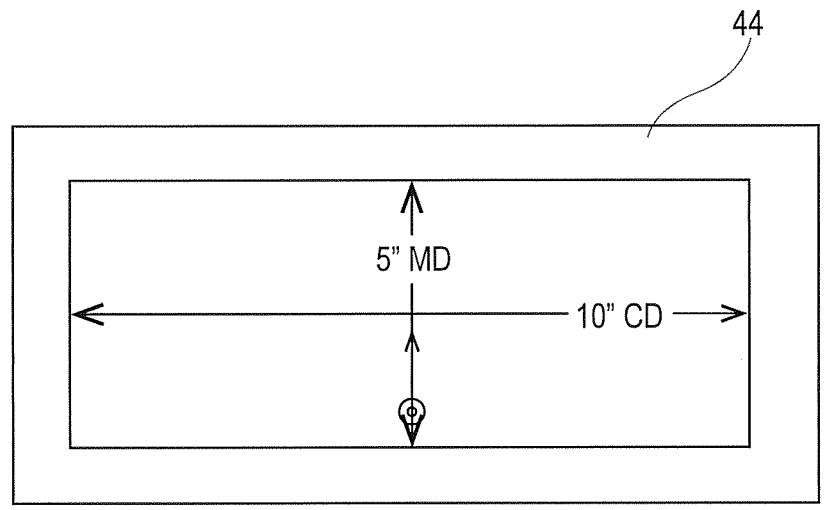
FIG. 29 is a sample setup used in the Liquid Breakthrough Test Method.
Figure 30:
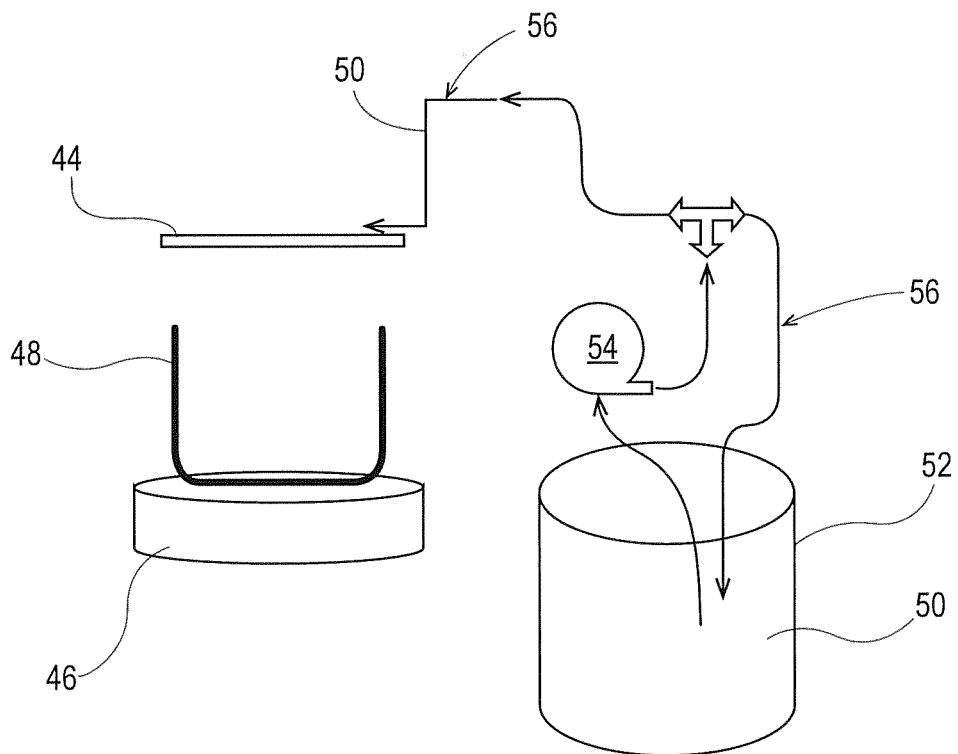
FIG. 30 is a test setup used in the Liquid Breakthrough Test Method.

In one example, as shown in FIGS. 26A and 26B, an article 20 of the present invention comprises two fibrous webs (fibrous web plies): 1) two fibrous webs (fibrous web plies) examples of which are shown in FIGS. 27A and 27B comprising a co-formed fibrous structure 22 (a multi-fibrous element fibrous structure) associated with two meltblown fibrous structures 24, for example two scrim layers of filaments, (mono-fibrous element fibrous structures), which function as scrims on opposite surfaces of the co-formed fibrous structure 22 forming a co-formed fibrous web 28, wherein the co-formed fibrous web 28 is associated with a paper web, for example a wet-laid fibrous structure 26 (mono-fibrous element fibrous structure), for example a textured wet-laid fibrous structure, such as a 3D patterned wet-laid fibrous structure. The combined webs may be embossed in an emboss nip 33 formed by one or more patterned emboss rolls 39, one or more of which may be heated. The paper web, for example the wet-laid fibrous structure 26 may be associated with one or more meltblown fibrous structures 24, for example one or more scrim layers of filaments, present on one or both of the wet-laid fibrous structure's surfaces. The fibrous webs may be associated with each other in one operation, such as by combining the fibrous webs (fibrous web plies) such that the paper webs, for example the wet-laid fibrous structures 26 are positioned between the co-formed fibrous webs 28. In one example, the article 20 shown in FIGS. 26A and 26B is made by combining the pre-formed fibrous webs (fibrous web plies).

Any of the meltblown fibrous structures 24 may be optional, especially if they represent an exterior surface of the articles 20. In one example, the article 20 of FIG. 11 may be void of the meltblown fibrous structure 24 forming the exterior surface of the article 20, which is associated with the paper web, for example the wet-laid fibrous structure 26.

In another example, the combined fibrous webs shown in FIG. 23A may be combined with a paper web, for example a wet-laid fibrous structure 26 to form an article 20. The paper web, for example the wet-laid fibrous structure 26 may be void of a meltblown fibrous structure 24 or may comprise one or more, two or more, meltblown fibrous structures 24 on at least one exterior surface and/or on both exterior surfaces (opposite surfaces).

The articles of the present invention and/or any fibrous webs of the present invention may be subjected to any post-processing operations such as embossing operations, printing operations, tuft-generating operations, thermal bonding operations, ultrasonic bonding operations, perforating operations, surface treatment operations such as application of lotions, silicones and/or other materials and mixtures thereof.

Physical Properties of Articles of the Present Invention

The articles of the present inventions due their fibrous structures and/or the arrangement of the fibrous structures in the articles exhibit novel physical properties, for example absorbent, strength, fluid retention, surface drying, thickness, bulk, compressibility, flexibility, and resiliency, and novel combinations of two or more of these properties.

Table 1 below shows data from inventive samples and prior art samples.

TABLE 1

| Specifics | BW (gsm) | Continuous Filament Containing | % Continuous Filament | Commingled Filament & Fiber | Paper Web Containing |
|---|---|---|---|---|---|
| INVENTION A | 82 | Yes | 14.9% | Yes | Yes |
| INVENTION B | 81.6 | Yes | 12.9% | Yes | Yes |
| INVENTION C | 84.6 | Yes | 7.7% | Yes | Yes |
| INVENTION D | 84.0 | Yes | 15.2% | Yes | Yes |

TABLE 1-continued

| Specifics | | | | | |
|---|---|---|---|---|---|
| INVENTION E | 58.5 | Yes | 20.9% | Yes | Yes |
| Prior Art Bounty | 53.8 | No | 0 | No | Yes |
| Prior Art Viva (DRC) | 59.8 | No | 0 | No | Yes |
| Prior Art Brawny (Fabric TAD) | 51.5 | No | 0 | No | Yes |
| Prior Art Sparkle (Conv) | 49.1 | No | 0 | No | Yes |
| Prior Art with Continuous Filament | 58.7 | Yes | 21.3% | Yes | No |
| Prior Art with Continuous Filament | 61.6 | Yes | 20.3% | Yes | No |
| Prior Art with Continuous Filament | 55.4 | Yes | 22.6% | Yes | No |

| Specifics | Plate Stiffness (N*mm) | Plate Stiffness corrected for Basis Weight (N*mg/M) | Flex Rigidity Overhang Avg. (cm) | Flexural Rigidity (mg*cm.g) | Bending Modulus [(mg*cm.g)/mils$^3$] |
|---|---|---|---|---|---|
| INVENTION A | 14.7 | 0.180 | 10.74 | 1270 | 4.69 |
| INVENTION B | 16.3 | 0.200 | 12.7 | 2070 | 6.12 |
| INVENTION C | 14.3 | 0.169 | 12.7 | 2156 | 5.56 |
| INVENTION D | 13.7 | 0.163 | 10.5 | 1219 | 7.36 |
| INVENTION E | 8.4 | 0.144 | 8.8 | 498 | 5.07 |
| Prior Art Bounty | 11.3 | 0.210 | 11.2 | 939 | 10.18 |
| Prior Art Viva (DRC) | 4.5 | 0.075 | 5.5 | 124 | 4.03 |
| Prior Art Brawny (Fabric TAD) | 13.9 | 0.270 | 10.6 | 759 | 17.28 |
| Prior Art Sparkle (Conv) | 15.6 | 0.317 | 11.8 | 1011 | 26.35 |
| Prior Art with Continuous Filament | 6.0 | 0.102 | 6.7 | 220 | 4.74 |
| Prior Art with Continuous Filament | 3.6 | 0.059 | 5.3 | 116 | 2.55 |
| Prior Art with Continuous Filament | 7.1 | 0.129 | 8.3 | 395 | 22.19 |

| Specifics | Emtec TS7 | Dry Thick Compression | Dry Thick Compressive Recovery | Wet Thick Compression | Wet Thick Compressive Recovery |
|---|---|---|---|---|---|
| INVENTION A | 10.65 | 1408 | 1022 | 3646 | 1602 |
| INVENTION B | 15.63 | 1007 | 812 | 3251 | 1709 |
| INVENTION C | 17.33 | 1271 | 989 | 4978 | 2125 |
| INVENTION D | 10.36 | 764 | 606 | 2399 | 1235 |
| INVENTION E | 11.36 | 1442 | 945 | 2740 | 1137 |
| Prior Art Bounty | 16.13 | 627 | 469 | 1792 | 798 |
| Prior Art Viva (DRC) | 16.71 | 246 | 187 | 429 | 159 |
| Prior Art Brawny (Fabric TAD) | 25.07 | 418 | 320 | 658 | 291 |
| Prior Art Sparkle (Conv) | 25.03 | 314 | 208 | 361 | 47 |
| Prior Art with Continuous Filament | 9.01 | — | — | — | — |
| Prior Art with Continuous Filament | 9.5 | 556 | 434 | 795 | 468 |
| Prior Art with Continuous Filament | 11.06 | 235 | 192 | 412 | 233 |

| Specifics | Low Load Wet Resiliency | Mid Load Wet Resiliency | Dry MD TEA | Dry CD TEA | Dry Tensile Modulus MD | Dry Tensile Modulus CD |
|---|---|---|---|---|---|---|
| INVENTION A | 0.97 | 0.76 | 160 | 57 | 2080 | 983 |
| INVENTION B | 1.14 | 0.99 | 150 | 71 | 1755 | 1766 |
| INVENTION C | 1.14 | 0.90 | 106 | 47 | 1255 | 1369 |
| INVENTION D | 1.15 | 0.92 | 155 | 61 | 2550 | 1621 |
| INVENTION E | 0.96 | 0.65 | 124 | 72 | 1945 | 597 |
| Prior Art Bounty | 1.08 | 0.85 | 94 | 51 | 1891 | 3438 |
| Prior Art Viva (DRC) | 0.91 | 0.67 | 80 | 44 | 685 | 856 |
| Prior Art Sparkle (Conv) | 0.87 | 0.68 | 80 | 37 | 2143 | 3656 |

TABLE 1-continued

| Specifics | | | | | | |
|---|---|---|---|---|---|---|
| Prior Art Bounty Basic | 0.54 | 0.20 | 91 | 24 | 2710 | 6551 |
| Prior Art with Continuous Filament | — | — | 143 | 124 | 1469 | 406 |
| Prior Art with Continuous Filament | 0.92 | 0.77 | 119 | 103 | 665.8 | 363 |
| Prior Art with Continuous Filament | 0.95 | 0.75 | 166 | 128 | 3479 | 1216.4 |

| Specifics | Geo Mean Dry Tensile Modulus (g/cm*%) | Wet Burst (g) | Wet Burst BEA (g-in/in²) | Dry Burst (g) | Dry Burst (BEA) (g-in/in²) | Wet Burst/ Dry Burst |
|---|---|---|---|---|---|---|
| INVENTION A | 1430 | 760 | 34.6 | 978 | 33.4 | 0.78 |
| INVENTION B | 1760 | 733 | 26.1 | 1132 | 31.8 | 0.65 |
| INVENTION C | 1311 | 510 | 17.9 | 897 | 24.4 | 0.57 |
| INVENTION D | 2033 | 793 | 37.4 | 1047 | 31.9 | 0.76 |
| INVENTION E | 1077 | 639 | 27.9 | 802 | 27.9 | 0.80 |
| Prior Art Bounty | 2550 | 437 | 8.2 | 1032 | 18.9 | 0.42 |
| Prior Art Viva (DRC) | 765 | 275 | 7.03 | 626 | 18.2 | 0.44 |
| Prior Art Brawny (Fabric TAD) | 2799 | 295 | 5.82 | 774 | 14.2 | 0.38 |
| Prior Art Sparkle (Conv) | 4214 | 177 | 3.41 | 648 | 10.8 | 0.27 |
| Prior Art with Continuous Filament | 772 | 786 | 39.7 | 938 | 51.8 | 0.84 |
| Prior Art with Continuous Filament | 492 | 745 | 28.48 | 736 | 27.3 | 1.01 |
| Prior Art with Continuous Filament | 2057 | 840 | 30.8 | 798 | 34.2 | 1.05 |

| Specifics | Wet BEA/ Dry BEA | Wet MD (g/in) | Wet MD (TEA) | Wet CD (g/in) | Wet CD (TEA) | Wet/Dry CD TEA | TOTAL DRY TENSILE (g/in) |
|---|---|---|---|---|---|---|---|
| INVENTION A | 1.04 | 486 | 130 | 196 | 84.4 | 1.477 | 1190 |
| INVENTION B | 0.82 | 196 | 28.3 | 291 | 37.9 | 0.531 | 1586 |
| INVENTION C | 0.73 | 340 | 47.8 | 182 | 17.5 | 0.376 | 1227 |
| INVENTION D | 1.17 | 598 | 107 | 281 | 92.8 | 1.511 | 1370 |
| INVENTION E | 1.00 | 482 | 129 | 239 | 126 | 1.743 | 994 |
| Prior Art Bounty | 0.43 | 410 | 23.56 | 278 | 14.82 | 0.293 | 2203 |
| Prior Art Viva (DRC) | 0.39 | 332 | 35.6 | 186 | 16.6 | 0.379 | 856 |
| Prior Art Brawny (Fabric TAD) | 0.41 | 269 | 18.1 | 252 | 9.8 | 0.262 | 1614 |
| Prior Art Sparkle (Conv) | 0.32 | 276 | 12.6 | 144 | 3.5 | 0.145 | 1685 |
| Prior Art with Continuous Filament | 0.77 | 417 | 188.0 | 257 | 158.0 | 1.274 | 660 |
| Prior Art with Continuous Filament | 1.04 | 425.6 | 125.1 | 238.4 | 93.8 | 0.911 | 750 |
| Prior Art with Continuous Filament | 0.90 | 523 | 188.02 | 290.4 | 137.02 | 1.072 | 796 |

| Specifics | Wet Total Tensile (g/in) | Geo Mean Wet TEA | HFS g/g | VFS g/g | CRT g/sec | CRT g/in² | CRT g/g |
|---|---|---|---|---|---|---|---|
| INVENTION A | 682 | 105 | 21.5 | 14.2 | 0.42 | 0.89 | 17.99 |
| INVENTION B | 487 | 33 | 23.6 | 13.0 | 0.50 | 1.02 | 19.36 |
| INVENTION C | 522 | 29 | 25.9 | 11.6 | 0.65 | 1.31 | 24.03 |
| INVENTION D | 879 | 100 | 19.4 | 14.4 | 0.44 | 0.88 | 17.26 |
| INVENTION E | 721 | 127 | 24.5 | 14.3 | 0.43 | 0.79 | 21.07 |
| Prior Art Bounty | 688 | 19 | 23.0 | 9.1 | 0.58 | 0.68 | 19.63 |
| Prior Art Viva (DRC) | 517 | 24 | 14.5 | 9.8 | 0.21 | 0.47 | 12.09 |
| Prior Art Brawny (Fabric TAD) | 521 | 13 | 18.0 | 8.3 | 0.25 | 0.48 | 14.30 |
| Prior Art Sparkle (Conv) | 420 | 7 | 13.1 | 5.4 | 0.33 | 0.30 | 9.45 |
| Prior Art with Continuous Filament | 674 | 172 | 16.6 | 11.8 | 0.33 | — | 13.30 |

TABLE 1-continued

| | | | | | | |
|---|---|---|---|---|---|---|
| Prior Art with Continuous Filament | 664 | 108 | 16.7 | 11.6 | 0.27 | 0.59 | 14.03 |
| Prior Art with Continuous Filament | 813 | 161 | 13.6 | 9.5 | 0.21 | 0.42 | 11.21 |

| Specifics | SST | Dry Caliper (mils) | Wet Caliper (mils) | Bulk (cc/g) | Wet Bulk (cc/g) | Wet Web-Web CoF | Liquid Break-Through |
|---|---|---|---|---|---|---|---|
| INVENTION A | 1.46 | 58.3 | 41.2 | 18.1 | 12.8 | 0.82 | 2.66 |
| INVENTION B | 2.3 | 62.8 | 50.9 | 19.5 | 15.8 | 0.98 | 3.22 |
| INVENTION C | 2.86 | 65.7 | 56.5 | 19.7 | 17.0 | 2.28 | 0.64 |
| INVENTION D | 1.51 | 49.5 | 40.9 | 15.0 | 12.4 | 0.87 | 3.38 |
| INVENTION E | 1.66 | 41.6 | 34.3 | 18.1 | 14.9 | — | 2.29 |
| Prior Art Bounty | 1.8 | 40.72 | 33.0 | 19.2 | 15.6 | 1.92 | 0.74 |
| Prior Art Viva (DRC) | 0.57 | 28.21 | 21.4 | 12.0 | 9.1 | 2.02 | 2.16 |
| Prior Art Brawny (Fabric TAD) | — | 31.8 | 23.9 | 15.7 | 11.8 | 1.96 | 0.62 |
| Prior Art Sparkle (Conv) | 0.40 | 30.4 | 14.7 | 15.7 | 7.6 | 1.18 | 2.56 |
| Prior Art with Continuous Filament | 0.69 | 32.4 | 27.6 | 14.0 | 11.9 | — | 2.86 |
| Prior Art with Continuous Filament | 0.74 | 32.18 | 25.9 | 13.3 | 10.7 | 1.15 | 1.44 |
| Prior Art with Continuous Filament | 0.48 | 23.54 | 21.66 | 10.8 | 9.9 | 0.68 | 2.18 |

In addition to or alternatively, the articles, for example articles comprising a co-formed fibrous structure and optionally other fibrous structures, of the present invention, when in roll form, may exhibit novel roll properties. In one example, an article of the present invention, for example an article comprising a co-formed fibrous structure, may exhibit a Roll Firmness at 7.00 N of less than 11.5 and/or less 11.0 and/or less than 9.5 and/or less than 9.0 and/or less than 8.5 and/or less than 8.0 and/or less than 7.5 mm as measured according to the Roll Firmness Test Method described herein.

In one example, a co-formed fibrous structure and/or a co-formed fibrous web (co-formed fibrous web ply) in roll form may exhibit a roll firmness at 7.00 N of of less than 11.5 and/or less 11.0 and/or less than 9.5 and/or less than 9.0 and/or less than 8.5 and/or less than 8.0 and/or less than 7.5 mm as measured according to the Roll Firmness Test Method described herein.

Fibrous Webs (Fibrous Web Plies)

Non-limiting examples of fibrous webs (fibrous web plies) according to the present invention comprise one or more and/or two or more and/or three or more and/or four or more and/or five or more and/or six or more and/or seven or more fibrous structures that are associated with one another, such as by compression bonding (for example by passing through a nip formed by two rollers), thermal bonding (for example by passing through a nip formed by two rollers where at least one of the rollers is heated to a temperature of at least about 120° C. (250° F.)), microselfing, needle punching, and gear rolling, to form a unitary structure.

Wet-Laid Fibrous Structure (an Example of a Mono-Fibrous Element Fibrous Structure)

The wet-laid fibrous structure comprises a plurality of fibrous elements, for example a plurality of fibers. In one example, the wet-laid fibrous structure comprises a plurality of naturally-occurring fibers, for example pulp fibers, such as wood pulp fibers (hardwood and/or softwood pulp fibers). In another example, the wet-laid fibrous structure comprises a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof.

The mono-fibrous element fibrous structure may comprise one or more filaments, such as polyolefin filaments, for example polypropylene and/or polyethylene filaments, starch filaments, starch derivative filaments, cellulose filaments, polyvinyl alcohol filaments.

The wet-laid fibrous structure of the present invention may be single-ply or multi-ply web material. In other words, the wet-laid fibrous structures of the present invention may comprise one or more wet-laid fibrous structures, the same or different from each other so long as one of them comprises a plurality of pulp fibers.

In one example, the wet-laid fibrous structure comprises a wet laid fibrous structure ply, such as a through-air-dried fibrous structure ply, for example an uncreped, through-air-dried fibrous structure ply and/or a creped, through-air-dried fibrous structure ply.

In another example, the wet-laid fibrous structure and/or wet laid fibrous structure ply may exhibit substantially uniform density.

In another example, the wet-laid fibrous structure and/or wet laid fibrous structure ply may comprise a surface pattern. In one example, the surface pattern comprises a one or more relatively high density regions and one or more relatively low density regions. In another example, the surface pattern comprises one or more relatively high elevation regions and one or more relatively low elevation regions. In yet another example, the surface pattern comprises one or more relatively high basis weight regions and one or more relatively low basis weight regions. In still another example, the surface pattern is a non-random, repeating pattern, which may comprise a plurality of discrete regions dispersed throughout a continuous network. At least a portion of the plurality of discrete regions may exhibit a value of a common intensive property (such as density, bulk, and/or basis weight) that is different from the value of the common intensive property exhibited by the continuous network.

In one example, the wet laid fibrous structure ply comprises a conventional wet-pressed fibrous structure ply. The wet laid fibrous structure ply may comprise a fabric-creped fibrous structure ply. The wet laid fibrous structure ply may comprise a belt-creped fibrous structure ply.

In still another example, the wet-laid fibrous structure may comprise an air laid fibrous structure ply.

The wet-laid fibrous structures of the present invention may comprise a surface softening agent or be void of a surface softening agent, such as silicones, quaternary ammonium compounds, lotions, and mixtures thereof. In one example, the sanitary tissue product is a non-lotioned wet-laid fibrous structure.

The wet-laid fibrous structures of the present invention may comprise trichome fibers or may be void of trichome fibers.

Patterned Molding Members

The wet-laid fibrous structures of the present invention may be formed on patterned molding members that result in the wet-laid fibrous structures of the present invention. In one example, the pattern molding member comprises a non-random repeating pattern. In another example, the pattern molding member comprises a resinous pattern.

In one example, the wet-laid fibrous structure comprises a textured surface. In another example, the wet-laid fibrous structure comprises a surface comprising a three-dimensional (3D) pattern, for example a 3D pattern imparted to the wet-laid fibrous structure by a patterned molding member. Non-limiting examples of suitable patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned sanitary tissue products and/or 3D patterned fibrous structure plies employed in sanitary tissue products. Other non-limiting examples of such patterned molding members include through-air-drying fabrics and through-air-drying belts utilized in through-air-drying papermaking processes that produce through-air-dried fibrous structures, for example 3D patterned through-air dried fibrous structures, and/or through-air-dried sanitary tissue products comprising the wet-laid fibrous structure.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Non-limiting examples of patterned molding members suitable for use in the present invention comprises a through-air-drying belts. The through-air-drying belts may comprise a plurality of continuous knuckles, discrete knuckles, semi-continuous knuckles and/or continuous pillows, discrete pillows, and semi-continuous pillows formed by resin arranged in a non-random, repeating pattern supported on a support fabric comprising filaments, such as a forming fabric. The resin is patterned such that deflection conduits that contain little to know resin present in the pattern and result in the fibrous structure being formed on the patterned molding member having one or more pillow regions (low density regions) compared to the knuckle regions that are imparted to the fibrous structure by the resin areas.

Non-Limiting Examples of Making Wet-Laid Fibrous Structures

In one non-limiting example, the wet-laid fibrous structure is made on a molding member of the present invention. The method may be a paper web, for example a fibrous structure making process that uses a cylindrical dryer such as a Yankee (a Yankee-process) (creped) or it may be a Yankeeless process (uncreped) as is used to make substantially uniform density and/or uncreped wet-laid fibrous structures (fibrous structures).

In one example, a process for making a paper web, for example a fibrous structure according to the present invention comprises supplying an aqueous dispersion of fibers (a fibrous or fiber furnish or fiber slurry) to a headbox which can be of any convenient design. From the headbox the aqueous dispersion of fibers is delivered to a first foraminous member (forming wire) which is typically a Fourdrinier wire, to produce an embryonic fibrous structure.

The embryonic fibrous structure is brought into contact with a patterned molding member, such as a 3D patterned through-air-drying belt. While in contact with the patterned molding member, the embryonic fibrous structure will be deflected, rearranged, and/or further dewatered. This can be accomplished by applying differential speeds and/or pressures.

After the embryonic fibrous structure has been associated with the patterned molding member, fibers within the embryonic fibrous structure are deflected into pillows ("deflection conduits") present in the patterned molding member. In one example of this process step, there is essentially no water removal from the embryonic fibrous structure through the deflection conduits after the embryonic fibrous structure has been associated with the patterned molding member but prior to the deflecting of the fibers into the deflection conduits. Further water removal from the embryonic fibrous structure can occur during and/or after the time the fibers are being deflected into the deflection conduits. Water removal from the embryonic fibrous structure may continue until the consistency of the embryonic fibrous structure associated with patterned molding member is increased to from about 25% to about 35%. Once this consistency of the embryonic fibrous structure is achieved, then the embryonic fibrous structure can be referred to as an intermediate fibrous structure. As noted, water removal occurs both during and after deflection; this water removal may result in a decrease in fiber mobility in the embryonic web material. This decrease in fiber mobility may tend to fix and/or freeze the fibers in place after they have been deflected and rearranged. Of course, the drying of the web material in a later step in the process of this invention serves to more firmly fix and/or freeze the fibers in position.

Any convenient means conventionally known in the papermaking art can be used to dry the intermediate fibrous structure. Examples of such suitable drying process include subjecting the intermediate fibrous structure to conventional and/or flow-through dryers and/or Yankee dryers.

In one example of a drying process, the intermediate fibrous structure may first pass through an optional predryer. This predryer can be a conventional flow-through dryer (hot air dryer) well known to those skilled in the art. Optionally, the predryer can be a so-called capillary dewatering apparatus. In such an apparatus, the intermediate fibrous structure passes over a sector of a cylinder having preferential-capillary-size pores through its cylindrical-shaped porous cover. Optionally, the predryer can be a combination capillary dewatering apparatus and flow-through dryer. The quantity of water removed in the predryer may be controlled so that a predried fibrous structure exiting the predryer has a consistency of from about 30% to about 98%. The predried fibrous structure may be applied to a surface of a Yankee dryer via a nip with pressure, the pattern formed by the top surface of patterned molding member is impressed into the predried web material to form a 3D patterned fibrous structure, for example a 3D patterned wet-laid fibrous structure of the present invention. The 3D patterned wet-laid fibrous structure is then adhered to the surface of the Yankee dryer where it can be dried to a consistency of at least about 95%.

The 3D patterned wet-laid fibrous structure can then be foreshortened by creping the 3D patterned wet-laid fibrous structure with a creping blade to remove the 3D patterned wet-laid fibrous structure from the surface of the Yankee dryer resulting in the production of a 3D patterned creped wet-laid fibrous structure in accordance with the present invention. As used herein, foreshortening refers to the reduction in length of a dry (having a consistency of at least about 90% and/or at least about 95%) web material which occurs when energy is applied to the dry web material in such a way that the length of the dry web material is reduced and the fibers in the dry web material are rearranged with an accompanying disruption of fiber-fiber bonds. Foreshortening can be accomplished in any of several well-known ways. One common method of foreshortening is creping. Another method of foreshortening that is used to make the wet-laid fibrous structures of the present invention is wet microcontraction. Further, the wet-laid fibrous structure may be subjected to post processing steps such as calendaring, tuft generating operations, and/or embossing and/or converting.

Co-Formed Fibrous Structures

The co-formed fibrous structures of the present invention comprise a plurality of filaments and a plurality of solid additives. The filaments and the solid additives may be commingled together. In one example, the fibrous structure is a coform fibrous structure comprising filaments and solid additives. The filaments may be present in the fibrous structures of the present invention at a level of less than 90% and/or less than 80% and/or less than 65% and/or less than 50% and/or greater than 5% and/or greater than 10% and/or greater than 20% and/or from about 10% to about 50% and/or from about 25% to about 45% by weight of the fibrous structure on a dry basis.

The solid additives may be present in the fibrous structures of the present invention at a level of greater than 10% and/or greater than 25% and/or greater than 50% and/or less than 100% and/or less than 95% and/or less than 90% and/or less than 85% and/or from about 30% to about 95% and/or from about 50% to about 85% by weight of the fibrous structure on a dry basis.

The filaments and solid additives may be present in the fibrous structures of the present invention at a weight ratio of filaments to solid additive of greater than 10:90 and/or greater than 20:80 and/or less than 90:10 and/or less than 80:20 and/or from about 25:75 to about 50:50 and/or from about 30:70 to about 45:55. In one example, the filaments and solid additives are present in the fibrous structures of the present invention at a weight ratio of filaments to solid additives of greater than 0 but less than 1.

In one example, the fibrous structures of the present invention exhibit a basis weight of from about 10 gsm to about 1000 gsm and/or from about 10 gsm to about 500 gsm and/or from about 15 gsm to about 400 gsm and/or from about 15 gsm to about 300 gsm as measured according to the Basis Weight Test Method described herein. In another example, the fibrous structures of the present invention exhibit a basis weight of from about 10 gsm to about 200 gsm and/or from about 20 gsm to about 150 gsm and/or from about 25 gsm to about 125 gsm and/or from about 30 gsm to about 100 gsm and/or from about 30 gsm to about 80 gsm as measured according to the Basis Weight Test Method described herein. In still another example, the fibrous structures of the present invention exhibit a basis weight of from about 80 gsm to about 1000 gsm and/or from about 125 gsm to about 800 gsm and/or from about 150 gsm to about 500 gsm and/or from about 150 gsm to about 300 gsm as measured according to the Basis Weight Test Method described herein.

In one example, the fibrous structure of the present invention comprises a core component. A "core component" as used herein means a fibrous structure comprising a plurality of filaments and optionally a plurality of solid additives. In one example, the core component is a coform fibrous structure comprising a plurality of filaments and a plurality of solid additives, for example pulp fibers. In one example, the core component is the component that exhibits the greatest basis weight with the fibrous structure of the present invention. In one example, the total core components present in the fibrous structures of the present invention exhibit a basis weight that is greater than 50% and/or greater than 55% and/or greater than 60% and/or greater than 65% and/or greater than 70% and/or less than 100% and/or less than 95% and/or less than 90% of the total basis weight of the fibrous structure of the present invention as measured according to the Basis Weight Test Method described herein. In another example, the core component exhibits a basis weight of greater than 12 gsm and/or greater than 14 gsm and/or greater than 16 gsm and/or greater than 18 gsm and/or greater than 20 gsm and/or greater than 25 gsm as measured according to the Basis Weight Test Method described herein.

"Consolidated region" as used herein means a region within a fibrous structure where the filaments and optionally the solid additives have been compressed, compacted, and/or packed together with pressure and optionally heat (greater than 150° F.) to strengthen the region compared to the same region in its unconsolidated state or a separate region which did not see the compression or compacting pressure. In one example, a region is consolidated by forming unconsolidated regions within a fibrous structure on a patterned molding member and passing the unconsolidated regions within the fibrous structure while on the patterned molding member through a pressure nip, such as a heated metal anvil roll (about 275° F.) and a rubber anvil roll with pressure to compress the unconsolidated regions into one or more consolidated regions. In one example, the filaments present in the consolidated region, for example on the side of the fibrous structure that is contacted by the heated roll comprises fused filaments that create a skin on the surface of the fibrous structure, which may be visible via SEM images.

The fibrous structure of the present invention may, in addition a core component, further comprise a scrim component. "Scrim component" as used herein means a fibrous structure comprising a plurality of filaments. In one example, the total scrim components present in the fibrous structures of the present invention exhibit a basis weight that is less than 25% and/or less than 20% and/or less than 15% and/or less than 10% and/or less than 7% and/or less than 5% and/or greater than 0% and/or greater than 1% of the total basis weight of the fibrous structure of the present invention as measured according to the Basis Weight Test Method described herein. In another example, the scrim component exhibits a basis weight of 10 gsm or less and/or less than 10 gsm and/or less than 8 gsm and/or less than 6 gsm and/or greater than 5 gsm and/or less than 4 gsm and/or greater than 0 gsm and/or greater than 1 gsm as measured according to the Basis Weight Test Method described herein.

In one example, at least one of the core components of the fibrous structure comprises a plurality of solid additives, for example pulp fibers, such as comprise wood pulp fibers and/or non-wood pulp fibers.

In one example, at least one of the core components of the fibrous structure comprises a plurality of core filaments. In another example, at least one of the core components comprises a plurality of solid additives and a plurality of the core filaments. In one example, the solid additives and the core filaments are present in a layered orientation within the core component. In one example, the core filaments are present as a layer between two solid additive layers. In another example, the solid additives and the core filaments are present in a coform layer. At least one of the core filaments comprises a polymer, for example a thermoplastic polymer, such as a polyolefin. The polyolefin may be selected from the group consisting of: polypropylene, polyethylene, and mixtures thereof. In another example, the thermoplastic polymer of the core filament may comprise a polyester.

In one example, at least one of the scrim components is adjacent to at least one of the core components within the fibrous structure. In another example, at least one of the core components is positioned between two scrim components within the fibrous structure.

In one example, at least one of the scrim components of the fibrous structure of the present invention comprises a plurality of scrim filaments, for example scrim filaments, wherein the scrim filaments comprise a polymer, for example a thermoplastic and/or hydroxyl polymer as described above with reference to the core components.

In one example, at least one of the scrim filaments exhibits an average fiber diameter of less than 50 and/or less than 25 and/or less than 10 and/or at least 1 and/or greater than 1 and/or greater than 3 µm as measured according to the Average Diameter Test Method described herein.

The average fiber diameter of the core filaments is less than 250 and/or less than 200 and/or less than 150 and/or less than 100 and/or less than 50 and/or less than 30 and/or less than 25 and/or less than 10 and/or greater than 1 and/or greater than 3 µm as measured according to the Average Diameter Test Method described herein.

In one example, the fibrous structures of the present invention may comprise any suitable amount of filaments and any suitable amount of solid additives. For example, the fibrous structures may comprise from about 10% to about 70% and/or from about 20% to about 60% and/or from about 30% to about 50% by dry weight of the fibrous structure of filaments and from about 90% to about 30% and/or from about 80% to about 40% and/or from about 70% to about 50% by dry weight of the fibrous structure of solid additives, such as wood pulp fibers.

In one example, the filaments and solid additives of the present invention may be present in fibrous structures according to the present invention at weight ratios of filaments to solid additives of from at least about 1:1 and/or at least about 1:1.5 and/or at least about 1:2 and/or at least about 1:2.5 and/or at least about 1:3 and/or at least about 1:4 and/or at least about 1:5 and/or at least about 1:7 and/or at least about 1:10.

In one example, the solid additives, for example wood pulp fibers, may be selected from the group consisting of softwood kraft pulp fibers, hardwood pulp fibers, and mixtures thereof. Non-limiting examples of hardwood pulp fibers include fibers derived from a fiber source selected from the group consisting of: Acacia, Eucalyptus, Maple, Oak, Aspen, Birch, Cottonwood, Alder, Ash, Cherry, Elm, Hickory, Poplar, Gum, Walnut, Locust, Sycamore, Beech, Catalpa, Sassafras, Gmelina, Albizia, Anthocephalus, and Magnolia. Non-limiting examples of softwood pulp fibers include fibers derived from a fiber source selected from the group consisting of: Pine, Spruce, Fir, Tamarack, Hemlock, Cypress, and Cedar. In one example, the hardwood pulp fibers comprise tropical hardwood pulp fibers. Non-limiting examples of suitable tropical hardwood pulp fibers include Eucalyptus pulp fibers, Acacia pulp fibers, and mixtures thereof.

In one example, the wood pulp fibers comprise softwood pulp fibers derived from the kraft process and originating from southern climates, such as Southern Softwood Kraft (SSK) pulp fibers. In another example, the wood pulp fibers comprise softwood pulp fibers derived from the kraft process and originating from northern climates, such as Northern Softwood Kraft (NSK) pulp fibers.

The wood pulp fibers present in the fibrous structure may be present at a weight ratio of softwood pulp fibers to hardwood pulp fibers of from 100:0 and/or from 90:10 and/or from 86:14 and/or from 80:20 and/or from 75:25 and/or from 70:30 and/or from 60:40 and/or about 50:50 and/or to 0:100 and/or to 10:90 and/or to 14:86 and/or to 20:80 and/or to 25:75 and/or to 30:70 and/or to 40:60. In one example, the weight ratio of softwood pulp fibers to hardwood pulp fibers is from 86:14 to 70:30.

In one example, the fibrous structures of the present invention comprise one or more trichomes. Non-limiting examples of suitable sources for obtaining trichomes, especially trichome fibers, are plants in the Labiatae (Lamiaceae) family commonly referred to as the mint family. Examples of suitable species in the Labiatae family include *Stachys byzantina*, also known as *Stachys lanata* commonly referred to as lamb's ear, woolly betony, or woundwort. The term *Stachys byzantina* as used herein also includes cultivars *Stachys byzantina* 'Primrose Heron', *Stachys byzantina* 'Helene von Stein' (sometimes referred to as *Stachys byzantina* 'Big Ears'), *Stachys byzantina* 'Cotton Boll', *Stachys byzantina* 'Variegated' (sometimes referred to as *Stachys byzantina* 'Striped Phantom'), and *Stachys byzantina* 'Silver Carpet'.

Non-limiting examples of suitable polypropylenes for making the filaments of the present invention are commercially available from Lyondell-Basell and Exxon-Mobil.

Any hydrophobic or non-hydrophilic materials within the fibrous structure, such as polypropylene filaments, may be surface treated and/or melt treated with a hydrophilic modifier. Non-limiting examples of surface treating hydrophilic modifiers include surfactants, such as Triton X-100. Non-limiting examples of melt treating hydrophilic modifiers that are added to the melt, such as the polypropylene melt, prior to spinning filaments, include hydrophilic modifying melt additives such as VW351 and/or S-1416 commercially available from Polyvel, Inc. and Irgasurf commercially available from Ciba. The hydrophilic modifier may be associated with the hydrophobic or non-hydrophilic material at any suitable level known in the art. In one example, the hydrophilic modifier is associated with the hydrophobic or non-hydrophilic material at a level of less than about 20% and/or less than about 15% and/or less than about 10% and/or less than about 5% and/or less than about 3% to about 0% by dry weight of the hydrophobic or non-hydrophilic material.

The fibrous structures of the present invention may include optional additives, each, when present, at individual levels of from about 0% and/or from about 0.01% and/or from about 0.1% and/or from about 1% and/or from about 2% to about 95% and/or to about 80% and/or to about 50% and/or to about 30% and/or to about 20% by dry weight of the fibrous structure. Non-limiting examples of optional additives include permanent wet strength agents, temporary wet strength agents, dry strength agents such as carboxymethylcellulose and/or starch, softening agents, lint reducing agents, opacity increasing agents, wetting agents, odor absorbing agents, perfumes, temperature indicating agents, color agents, dyes, osmotic materials, microbial growth detection agents, antibacterial agents, liquid compositions, surfactants, and mixtures thereof.

The fibrous structure of the present invention may itself be a sanitary tissue product. It may be convolutedly wound about a core to form a roll. It may be combined with one or more other fibrous structures as a ply to form a multi-ply sanitary tissue product. In one example, a co-formed fibrous structure of the present invention may be convolutedly wound about a core to form a roll of co-formed sanitary tissue product. The rolls of sanitary tissue products may also be coreless.

Method for Making A Co-Formed Fibrous Structure

A non-limiting example of a method for making a fibrous structure according to the present invention comprises the steps of: 1) collecting a mixture of filaments and solid additives, such as fibers, for example pulp fibers, onto a collection device, for example a through-air-drying fabric or other fabric or a patterned molding member of the present invention. This step of collecting the filaments and solid additives on the collection device may comprise subjecting the co-formed fibrous structure while on the collection device to a consolidation step whereby the co-formed fibrous structure, while present on the collection device, is pressed between a nip, for example a nip formed by a flat or even surface rubber roll and a flat or even surface or patterned, heated (with oil) or unheated metal roll.

In another example, the co-forming method may comprise the steps of a) collecting a plurality of filaments onto a collection device, for example a belt or fabric, such as a patterned molding member, to form a scrim component (a meltblown fibrous structure. The collection of the plurality of filaments onto the collection device to form the scrim component may be vacuum assisted by a vacuum box.

Once the scrim component (meltblown fibrous structure) is formed on the collection device, the next step is to mix, such as commingle, a plurality of solid additives, such as fibers, for example pulp fibers, such as wood pulp fibers, with a plurality of filaments, such as in a coform box, and collecting the mixture on the scrim component carried on the collection device to form a core component. Optionally, an additional scrim component (meltblown fibrous structure) comprising filaments may be added to the core component to sandwich the core component between two scrim components.

The meltblown die used to make the meltblown fibrous structures and/or filaments herein may be a multi-row capillary die and/or a knife-edge die. In one example, the meltblown die is a multi-row capillary die.

NON-LIMITING EXAMPLES

Example 1

A 1.0 gsm meltblown fibrous structure 24 comprising meltblown filaments 23 is laid down upon a collection device 31, for example an Albany International Velostat170pc740 belt ("forming fabric"), (available from Albany International, Rochester, N.H.) traveling at 240 ft/min. The meltblown filaments 23 of the meltblown fibrous structure 24 are comprised of 48% LynondellBasell MF650x, 28% LynondellBasell MF650w, 17% LyondellBasell PH835, 5% Polyvel S1416, and 2% Ampacet 412951 and are spun from a die 25, for example a multi-row capillary Biax-Fiberfilm die (Biax-Fiberfilm Corporation, Greenville, Wis.), at a mass flow of 28 g/min and a ghm of 0.22 and is attenuated with 16.4 kg/min of 204° C. (400° F.) air. An example of this process is shown in FIG. 2B.

Then, fibers 27, for example pulp fibers such as 440 grams per minute of Koch Industries 4725 semi-treated SSK, are fed into a hammer mill 29 and individualized into fibers 27, for example cellulose pulp fibers, which are pneumatically conveyed into a coforming box, example of which is described in U.S. Patent Publication No. US 2016/0355950A1 filed Dec. 16, 2015, which is incorporated herein by reference. In the coforming box, the fibers 27, for example pulp fibers, are commingled with meltblown filaments 23. The meltblown filaments 23 are comprised of a blend of 48% LynondellBasell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary Biax-Fiberfilm die, at a ghm of 0.19 and a total mass flow of 93.48 g/min. The meltblown filaments 23 are attenuated with 14 kg/min of about 204° C. (400° F.) air. The mixture (commingled) fibers 27, for example cellulose pulp fibers and synthetic meltblown filaments 23 are then laid on top of the already formed 1.0 gsm of meltblown fibrous structure 24 in the form of a co-formed fibrous structure 22. An example of this process is shown in FIG. 2B.

Next, a 1.6 gsm meltblown fibrous structure 24 of the same composition as the meltblown fibrous structure 24 at 0.22 ghm and is attenuated with 16.4 kg/min of 204° C. (400° F.) air is laid down on top of the co-formed fibrous structure 22 such that the co-formed fibrous structure 22 is positioned between the first meltblown fibrous structure 24 and the second meltblown fibrous structure 24 forming a multi-fibrous structure. This multi-fibrous structure is then taken through a nip 33 formed between a steel roll 37 and the forming fabric (collection device 31), which is backed by a rubber roll 35, for example a 90 Shore A rubber roll, to form a co-formed fibrous web 28 (co-formed fibrous web ply), an example of which is shown in FIG. 2A. The steel roll 37 in this example is internally heated with oil to an oil temperature of about 132° C. (270° F.) and is loaded to approximately 90 PLI. The total basis weight of this co-formed fibrous web 28 (co-formed fibrous web ply) is 18.4 gsm. An example of this process is shown in FIG. 2B.

Two of these co-formed fibrous webs 28 (co-formed fibrous web plies) are then combined on the outside of two paper webs, for example two wet-laid fibrous structures 26 (wet-laid fibrous webs or wet-laid fibrous web plies) of 21 gsm to form an article 20 according to the present invention, as shown in FIG. 4. The paper webs, for example the wet-laid fibrous structures 26 are pre-formed on a continuous knuckle/discrete pillow patterned molding member with 25% knuckle area. The knuckles of the paper webs, for example the wet-laid fibrous structures are facing out relative to the article 20, as are the 1.6 gsm meltblown fibrous structures 24 (scrims), when present, relative to the article 20. In other words, when present, the meltblown fibrous structures 24 form at least one exterior surface of the article 20. The four fibrous webs (fibrous web plies) (co-formed fibrous web ply/wet-laid fibrous web ply/wet-laid fibrous web ply/co-formed fibrous web ply) are then bonded together at 60 feet per minute in a pin-pin steel thermal bond unit, oil heated to about 143° C. (290° F.) and loaded to 200 psi of pressure on two 2.5" diameter cylinders.

Each of the 21 gsm paper webs, for example wet-laid fibrous structures 26 are formed on an AstenJohnson 866A forming wire (AstenJohnson, Charleston, S.C.), then vacuum transferred to the patterned molding member described above. A pulp blend of 40% lightly refined GPOP NSK pulp (Georgia-Pacific Corporation, Atlanta, Ga.), 20% Alabama River southern softwood kraft (Georgia-Pacific Corporation, Atlanta, Ga.), and 40% eucalyptus pulp (Fibria Celulose S.A., São Paulo, Brazil). Wet-end additives include 10 #/ton Kymene, 2 #/ton Finnfix CMC and 1 #/T Wickit 1285 surfactant (all commercially available). The papermachine is run at 750 fpm Yankee speed in through-air-dry (TAD) mode, with 2% wet micro-contraction and 18% crepe. The wet-laid fibrous structure is creped from the Yankee with a 25 degree bevel creping blade and 81 degree impact angle. The wet-laid fibrous structure is then wound up on a papermachine reel that is run at 615 fpm to form a parent roll of a wet-laid fibrous web (wet-laid fibrous web ply). The parent roll is then unwound during the article making process.

Example 2

An approximately 1.0 gsm meltblown fibrous structure 24 is laid down upon a collection device 31, for example an Albany International Velostat170pc740 belt ("forming fabric") (available from Albany International, Rochester, N.H.) traveling at 240 ft/min. The meltblown filaments 23 of the meltblown fibrous structure 24 are comprised of 48% LynondellBasell MF650x, 28% LynondellBasell MF650w, 17% LyondellBasell PH835, 5% Polyvel S1416, and 2% Ampacet 412951 and are spun from a die 25, for example a multi-row capillary Biax-Fiberfilm die (Biax-Fiberfilm Corporation, Greenville, Wis.), at a mass flow of 28 g/min and a ghm of 0.22 and is attenuated with 16.4 kg/min of 204° C. (400° F.) air. An example of this process is shown in FIG. 2B.

Then, fibers 27, for example pulp fibers such as 440 grams per minute of Resolute CoosAbsorb ST semi-treated SSK (Resolut Forest Products, Montreal, Quebec, Canada), are fed into a hammer mill 29 and individualized into fibers 27, for example cellulose pulp fibers, which are pneumatically conveyed into a coforming box like Example 1 above. In the coforming box, the fibers 27, for example pulp fibers are commingled with meltblown filaments 23. The meltblown filaments 23 are comprised of a blend of 48% LynondellBasell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary die at a ghm of 0.19 and a total mass flow of 93.48 g/min like Example 1 above. The meltblown filaments 23 are attenuated with 14 kg/min of 204° C. (400° F.) air. The mixture (commingled) fibers 27, for example cellulose pulp fibers and synthetic meltblown filaments 23 are then laid on top of the already formed 1.0 gsm of meltblown fibrous structure 24 in the form of a co-formed fibrous structure 22. An example of this process is shown in FIG. 2B.

Next, a 1.6 gsm meltblown fibrous structure 24 of the same composition as the meltblown fibrous structure 24 at 0.22 ghm and is attenuated with 16.4 kg/min of 204° C. (400° F.) air is laid down on top of the co-formed fibrous structure 22 such that the co-formed fibrous structure 22 is positioned between the first meltblown fibrous structure 24 and the second meltblown fibrous structure 24 to form a multi-fibrous structure. This multi-fibrous structure is then taken through a nip 33 formed between a steel roll 37 and the forming fabric (collection device 31), which is backed by a rubber roll 35, for example a 90 Shore A rubber roll, to form a co-formed fibrous web 28 (co-formed fibrous web ply), an example of which is shown in FIG. 2A. The steel roll 37 in this example is internally heated with oil to an oil temperature of about 132° C. (270° F.) and is loaded to approximately 90 PLI. The total basis weight of this co-formed fibrous web 28 (co-formed fibrous web ply) is 18.4 gsm. An example of this process is shown in FIG. 2B.

Two of these co-formed fibrous webs 28 (co-formed fibrous web plies) are then combined on the outside of two paper webs, for example two wet-laid fibrous structures 26 (wet-laid fibrous webs or wet-laid fibrous web plies) of 21 gsm to form an article 20 according to the present invention, as shown in FIG. 4. The paper webs, for example wet-laid fibrous structures 26 are pre-formed on a continuous knuckle/discrete pillow patterned molding member with 45% knuckle area. The knuckles of the paper webs, for example wet-laid fibrous structures 26 are facing out relative to the article 20, as are the 1.6 gsm meltblown fibrous structures 24 (scrims), when present, relative to the article 20, such that at least one of the meltblown fibrous structures 24 forms an exterior surface of the article 20 when present. The four fibrous webs (fibrous web plies) (co-formed fibrous web ply/wet-laid fibrous web ply/wet-laid fibrous web ply/ co-formed fibrous web ply) are then bonded together at 60 feet per minute in a pin-pin steel thermal bond unit, oil heated to about 140° C. (285° F.) and loaded to 150 psi of pressure on two 2.5" diameter cylinders.

Each of the 21 gsm paper webs, for example wet-laid fibrous structures 26 is formed on an AstenJohnson 866A forming wire (AstenJohnson, Charleston, S.C.), then vacuum transferred to the patterned molding member described above. A pulp blend of 40% lightly refined GPOP NSK pulp (Georgia-Pacific Corporation, Atlanta, Ga.), 20% Alabama River southern softwood kraft (Georgia-Pacific Corporation, Atlanta, Ga.), and 40% eucalyptus pulp (Fibria Celulose S.A., São Paulo, Brazil). Wet-end additives include 10 #/ton Kymene, 2 #/ton Finnfix CMC and 1 #/T Wickit 1285 surfactant (all commercially available). The papermachine is run at 700 fpm Yankee speed in through-air-dry (TAD) mode, with 2% wet micro-contraction and 18% crepe. The wet-laid fibrous structure is creped from the Yankee with a 25 degree bevel creping blade and 81 degree impact angle. The wet-laid fibrous structure is then wound up on a papermachine reel that is run at 574 fpm (feet per minute) to form a parent roll of a wet-laid fibrous web (wet-laid fibrous web ply). The parent roll is then unwound during the article making process.

Example 3

A 28.2 gsm paper web, for example wet-laid fibrous structure 26 or wet-laid fibrous web (wet-laid fibrous web ply) made on a continuous knuckle/discrete pillow patterned molding member with 25% knuckle area is unwound upon an Albany International Velostat 170pc740 belt (Albany International) traveling at 155 fpm. Laid upon this paper web, for example wet-laid fibrous structure 26 is 2.0 gsm of a meltblown fibrous structure 24 comprising meltblown filaments 23 comprised of 48% LynondellBasell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary Biax-Fiberfilm die (Biax-Fiberfilm Corporation, Greenville, Wis.), at a ghm of 0.19 and a total mass flow of 93.48 g/min like Example 1 above. The meltblown filaments 23 are attenuated with 14 kg/min of 204° C. (400° F.) air. In this example this is now ply A.

An approximately 1.1 gsm meltblown fibrous structure 24 is laid down upon a collection device 31, for example an Albany International Velostat170pc740 belt ("forming fabric") (available from Albany International, Rochester, N.H.) traveling at 220 ft/min. The meltblown filaments 23 of the meltblown fibrous structure 24 are comprised of 48% LynondellBasell MF650x, 28% LynondellBasell MF650w, 17% LyondellBasell PH835, 5% Polyvel S1416, and 2% Ampacet 412951 and are spun from a die 25, for example a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, fibers 27, for example pulp fibers such as 400 grams per minute of Resolute CoosAbsorb ST semi-treated SSK (Resolut Forest Products, Montreal, Quebec, Canada), are fed into a hammer mill 29 and individualized into fibers 27, for example cellulose pulp fibers, which are pneumatically conveyed into a coforming box like Example 1 above. In the coforming box, the fibers 27, for example pulp fibers are commingled with meltblown filaments 23. The meltblown filaments 23 are comprised of a blend of 48% LynondellBasell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary Biax-Fiberfilm die (Biax-Fiberfilm Corporation, Greenville, Wis.) at a ghm of 0.19 and a total mass flow of 93.48 g/min like Example 1 above. The meltblown filaments 23 are attenuated with 14 kg/min of 204° C. (400° F.) air. The mixture (commingled) fibers 27, for example cellulose pulp fibers and synthetic meltblown filaments 23 are then laid on top of the already formed 1.1 gsm of meltblown fibrous structure 24 in the form of a co-formed fibrous structure 22. An example of this process is shown in FIG. 2B.

Next, a 1.6 gsm meltblown fibrous structure 24 of the same composition as the meltblown fibrous structure 24 at 0.22 ghm and is attenuated with 16.4 kg/min of 204° C. (400° F.) air is laid down on top of the co-formed fibrous structure 22 such that the co-formed fibrous structure 22 is positioned between the first meltblown fibrous structure 24 and the second meltblown fibrous structure 24 to form a multi-fibrous structure. This multi-fibrous structure is then taken through a nip 33 formed between a steel roll 37 and the forming fabric (collection device 31), which is backed by a rubber roll 35, for example a 90 Shore A rubber roll, to form a co-formed fibrous web 28 (co-formed fibrous web ply), an example of which is shown in FIG. 2A. The steel roll 37 in this example is internally heated with oil to an oil temperature of about 132° C. (270° F.) and is loaded to approximately 90 PLI. The total basis weight of this co-formed fibrous web 28 (co-formed fibrous web ply) is 19.4 gsm. An example of this process is shown in FIG. 2B. This is ply B in this example.

In a separate process, two ply A paper webs, for example wet-laid fibrous structures 26 and/or wet-laid fibrous webs are combined with a ply B co-formed fibrous web 28 to form an article 20 as shown in FIG. 18. The ply A paper webs, for example wet-laid fibrous structures 26 and/or wet-laid fibrous webs, are combined with the meltblown filaments 24 facing the outside of the article 20. These plies are then bonded together at 60 feet per minute in a pin-pin steel thermal bond unit, oil heated to about 140° C. (285° F.) and loaded to 150 psi pressure on two 2.5" diameter cylinders.

The 28.2 gsm paper web, for example wet-laid fibrous structure 26 and/or wet-laid fibrous web (wet-laid fibrous web ply) is formed on an AstenJohnson 866A forming wire (AstenJohnson) like above, then vacuum transferred to a continuous knuckle/discrete pillow patterned molding member with 25% knuckle area. A pulp fiber blend of 40% refined (to 15 PFR) GPOP NSK pulp (Georgia-Pacific Corporation), 30% West Fraser CTMP (West Fraser, Vancouver, British Columbia, Canada), and 30% eucalyptus pulp (Fibria Celulose S.A.) is used. Wet-end additives include 15 #/ton Kymene, 4.5 #/ton Finnfix CMC and 1 #/T Wickit 1285 surfactant (all commercially available). The papermachine is run at 600 fpm in through-air-dry (TAD) mode, with 10% wet micro-contraction and 10% crepe. The wet-laid fibrous structure is creped from the Yankee with a 25 degree bevel creping blade and 81 degree impact angle. The wet-laid fibrous structure is then wound up on a papermachine reel that is run at 555 fpm (feet per minute) to form a parent roll of a wet-laid fibrous web (wet-laid fibrous web ply). The parent roll is then unwound during the article making process.

Example 4

An approximately 1.1 gsm meltblown fibrous structure 24 is laid down upon a collection device 31, for example an Albany International Velostat170pc740 belt ("forming fabric") (available from Albany International, Rochester, N.H.) traveling at 215 ft/min (fpm). The meltblown filaments 23 of the meltblown fibrous structure 24 are comprised of 48% LynondellBasell MF650x, 28% LynondellBasell MF650w, 17% LyondellBasell PH835, 5% Polyvel S1416, and 2% Ampacet 412951 and are spun from a die 25, for example a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, fibers 27, for example pulp fibers such as 495 grams per minute of Resolute CoosAbsorb ST semi-treated SSK (Resolut Forest Products, Montreal, Quebec, Canada) are fed into a hammer mill 29 and individualized into fibers 27, for example cellulose pulp fibers, which are pneumatically conveyed into a coforming box like Example 1 above. In the coforming box, the fibers 27, for example pulp fibers are commingled with meltblown filaments 23. The meltblown filaments 23 are comprised of a blend of 48% LynondellBasell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary Biax-Fiberfilm die (Biax-Fiberfilm Corporation, Greenville, Wis.), at a ghm of 0.19 and a total mass flow of 93.48 g/min like Example 1 above. The meltblown filaments 23 are attenuated with 14 kg/min of 204° C. (400° F.) air. The mixture (commingled) fibers 27, for example cellulose pulp fibers and synthetic meltblown filaments 23 are then laid on top of the already formed 1.1 gsm of meltblown fibrous structure 24 in the form of a co-formed fibrous structure 22.

Next, a 1.6 gsm meltblown fibrous structure 24 of the same composition as the meltblown fibrous structure 24 at 0.22 ghm and is attenuated with 16.4 kg/min of 204° C. (400° F.) air is laid down on top of the co-formed fibrous structure 22 such that the co-formed fibrous structure 22 is positioned between the first meltblown fibrous structure 24 and the second meltblown fibrous structure 24 forming a multi-fibrous structure, a co-formed fibrous web 28. The total basis weight of this co-formed fibrous web 28 is 23.4 gsm. An example of this process is shown in FIG. 2B. This is now ply A in this example.

In a separate process, one ply A co-formed fibrous web 28 is combined between two 28.2 gsm paper webs, for example two wet-laid fibrous structures 26 or wet-laid fibrous webs (wet-laid fibrous web plies). These paper webs, for example wet-laid fibrous structures 26 and/or wet-laid fibrous webs are formed on a continuous knuckle molding member and are combined with the continuous pillow pattern facing outwards. These plies and/or fibrous structures and/or webs are then bonded together at 60 feet per minute in a pin-pin steel thermal bonding unit which is oil heated to an oil temp of about 160° C. (320° F.) and loaded to 200 psi of pressure on two 2.5" diameter cylinders.

The 28.2 gsm paper web, for example wet-laid fibrous structure 26 or wet-laid fibrous web (wet-laid fibrous web ply) is formed on an AstenJohnson 866A forming wire (AstenJohnson) like above, then vacuum transferred to a continuous pillow/discrete knuckle patterned molding member. A pulp fiber blend of 40% refined (to 15 PFR) GPOP NSK pulp (Georgia-Pacific Corporation), 30% West Fraser CTMP (West Fraser, Vancouver, British Columbia, Canada), and 30% eucalyptus pulp (Fibria Celulose S.A.) is used. Wet-end additives include 15 #/ton Kymene, 4.5 #/ton Finnfix CMC and 1 #/T Wickit 1285 surfactant (all commercially available). The papermachine is run at 700 fpm in through-air-dry (TAD) mode, with 15% wet micro-contraction and +5% crepe (reel faster than Yankee). The wet-laid fibrous structure is creped from the Yankee with a 45 degree bevel creping blade and 101 degree impact angle. The wet-laid fibrous structure is then wound up on a papermachine reel that is run at 735 fpm (feet per minute) to form a parent roll of a wet-laid fibrous web (wet-laid fibrous web ply). The parent roll is then unwound during the article making process.

Example 5

A 23.1 gsm paper web, for example a wet-laid fibrous structure 26 or wet-laid fibrous web (wet-laid fibrous web ply) which is made on a continuous knuckle/discrete pillow molding member with a 25% knuckle area is unwound onto a patterned molding member, knuckles facing away from the patterned molding member, traveling at 220 ft/minute.

Next, an approximately 1.1 gsm meltblown fibrous structure 24 is laid down upon the paper web, for example wet-laid fibrous structure 26 and/or wet-laid fibrous web. The meltblown filaments 23 of the meltblown fibrous structure 24 are comprised of 48% LynondellBasell MF650x, 28% LynondellBasell MF650w, 17% LyondellBasell PH835, 5% Polyvel S1416, and 2% Ampacet 412951 and are spun from a die 25, for example a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, fibers 27, for example pulp fibers such as 325 grams per minute of Resolute CoosAbsorb ST semi-treated SSK (Resolut Forest Products, Montreal, Quebec, Canada) are fed into a hammer mill 29 and individualized into fibers 27, for example cellulose pulp fibers, which are pneumatically conveyed into a coforming box like Example 1 above. In the coforming box, the fibers 27, for example pulp fibers are commingled with meltblown filaments 23. The meltblown filaments 23 are comprised of a blend of 48% Lynondell-Basell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary Biax-Fiberfilm die (Biax-Fiberfilm Corporation, Greenville, Wis.) at a ghm of 0.19 and a total mass flow of 93.48 g/min like Example 1 above. The meltblown filaments 23 are attenuated with 14 kg/min of 204° C. (400° F.) air. The mixture (commingled) fibers 27, for example cellulose pulp fibers and synthetic meltblown filaments 23 are then laid on top of the already formed 23.1 gsm paper web, for example wet-laid fibrous structure 26 and/or wet-laid fibrous web, which has its knuckles facing outward in the form of a co-formed fibrous structure 22.

Next, a 1.6 gsm meltblown fibrous structure 24 of the same composition at a ghm of 0.22 and attenuated with 16.4 kg/min of 204° C. (400° F.) air is laid down on top of the co-formed fibrous structure 22 to form a multi-fibrous structure. This multi-fibrous structure is then taken through a nip 33 formed between a steel roll 37 and the forming fabric (collection device 31), which is backed by a rubber roll 35, for example a 90 Shore A rubber roll. The steel roll 37 in this example is internally heated with oil to an oil temperature of about 132° C. (270° F.) and is loaded to approximately 90 PLI. The total weight of this web is about 40.1 gsm. In this example this is now ply A.

Then a 2.0 gsm meltblown fibrous structure 24 of the same composition, ghm, and attenuation air settings as described immediately above is applied to the surface of the paper web, for example wet-laid fibrous structure 26 of ply A. This multi-fibrous structure is now 42.1 gsm and is referred to as ply B in this example.

In a separate process, two ply B paper webs, for example two wet-laid fibrous structures 26 and/or wet-laid fibrous webs are combined with the paper webs, for example wet-laid fibrous structures 26 and/or wet-laid fibrous webs facing inward to form an article 20 as shown in FIGS. 22A and 22B. These plies, fibrous structures and/or web are then bonded together at 60 feet per minute in a pin-pin steel thermal bonding unit which is oil heated to an oil temp of about 143° C. (290° F.) and loaded to 200 psi of pressure on two 2.5" diameter cylinders. An example of this process is shown in FIG. 23B.

The 23.1 gsm paper web, for example wet-laid fibrous structure 26 and/or wet-laid fibrous web (wet-laid fibrous web ply) is formed on an AstenJohnson 866A forming wire (AstenJohnson), then vacuum transferred to a continuous knuckle/discrete pillow patterned molding member with 25% knuckle area. A pulp fiber blend of 40% unrefined GPOP NSK pulp (Georgia-Pacific Corporation), 20% West Fraser CTMP (West Fraser, Vancouver, British Columbia, Canada), and 40% eucalyptus pulp (Fibria Celulose S.A.) is used. Wet-end additives include 15 #/ton Kymene, 4.5 #/ton Finnfix CMC and 1 #/T Wickit 1285 surfactant (all commercially available). The papermachine is run at 700 fpm in through-air-dry (TAD) mode, with 2% wet micro-contraction and 18% crepe. The wet-laid fibrous structure is creped from the Yankee with a 25 degree bevel creping blade and 81 degree impact angle. The wet-laid fibrous structure is then wound up on a papermachine reel that is run at 574 fpm (feet per minute) to form a parent roll of a wet-laid fibrous web (wet-laid fibrous web ply). The parent roll is then unwound during the article making process.

Example 6

A 23.1 gsm paper web, for example a wet-laid fibrous structure 26 and/or wet-laid fibrous web (wet-laid fibrous web ply) which is made on a continuous knuckle/discrete pillow molding member with a 25% knuckle area is unwound onto a patterned molding member, knuckles facing away from the patterned molding member, traveling at 220 ft/minute.

Then, fibers 27, for example pulp fibers such as 325 grams per minute of Resolute CoosAbsorb ST semi-treated SSK (Resolut Forest Products, Montreal, Quebec, Canada) are fed into a hammer mill 29 and individualized into fibers 27, for example cellulose pulp fibers, which are pneumatically conveyed into a coforming box like Example 1 above. In the coforming box, the fibers 27, for example pulp fibers are commingled with meltblown filaments 23. The meltblown filaments 23 are comprised of a blend of 48% Lynondell-Basell MF650x, 28% LynondellBasell MF650w, 17% LyondellBasell PH835, 5% Polyvel S1416, and 2% Ampacet 412951. The meltblown filaments 23 are extruded/spun from a die 25, for example a multi-row capillary Biax-Fiberfilm die (Biax-Fiberfilm Corporation, Greenville, Wis.) at a ghm of 0.19 and a total mass flow of 93.48 g/min like Example 1 above. The meltblown filaments 23 are attenuated with 14 kg/min of 204° C. (400° F.) air. The mixture (commingled) fibers 27, for example cellulose pulp fibers and synthetic meltblown filaments 23 are then laid on top of the already formed 23.1 gsm paper web, for example wet-laid fibrous structure 26 and/or wet-laid fibrous web, which has its knuckles facing outward in the form of a co-formed fibrous structure 22.

Next, a 1.6 gsm meltblown fibrous structure 24 of the same composition at a ghm of 0.22 and attenuated with 16.4 kg/min of 204° C. (400° F.) air is laid down on top of the co-formed fibrous structure 22 forming a multi-fibrous structure. This multi-fibrous structure is then taken through a nip 33 formed between a steel roll 37 and the forming fabric (collection device 31), which is backed by a rubber roll 35, for example a 90 Shore A rubber roll. The steel roll 37 in this example is internally heated with oil to an oil temperature of about 132° C. (270° F.) and is loaded to approximately 90 PLI. The total basis weight of this combined multi-fibrous structure and/or multi-fibrous web is 39 gsm. This is now ply A in this example.

Then a 2.0 gsm meltblown fibrous structure 24 of the same composition, ghm, and attenuation air settings as described immediately above is applied to the surface of the paper web, for example wet-laid fibrous structure 26 of ply A. This multi-fibrous structure is now 41 gsm and is referred to as ply B in this example.

In a separate process, one ply A is combined with one ply B. These plies are then bonded together at 60 feet per minute in a pin-pin steel thermal bonding unit which is oil heated to an oil temp of about 143° C. (290° F.) and loaded to 200 psi of pressure on two 2.5" diameter cylinders.

The 23.1 gsm paper web, for example wet-laid fibrous structure 26 or wet-laid fibrous web (wet-laid fibrous web ply) is formed on an AstenJohnson 866A forming wire (AstenJohnson), then vacuum transferred to a continuous knuckle/discrete pillow patterned molding member with 25% knuckle area. A pulp fiber blend of 40% unrefined GPOP NSK pulp (Georgia-Pacific Corporation), 20% West Fraser CTMP (West Fraser, Vancouver, British Columbia, Canada), and 40% eucalyptus pulp (Fibria Celulose S.A.) is used. Wet-end additives include 15 #/ton Kymene, 4.5 #/ton Finnfix CMC and 1 #/T Wickit 1285 surfactant (all commercially available). The papermachine is run at 700 fpm in through-air-dry (TAD) mode, with 2% wet micro-contraction and 18% crepe. The wet-laid fibrous structure is creped from the Yankee with a 25 degree bevel creping blade and 81 degree impact angle. The wet-laid fibrous structure is then wound up on a papermachine reel that is run at 574 fpm (feet per minute) to form a parent roll of a wet-laid fibrous web (wet-laid fibrous web ply). The parent roll is then unwound during the article making process.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. These will be considered standard conditioning temperature and humidity. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, under the same environmental conditions in such conditioned room. Discard any damaged product. Do not test samples that have defects such as wrinkles, tears, holes, and like. All instruments are calibrated according to manufacturer's specifications. The stated number of replicate samples to be tested is the minimum number.

Basis Weight Test Method

Basis weight of an article and/or fibrous web and/or fibrous structure is measured on stacks of eight to twelve usable units using a top loading analytical balance with a resolution of ±0.001 g. A precision cutting die, measuring 8.890 cm by 8.890 cm or 10.16 cm by 10.16 cm is used to prepare all samples.

Condition samples under the standard conditioning temperature and humidity for a minimum of 10 minutes prior to cutting the sample. With a precision cutting die, cut the samples into squares. Combine the cut squares to form a stack eight to twelve samples thick. Measure the mass of the sample stack and record the result to the nearest 0.001 g.

Calculations:

$$\text{Basis Weight, g/m}^2 = \frac{\text{mass of stack}}{(\text{area of 1 square in stack})(\text{\# squares in stack})}$$

Report result to the nearest 0.1 g/m². Sample dimensions can be changed or varied using a similar precision cutter as mentioned above, so as at least 645 square centimeters of sample area is in the stack.

Individual fibrous structures and/or fibrous webs that are ultimately combined to form and article may be collected during their respective making operation prior to combining with other fibrous web and/or fibrous structures and then the basis weight of the respective fibrous web and/or fibrous structure is measured as outlined above.

Caliper Test Methods

Dry caliper of a fibrous structure and/or sanitary tissue product is measured using a ProGage Thickness Tester (Thwing-Albert Instrument Company, West Berlin, N.J.)

with a pressure foot diameter of 5.08 cm (area of 6.45 cm²) at a pressure of 14.73 g/cm². Four (4) samples are prepared by cutting of a usable unit such that each cut sample is at least 16.13 cm per side, avoiding creases, folds, and obvious defects. An individual specimen is placed on the anvil with the specimen centered underneath the pressure foot. The foot is lowered at 0.076 cm/sec to an applied pressure of 14.73 g/cm². The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Wet caliper is tested in the same manner, using 2 replicates. An individual replicate is placed on the anvil and wetted from the center, one drop at a time, with distilled or deionized water at the temperature of the conditioned room. Saturate the sample, adding enough water such that the sample is thoroughly wetted (from a visual perspective), with no observed dry areas anywhere on the sample. Continue with the measurement as described above.

Bulk Test Method

The Bulk of a fibrous structure and/or sanitary tissue product is calculated as the quotient of the Caliper and the Basis Weight (as described in the methods above) of a fibrous structure or sanitary tissue product. Values are expressed in cm³/g, by using the appropriate unit conversions. Dry Bulk is calculated using the Dry Caliper of the fibrous structure and/or sanitary tissue product; Wet Bulk is calculated using the Wet Caliper of the fibrous structure and/or sanitary tissue product.

Dry Tensile Strength Test Method

The Dry Tensile Strength Test Method is performed using a constant rate of extension tensile tester with computer interface (example: Thwing-Albert EJA Vantage tensile tester with Motion Analysis and Presentation software 3.0). The method reproducibly determines the dry strength of fibrous structures under fixed atmospheric conditions. The instrument is fitted with a set of grips (example: Thwing-Albert TAPPI Air Grips 733GC) into which a strip of sample is inserted. The grips are pulled in opposite directions until the sample fails (tears).

Substrates are conditioned by exposing them on a horizontal, flat surface and in a configuration of no more than 2 layers high in a room under standard conditioning temperature and humidity for a minimum of ten minutes. Samples are cut 25.4× at least 178 mm, four samples in the machine direction (MD) and four samples in the cross direction (CD).

Samples are aligned and centered in the grips of the tensile tester with minimal handling and handled only on the extreme ends of the strip (the portion of sample that will be engaged in the grips). The tension on the sample at test start is 0<3 g. The instrument is programmed to pull the grips in opposite directions at 10.16 cm/min. while recording the forces encountered during the test. The test stops when the measured force drops to 50% of peak. The test is repeated on each of the remaining seven samples. Values reported include Peak Tensile (g/in), Elongation at Peak Tensile (% elongation) and Tensile Energy Absorbed (TEA)—the area under the tensile strength vs. tensile strain curve.

Calculations:

Tensile Modulus at 38 g/in (g/cm*%): calculated as a linear regression of the 5 points before and 5 points after and at the force of 38.1 g/in. The tensile modulus is the slope of this regression.

Total Dry Tensile = avg. $MD$ Dry Tensile + avg. $CD$ Dry Tensile

Geometric Mean Dry $TEA$ = $\sqrt{\text{Avg. } MD \text{ Dry } TEA * \text{Avg. Dry } CD \text{ } TEA}$ Geometric Mean Dry Modulus = $\sqrt{\text{Avg. } MD \text{ Dry Modulus} * \text{Avg. Dry } CD \text{ Modulus}}$ Wet to Dry $CD$ $TEA$ $Ratio$ = $\dfrac{\text{avg. } CD \text{ WET } TEA}{\text{avg. } CD \text{ Dry } TEA}$ For each test, the stated value is the numerical average of the strips tested separately for the Machine Direction (MD) and the Cross Direction (CD).

Wet Tensile Strength Test Method

The Wet Tensile Strength Test Method is performed using a constant rate of extension tensile tester with computer interface (example: Thwing-Albert EJA Vantage tensile tester with Motion Analysis and Presentation software 3.0). The instrument is fitted with a set of grips (example: Thwing-Albert TAPPI Air Grips 733GC) and may be fitted with a Wet Tensile Device (example: Finch Wet Strength Device, Cat. No. 731D). If used, the device is clamped in the lower grip so that the horizontal rod is parallel to the grip faces and is otherwise symmetrically located with respect to the grips. During testing, the grips or the grip and device are pulled in opposite directions until the wetted sample fails (tears).

Substrates are conditioned by exposing them on a horizontal, flat surface and in a configuration of no more than 2 layers high in a room under standard conditioning temperature and humidity for a minimum of ten minutes.

For sheets with a length greater than 15.24 cm, samples are cut 2.54 cm× at least 15.2 cm each, four replicates in the machine direction and four replicates in the cross direction. The distance between the axis of the horizontal bar of the Wet strength device and the upper grip of the tensile tester is set to 10.16 cm. The liquid container of the Wet Strength Device is moved to its lowest position and filled with distilled water to within 3.2 mm of the top of the container. The horizontal rod and its supports are dried and the sample is threaded under the rod of the Wet Strength Device. The ends of the sample are placed together, removing any slack, centered with respect to the horizontal rod and the upper grip, and clamped in the upper grip of the tensile tester. The liquid container is raised so that it locks in its upper most position, immersing the looped end of the specimen to a depth of at least 1.91 cm. Exactly five seconds after the liquid container is raised in place and with the liquid container remaining in place, the tensile tester is engaged. The instrument is programmed to pull the grips in opposite directions at a speed of 10.16 cm/min. while recording the forces encountered during the test. The test is repeated on each of the remaining replicates.

Tensile Strength is Calculated By:

$$\text{avg. wet tensile strength} = \dfrac{\sum \text{peak loads for each test}}{2*n}$$

For samples less than 15.24 cm in length, four strips are cut 2.54 cm×6.35 cm (at a minimum, preferably 10.16 cm long), two in the MD and tow in the CD. The Wet Tensile Device is replaced with another set of grips. In such cases, the grips are set to a distance of 5.08 cm apart and one end of the sample is placed in each grip. The sample should be nearly straight between the grips with no more than 5.0 g of force on the load cell. The sample is squirted with distilled or deionized water from a spray bottle to the point of saturation (until no dry area is observed) at which point the instrument is engaged. The grips are separated at a speed of 5.08 cm/min. and the force at tearing is recorded. The test is repeated on each of the remaining replicates.

Tensile Strength is Calculated By:

$$\text{avg. wet tensile strength} = \frac{\sum(\text{peak loads for each test})}{\#\text{reps}}$$

The test stops when the measured force drops to 50% of peak. The test outputs:
Peak Tensile (g/in): The measured value is divided by 2 for the full sheet because the sample curves around the Finch cup and returns.
Elongation at Peak Tensile (% elongation)
TEA (g*in/in$^2$): Tensile Energy Absorbed: area under the tensile strength vs. tensile strain curve.
Tensile Modulus at 38 g/in (g/cm*%)
  Linear regression of the 5 points before, 5 points after and at the force of 38.1 g/in. The tensile modulus is the slope of this regression.
Total Wet Tensile:

Total Wet Tensile=Average MD Wet Tensile+Average CD Wet Tensile

Geometric Mean Wet TEA:

Geometric Mean Wet TEA= $\sqrt{\text{AverageMDWetTEA}*\text{AverageCDWetTEA}}$

For each test, the stated value is the numerical average of the strips tested separately for the Machine Direction (MD) and Cross Direction (CD).

Flexural Rigidity and Bending Modulus Test Method

The Flexural Rigidity Method determines the overhang length of the present invention based on the cantilever beam principal. The distance a strip of sample can be extended beyond a flat platform before it bends through a specific angle is measured. The inter-action between sheet weight and sheet stiffness measured as the sheet bends or drapes under its own weight through the given angle under specified test conditions is used to calculate the sample Bend Length, Flexural Rigidity, and Bending Modulus.

The method is performed by cutting rectangular strips of samples of the fibrous structure to be tested, in both the cross direction and the machine direction. The Basis Weight of the sample is determined and the Dry Caliper of the samples is measured (as detailed previously). The sample is placed on a test apparatus that is leveled so as to be perfectly horizontal (ex: with a bubble level) and the short edge of the sample is aligned with the test edge of the apparatus. The sample is gently moved over the edge of the apparatus until it falls under its own weight to a specified angle. At that point, the length of sample overhanging the edge of the instrument is measured.

The apparatus for determining the Flexural Rigidity of fibrous structures is comprised of a rectangular sample support with a micrometer and fixed angle monitor. The sample support is comprised of a horizontal plane upon which the sample rectangle can comfortably be supported without any interference at the start of the test. As it is slowly pushed over the edge of the apparatus, it will bend until it breaks the plane of the fixed angle monitor, at which point the micrometer measures the length of overhang.

Eight samples of 25.4×101.5–152.0 mm are cut in the machine direction (MD); eight more samples of the same size are cut in the cross direction (CD). It is important that adjacent cuts are made exactly perpendicular to each other so that each angle is exactly 90 degrees. Samples are arranged such that the same surface is facing up. Four of the MD samples are overturned and four of the CD samples are overturned and marks are made at the extreme end of each, such that four MD samples will be tested with one side facing up and the other four MD samples will be tested with the other side facing up. The same is true for the CD samples with four being tested with one side up and four with the other side facing up.

A sample is then centered in a channel on the horizontal plane of the apparatus with one short edge exactly aligned with the edge of the apparatus. The channel is slightly oversized for the sample that was cut and aligns with the orientation of the rectangular support, such that the sample does not contact the sides of the channel. A lightweight slide bar is lowered over the sample resting in the groove such that the bar can make good contact with the sample and push it forward over the edge of the apparatus. The leading edge of the slide bar is also aligned with the edge of the apparatus and completely covers the sample. The micrometer is aligned with the slide bar and measures the distance the slide bar, thus the sample, advances.

From the back edge of the slide bar, the bar and sample are pushed forward at a rate of approximately 8-13 cm per second until the leading edge of the sample strip bends down and breaks the plane of the fixed angle measurement, set to 45°. At this point, the measurement for overhang is made by reading the micrometer to the nearest 0.5 mm and is reported in units of cm.

The procedure is repeated for each of the 15 remaining samples of the fibrous structure.

Calculations:
Flexural Rigidity is calculated from the overhang length as follows:

Bend Length=Overhang length/2

Where overhang length is the average of the 16 results collected.

The calculation for Flexural Rigidity (G) is:

$G=0.1629*W*C^3$ (mg·cm)

Where W is the sample basis weight in pounds/3000 ft2 and C is the bend lenth in cm. The constant 0.1629 converts units to yield Flexural Rigidity (G) in units of milligram·cm·grams.

Bending Modulus(Q) =

Flexural Rigidity(G)/Moment of Inertia (I) per unit area.

$Q = G/I$ $$Q = \frac{732*G}{\text{Caliper (mils)}^3}$$

Plate Stiffness Test Method

As used herein, the "Plate Stiffness" test is a measure of stiffness of a flat sample of a fibrous structure and/or sanitary tissue product as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material the deflection can be predicted by:

$$w = \frac{3F}{4\pi Et^3}(1-v)(3+v)R^2$$

where "E" is the effective linear elastic modulus, "v" is the Poisson's ratio, "R" is the radius of the hole, and "t" is the thickness of the tissue, taken as the caliper in millimeters measured on a stack of 4 or 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3}\frac{F}{w}$$

The test results are carried out using an MTS Alliance RT/1, Insight Renew, or similar model testing machine (MTS Systems Corp., Eden Prairie, Minn.), with a 50 newton load cell, and data acquisition rate of at least 25 force points per second. As a stack of four tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. When the probe tip descends to 1 mm below the plane of the support plate, the test is terminated. The maximum slope (using least squares regression) in grams of force/mm over any 0.5 mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

Calculations:
The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with the different sample stacks). Thus, eight S values are calculated from four 4-sheet stacks of the same sample. The numerical average of these eight S values is reported as Plate Stiffness for the sample.

Plate Stiffness, Basis Weight Normalized is the quotient of the Average Plate Stiffness, S, in N·mm and the Basis Weight, in grams per square meter (gsm), per the Basis Weight Test Method.

$$\text{Plate Stiffness, } BW \text{ Normalized} = \frac{\text{Avg Plate Stiffness, } 'S'(N*mm)}{BW(gsm)}$$

Dry Compressive Modulus Test Method

Compression caliper and compressive modulus are determined using a tensile tester (Ex. EJA Vantage, Thwing-Albert, West Berlin N.J.) fitted with the appropriate compression fixtures (such as a compression foot that has an area of 6.45 cm and an anvil that has an area of 31.67 cm). The thickness (caliper in mils) is measured at various pressure values ranging from 10-1500 g/in² in both the compression and relaxation directions.

Condition the samples by placing them out on a flat surface, no more than 2 layers high, in a room at standard conditioning temperature and pressure for a minimum of 10 minutes. For large samples (larger than 27.94 cm on each side), measurements are taken at the 4 corners, at least 1.5 cm from the edges. For samples smaller than this, take measurements at least 1.5 cm from the edge on multiple sheets if necessary to record measurements from 4 reps.

Place the sample portion on the anvil fixture. Ensure the sample portion is centered under the foot so that when contact is made the edges of the sample will be avoided. Measure four replicates per sample at a crosshead speed of 0.254 cm/min. The values reported under each pressure value are the compressive caliper values. Report the average of the 4 compressive caliper replicates for each sample.

The thickness (mils) vs. pressure data (g/in², or gsi) is used to calculate the sample's compressibility, "near-zero load caliper" and compressive modulus. A least-squares linear regressions performed on the thickness vs. the logarithm (base10) of the applied pressure data between and including 10 gsi and 300 gsi. For the 1500 gsi script that is referenced and applied in this method, this involves 9 data points at pressures at 10, 25, 50, 75, 100, 125, 150, 200, 300 gsi and their respective thickness readings. Compressibility (m) equals the slope of the linear regression line, with units of mils/log(gsi). The higher the magnitude of the negative value the more "compressible" the sample is. Near-zero load caliper (b) equals the y-intercept of the linear regression line, with units of mils. This is the extrapolated thickness at log(1 gsi pressure). Compressive Modulus is calculated as the y-intercept divided by the negative slope (−b/m) with units of log(gsi).

Dry Thick Compression=−1* Near-Zero Load Caliper (b) * Compressibility (m), with units of mils* mils/log (gr force/in²). Multiplication by −1 turns formula into a positive. Larger results represent thick products that compress when a pressure is applied.

Dry Thick Compressive Recovery=−1* Near-Zero Load Caliper (b) * Compressibility (m) * Recovered thickness at 10 g/in²/Compressed thickness at 10 g/in², with units of mils* mils/log (g force/in²). Multiplication by −1 turns formula into a positive. Larger results represent thick products that compress when a pressure is applied and maintain fraction recovery at 10 g/in². Compressed thickness at 10 g/in² is the thickness of the material at 10 g/in² pressure during the compressive portion of the test. Recovered thickness at 10 g/in² is the thickness of the material at 10 g/in² pressure during the recovery portion of the test.

Report the thickness readings to the nearest 0.1 mils for the average of the 4 replicate measurements for each compression pressures of interest. Report the average of the 4 replicate measurements for each calculated value: slope to the nearest 0.01 mils/log(gsi); near-zero load caliper to the nearest 0.1 mils and compressive modulus to the nearest 0.01 log(gsi).

Wet Compressive Modulus Test Method

Compression caliper and compressive modulus are determined using a tensile tester (Ex. EJA Vantage, Thwing-Albert, West Berlin N.J.) fitted with the appropriate compression fixtures (such as a compression foot that has an area of 6.45 cm and an anvil that has an area of 31.67 cm). The thickness (caliper in mils) is measured at various pressure values ranging from 10-1500 g/in² in both the compression and relaxation directions, on a fully wetted fibrous structure.

Samples should be cut slightly larger than the compression anvil, but small enough that the sample does not hang over the sides of the compression fixture top plate. Take measurements at least 1.5 cm from the edges to record measurements from 3 reps.

Place the sample portion on the anvil fixture. Ensure the sample portion is centered under the foot so that when contact is made the edges of the sample will be avoided. Saturate the sample with distilled or deionized water until there is no observable dry area remaining. Sample should be saturated but not so wet as to run off the sample. Measure four replicates per sample at a crosshead speed of 0.254 cm/min. The values reported under each pressure value are the compressive caliper values. Report the average of the 3 compressive caliper replicates for each sample.

The thickness (mils) vs. pressure data (g/in², or gsi) is used to calculate the sample's compressibility, "near-zero load caliper" and compressive modulus. A least-squares linear regressions performed on the thickness vs. the logarithm (base10) of the applied pressure data between and including 10 gsi and 300 gsi. For the 1500 gsi script that is referenced and applied in this method, this involves 9 data points at pressures at 10, 25, 50, 75, 100, 125, 150, 200, 300 gsi and their respective thickness readings. Compressibility (m) equals the slope of the linear regression line, with units of mils/log(gsi). The higher the magnitude of the negative value the more "compressible" the sample is. Near-zero load caliper (b) equals the y-intercept of the linear regression line, with units of mils. This is the extrapolated thickness at log(1 gsi pressure). Compressive Modulus is calculated as the y-intercept divided by the negative slope (-b/m) with units of log(gsi).

Wet Thick Compressio=-1* Near-Zero Load Caliper (b) * Compressibility (m), with units of mils* mils/log (gr force/in²). Multiplication by -1 turns formula into a positive. Larger results represent thick products that compress when a pressure is applied.

Wet Thick Compressive Recovery=-1* Near-Zero Load Caliper (b) * Compressibility (m) * Recovered thickness at 10 g/in²/Compressed thickness at 10 g/in², with units of mils* mils/log (g force/in²). Multiplication by -1 turns formula into a positive. Larger results represent thick products that compress when a pressure is applied and maintain fraction recovery at 10 g/in². Compressed thickness at 10 g/in² is the thickness of the material at 10 g/in² pressure during the compressive portion of the test. Recovered thickness at 10 g/in² is the thickness of the material at 10 g/in² pressure during the recovery portion of the test.

Report the thickness readings to the nearest 0.1 mils for the average of the 3 replicate measurements for each compression pressures of interest. Report the average of the 3 replicate measurements for each calculated value: slope to the nearest 0.01 mils/log(gsi); near-zero load caliper to the nearest 0.1 mils and compressive modulus to the nearest 0.01 log(gsi).

Low Load Wet Resiliency Test Method

Low Load Wet Resiliency is the ratio of C10 Wet (Compressed wet thickness at 10 g/in²) as measured according to the Wet Compressive Modulus Test Method above to C10 Dry (Compressed dry thickness at 10 g/in²) as measured according to the Dry Compressive Modulus Test Method above.

Mid Load Wet Resiliency Test Method

Mid Load Wet Resiliency is the ratio of C100 Wet (Compressed wet thickness at 100 g/in²) as measured according to the Wet Compressive Modulus Test Method above to C100 Dry (Compressed dry thickness at 100 g/in²) as measured according to the Dry Compressive Modulus Test Method above.

Absorptive Rate and Capacity (CRT) Test Method

The absorption (wicking) of water by a fibrous structure is measured over time by a CRT device. The device consists of a balance (sensitive to 0.001 g) on which rests a sample platform made of a woven grid (using nylon monofilament line having a 0.356 mm diameter) placed over a small reservoir with a delivery tube (8 mm I.D.) in the center. This reservoir is filled with distilled or deionized water by the action of solenoid valves, which connect the sample supply reservoir to an intermediate reservoir, the water level of which is monitored by an optical sensor. The device is connected to software that records the weight of the water absorbed over 2 seconds time by the fibrous structure. Final weight is also recorded at saturation.

For this method, a usable unit is described as one finished product unit regardless of the number of plies. Samples are placed no more than 2 layers high on a flat surface at standard conditioning temperature and humidity for a minimum of 10 minutes. Cut samples into circles of 7.62 cm, at least 2.54 cm from any edge, cutting 2 replicates for each test.

Set the supply tube 2 mm below the woven grid and place the circular sample on the grid. The software records the weight of water acquisition and the time and from this calculates the rate (in g/second) and the capacity (grams water/gram fibrous structure).

Slope of the Square Root of Time (SST) Test Method

This method is a modification of the CRT method described previously. Samples are cut to a diameter of 8.57 cm and a cover is used to increase the contact of the sample with the woven support. The device is the same structure and the software records the rate of acquisition between 2 and 15 seconds. The calculated result is the slope of the line plotting the cumulative water absorption (g) and the square root of the acquisition time (sec²).

Pore Volume Distribution Test Method

Pore Volume Distribution measurements are made on a TRI/Autoporosimeter (TRI/Princeton Inc. of Princeton, N.J.). The TRI/Autoporosimeter is an automated computer-controlled instrument for measuring pore volume distributions in porous materials (e.g., the volumes of different size pores within the range from 1 to 1000 μm effective pore radii). Complimentary Automated Instrument Software, Release 2000.1, and Data Treatment Software, Release 2000.1 is used to capture, analyze and output the data. More information on the TRI/Autoporosimeter, its operation and data treatments can be found in The Journal of Colloid and Interface Science 162 (1994), pgs 163-170, incorporated here by reference.

As used in this application, determining Pore Volume Distribution involves recording the increment of liquid that enters a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship.

$$\text{Pressure differential} = [(2)\gamma \cos\Theta]/\text{effective radius}$$

where $\gamma$=liquid surface tension, and $\Theta$=contact angle.

Typically pores are thought of in terms such as voids, holes or conduits in a porous material. It is important to note that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide an accepted means to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed at each pressure increment is the cumulative volume for the group of all pores between the preceding pressure setting and the current setting.

In this application of the TRI/Autoporosimeter, the liquid is a 0.2 weight % solution of octylphenoxy polyethoxy ethanol (Triton X-100 from Sigma-Aldrich) in distilled water. The instrument calculation constants are as follows: $\rho$ (density)=1 g/cm$^3$; $\gamma$ (surface tension)=31 dynes/cm; cos $\Theta$=1. A 1.2 μm Millipore Glass Filter (Millipore Corporation of Bedford, Mass.; Catalog #GSWP09025) is employed on the test chamber's porous plate. A plexiglass plate weighing about 34 g (supplied with the instrument) is placed on the sample to ensure the sample rests flat on the Millipore Filter. No additional weight is placed on the sample.

The remaining user specified inputs are described below. The sequence of pore sizes (pressures) for this application is as follows (effective pore radius in um): 1, 2.5, 5, 10, 15, 20, 30, 40, 50, 60, 70, 80, 90, 100, 120, 140, 160, 180, 200, 225, 250, 275, 300, 350, 400, 500, 600, 800, 1000. This sequence starts with the sample dry, saturates it as the pore settings increase (typically referred to with respect to the procedure and instrument as the 1$^{st}$ absorption).

In addition to the test materials, a blank condition (no sample between plexiglass plate and Millipore Filter) is run to account for any surface and/or edge effects within the chamber. Any pore volume measured for this blank run is subtracted from the applicable pore grouping of the test sample. Any potential negative values are given a value of zero. This data treatment can be accomplished manually or with the available TRI/Autoporosimeter Data Treatment Software, Release 2000.1.

Percent (%) Total Pore Volume is a percentage calculated by taking the volume of fluid in the specific pore radii range divided by the Total Pore Volume. The Total Pore Volume is the sum of the fluid absorbed between 2.5-1000 micron radii. The TRI/Autoporosimeter outputs the volume of fluid within a range of pore radii. The first data obtained is for the "5 micron" pore radii which includes fluid absorbed between the pore sizes of 2.5 to 5 micron radius. The next data obtained is for "10 micron" pore radii, which includes fluid absorbed between the 5 and 10 micron radii, and so on. Following this logic, to obtain the volume held within the range of 91-140 micron radii, one would sum the volumes obtained in the range, or bucket, titled "100 micron", "110 micron", "120 micron", "130 micron", and finally the "140 micron" pore radii ranges. For example, % Total Pore Volume 91-140 micron pore radii=(volume of fluid between 91-140 micron pore radii)/Total Pore Volume.

2.5-30 micron % Total Volume $$2.5 - 30 \text{ micron \% Total Volume} = \frac{\sum 5, 10, 15, 20, 30 \text{ micron Pore Buckets}}{\text{Total Pore Volume}} * 100$$

301-600 micron % Total Volume $$301 - 600 \text{ micron \% Total Volume} = \frac{\sum 350, 400, 500, 600 \text{ micron Pore Buckets}}{\text{Total Pore Volume}} * 100$$

>225 micron % Total Volume $$> 225 \text{ micron \% Total Volume} = \frac{\sum 250, 275, 300, 350, 400, 500, 600, 800, 1000 \text{ micron Pore Buckets}}{\text{Total Pore Volume}} * 100$$

Horizontal Full Sheet (HFS) Test Method

The Horizontal Full Sheet (HFS) test method determines the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a horizontal position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the HFS capacity of fibrous structures comprises the following:

An electronic balance with a sensitivity of at least ±0.01 grams and a minimum capacity of 1200 grams. The balance should have a special balance pan to be able to handle the size of the sample tested (i.e.; a fibrous structure sample of about 27.9 cm by 27.9 cm).

Figure 31:
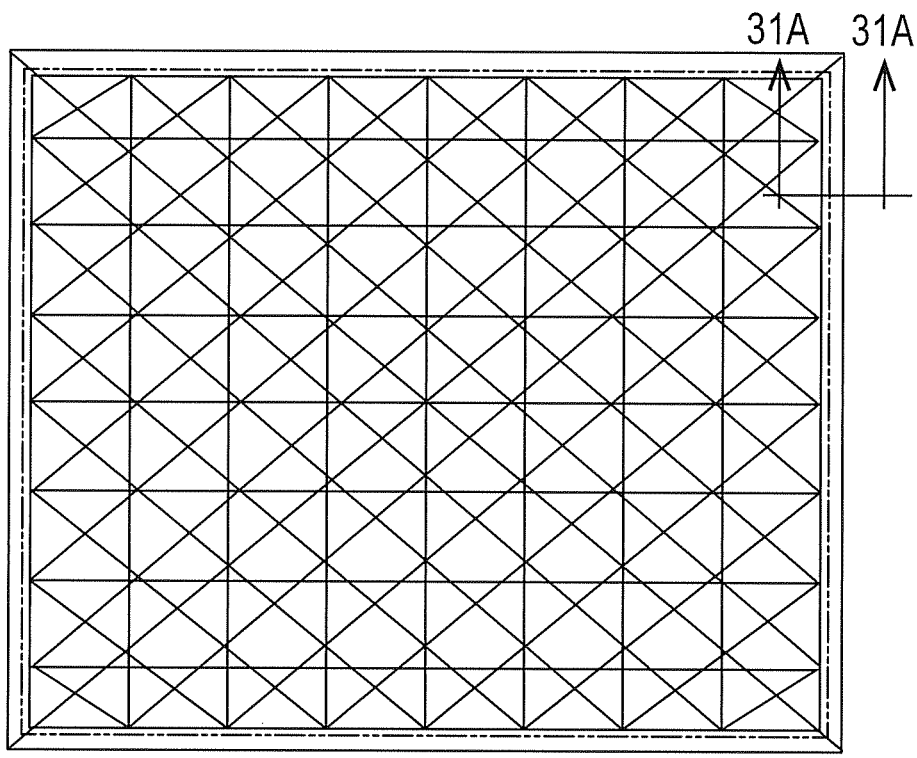
FIG. 31 is an example of a sample support rack used in the HFS and VFS Test Methods.

A sample support rack (FIGS. 31 and 31A) and sample support rack cover (FIGS. 32 and 32A) is also required. Both the support rack (FIGS. 31 and 31A) and support rack cover (FIGS. 32 and 32A) are comprised of a lightweight metal frame, strung with 0.305 cm diameter monofilament so as to form a grid as shown in FIG. 31. The size of the support rack (FIGS. 31 and 31A) and support rack cover (FIGS. 32 and 32A) is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

Figure 31A:
FIG. 31A is a cross-sectional view of the sample support rack of FIG. 31.

Samples are tested in duplicate. The dry weight of each sample is reported to the nearest 0.01 grams. The empty sample support rack (FIGS. 31 and 31A) is placed on the balance with the special balance pan described above. The balance is then zeroed (tared). One sample is carefully placed on the sample support rack (FIGS. 31 and 31A), "face up" or with the outside of the sample facing up, away from the sample support rack (FIGS. 31 and 31A). The support rack cover (FIGS. 32 and 32A) is placed on top of the support rack (FIGS. 31 and 31A). The sample (now sandwiched between the rack and cover) is submerged in the water reservoir. After the sample is submerged for 30±3 seconds, the sample support rack (FIGS. 31 and 31A) and support rack cover (FIGS. 32 and 32A) are gently raised out of the reservoir.

Figure 32:
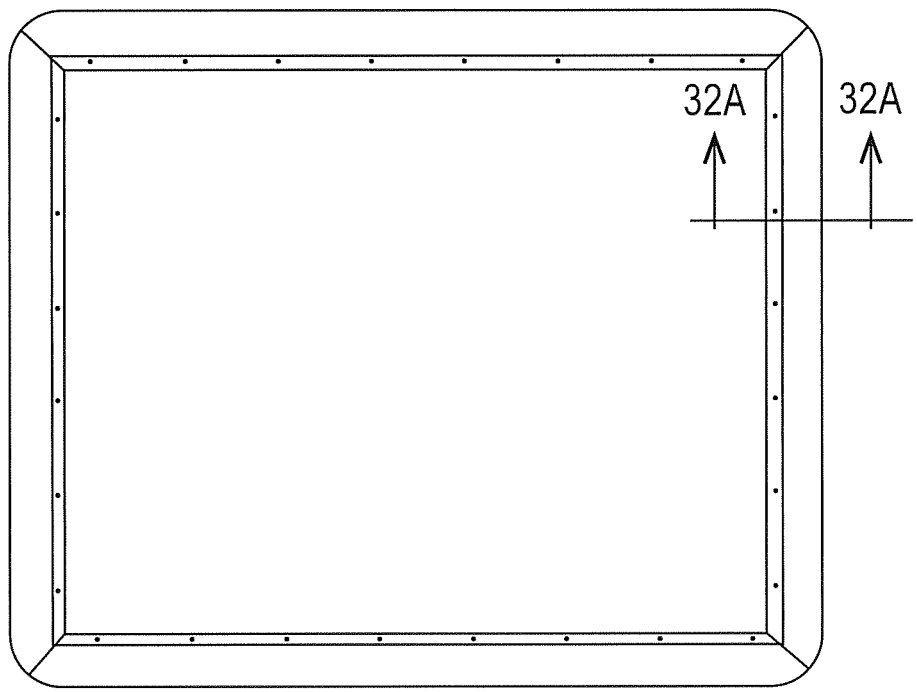
FIG. 32 is an example of a sample support rack cover used in the HFS and VFS Test Methods.
Figure 32A:
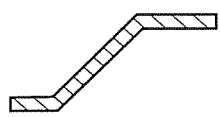
FIG. 32A is a cross-sectional view of the sample support rack cover of FIG. 32.

The sample, support rack (FIGS. 31 and 31A) and support rack cover (FIGS. 32 and 32A) are allowed to drain horizontally for 120±5 seconds, taking care not to excessively shake or vibrate the sample. While the sample is draining, the support rack cover (FIGS. 32 and 32A) is carefully removed and all excess water is wiped from the support rack (FIGS. 32 and 32A). The wet sample and the support rack (FIGS. 31 and 31A) are weighed on the previously tared balance. The weight is recorded to the nearest 0.01 g. This is the wet weight of the sample.

The horizontal absorbent capacity (HAC) is defined as: absorbent capacity=(wet weight of the sample−dry weight of the sample)/(dry weight of the sample) and has a unit of gram/gram.

Vertical Full Sheet (VFS) Test Method

The Vertical Full Sheet (VFS) test method is similar to the HFS method described previously, and determines the amount of distilled water absorbed and retained by a fibrous structure when held at an angle of 60° to 75°.

After taking weights for the HFS method, the support rack (FIGS. 31 and 31A) and sample are removed from the balance and inclined at an angle of 60°-90° and allowed to drain for 60±5 seconds. Care should be taken so that the sample does not slide or move relative to the support rack (FIGS. 31 and 31A). If there is difficulty keeping the sample from sliding down the support rack (FIGS. 31 and 31A) sample can be held with the fingers.

At the end of this time frame, carefully bring the sample and support rack (FIGS. 31 and 31A) to the horizontal position and wipe the bottom edge of the sample support rack (FIGS. 31 and 31A) that water dripped onto during vertical drainage. Return the sample and support rack (FIGS. 31 and 31A) to the balance and take the weight to the nearest 0.01 g.

The gram per fibrous structure sample absorptive capacity of the sample is defined as (wet weight of the sample−dry weight of the sample). The calculated VFS is the average of the absorptive capacities of the two samples of the fibrous structure.

Wet Burst Test Method

This Wet Burst Test Method measures the push through force required to burst wetted fibrous structures using a tensile tester with the appropriate attachments (ex: Thwing-Albert EJA Vantage Burst Tester) and run at a speed of 12.7 cm/second. A useable unit here is one finished product unit, regardless of the number of plies. Cut samples into squares or rectangles not less than 28 cm per side, in replicates of 4 per sample.

Fill a sample pan with distilled or deionized water to a depth of 2.54 cm. Holding a sample by the outermost edges, dip the center of the sample into the pan, leaving the sample in the water for 4±0.5 seconds. Remove the sample and drain in a vertical position for 3±0.5 seconds. Immediately center the wet sample on the lower ring of the sample holding device, with the outside surface positioned away from the burst device. The sample must be large enough to allow clamping without slippage. Lower the upper ring of the pneumatic holding device to secure the sample. The test measurement starts at a pre-tension of 4.45 g. Start the plunger and record the maximum force when the plunger ruptures the sample. The test is over when the load falls 20 g from the peak force.

Some Burst testers use an upward force measurement and some a downward force measurement. For the former, take care to deduct the sample weight that adds to the upward force used to burst.

In some cases, it is desirable to measure an aged sample to better predict product performance after aging in a warehouse, during shipping or in the marketplace. One way to rapidly age a sample is attach a paperclip to an outer edge of the 4 replicate stack, fan out the unclipped end of the sample stack and suspend them in a forced draft oven set to 105±1° C. for 5 minutes±10 seconds. Remove the sample stack from the oven and cool for a minimum of 3 minutes before testing.

Calculations:

$$\text{Wet Burst} = \frac{\sum \text{peak load readings}}{\#\text{replicates}}$$

The Burst Energy Absorption (BEA) is the area of the stress/strain curve between pre-tension and peak load.

Dry Burst Test Method

The Dry Burst Test Method is similar to the Wet Burst Test Method previously described. Samples are cut as in the Wet Burst method and tested dry, in replicates of 4.

Calculations:

$$\text{Dry Burst} = \frac{\sum \text{peak load readings}}{\#\text{replicates}}$$

The Burst Energy Absorption (BEA) is the area of the stress/strain curve between pre-tension and peak load.

Liquid Breakthrough Test Method

This method measures the breakthrough capacity of a fibrous substance subjected to a stream of water, which corresponds to hand protection herein. The apparatus consists of a balance (accurate to 0.01 g) and able to output data to a software interface at 10 hz. A shallow pan is placed on the balance and a rack, capable of holding the sample, is set 15.24 cm above the balance. A reservoir is filled with distilled or deionized water and this water is pumped at 5 mL/second to an outlet just above the rack holding the sample.

Two rectangular pieces of impermeable material are cut such that there is an opening of 5×10 inches. The fibrous substance is placed between these 2 templates, MD along the 5 inch side and CD along the 10 inch side, and clamped tightly. The template holding the sample is placed in the rack, outside of the sample facing up. (Sample could also be tested outside facing down, if noted.)

The outlet of the tubing (4.76 mm ID) is placed such that the discharge of the tube is horizontal and located just above the top surface of the sample, approximately 1 inch from one MD edge and in the center of the CD dimension. The tube is oriented so that the discharge of the water is in the MD direction. Water is pumped at 5 mL/second±0.25 mL onto the top of the sample. A timer starts when the water hits the top of the sample and the scale begins outputting weight every 0.1 seconds to an electronic file.

A blank is run, before testing any samples, recording the time from the very start of water leaving the tube to the point at which 0.15 g of water is collected in the pan. This "blank time" is a function of the experimental geometry and not the sample being tested.

The value reported is the time that it takes for 0.15 g of water to pass through the sample and into the pan, minus the blank time, recording which side of the sample was upward facing.

Emtec Test Method

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Test samples are prepared by cutting square or circular samples from a finished product. Test samples are cut to a length and width (or diameter if circular) of no less than about 90 mm, and no greater than about 120 mm, in any of these dimensions. Prepare 8 substantially similar replicate samples for testing.

Mount the test sample into the instrument, and perform the test according to the manufacturer's instructions. When complete, the software displays values for TS7 and TS750. Record each of these values to the nearest 0.01 dB V$^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB V$^2$ rms. Additionally, average together all eight test value results for TS7 and TS750, and report the overall average values for TS7 and TS750 on a particular test sample to the nearest 0.01 dB V$^2$ rms.

Average Diameter Test Method

There are many ways to measure the diameter of a fiber. One way is by optical measurement. An article and/or fibrous web and/or fibrous structure comprising filaments is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Roll Firmness Test Method

Roll Firmness is measured on a constant rate of extension tensile tester with computer interface (a suitable instrument is the MTS Alliance using Testworks 4.0 Software, as available from MTS Systems Corp., Eden Prairie, Minn.) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2C° and 50%±2% relative humidity.

Figure 33:
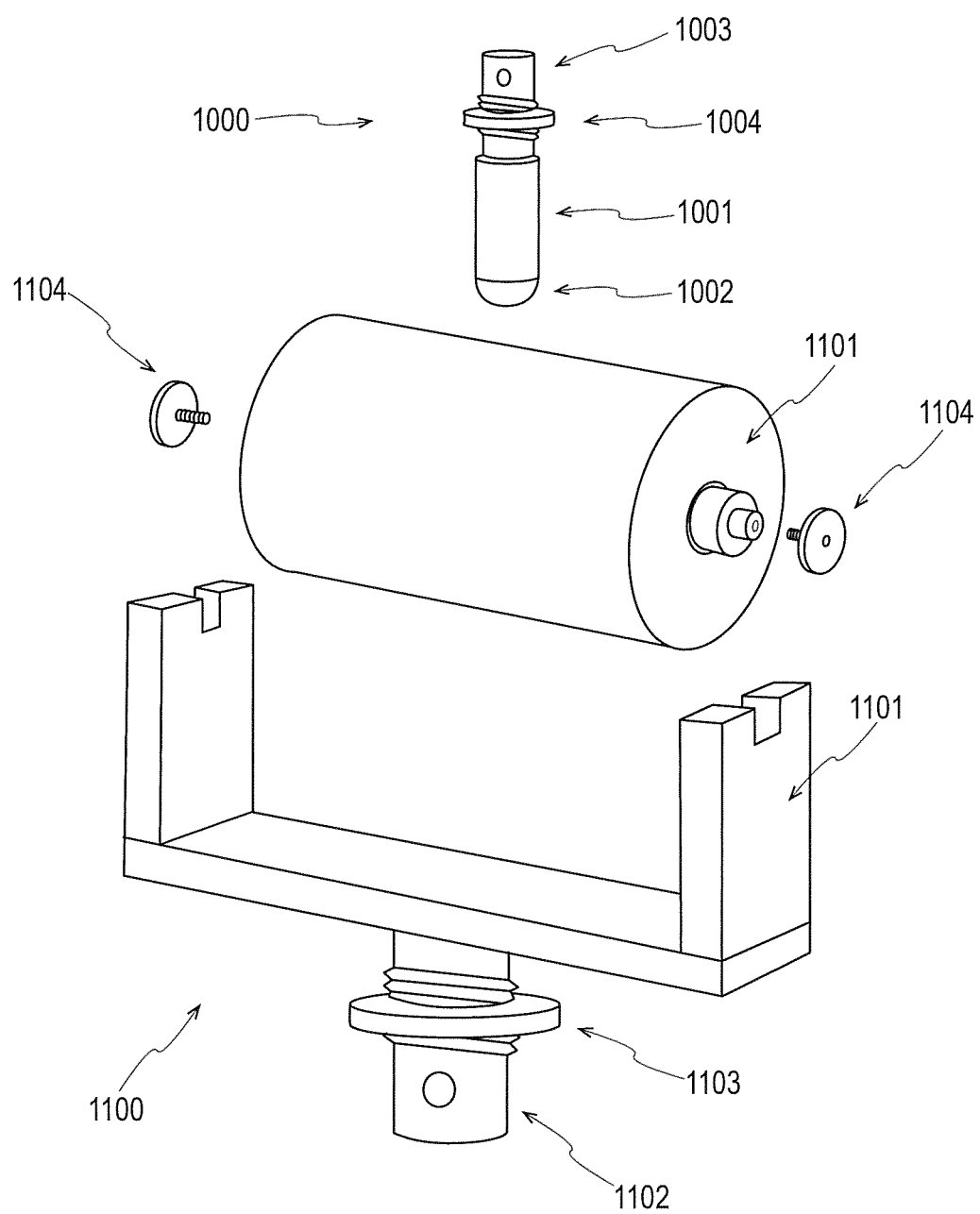
FIG. 33 is setup used in the Roll Firmness Test Method.
Figure 34A:
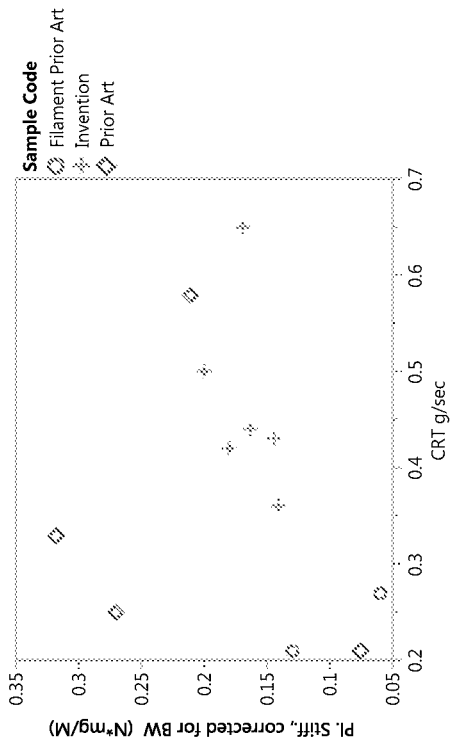
FIGS. 34A to 34P are plots of various properties for articles and/or fibrous structures of the present invention and prior art articles and/or fibrous structures.
Figure 34B:
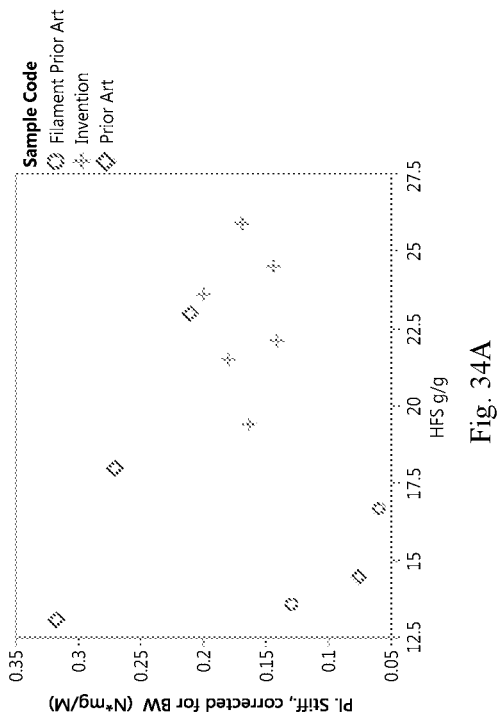
Figure 34C:
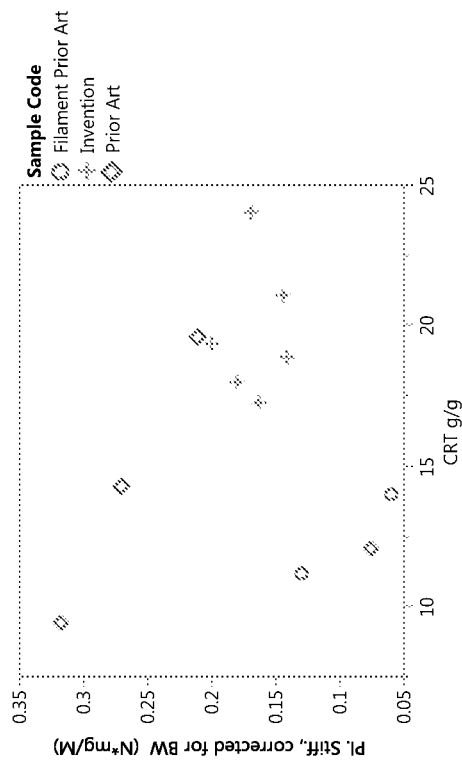
Figure 34D:
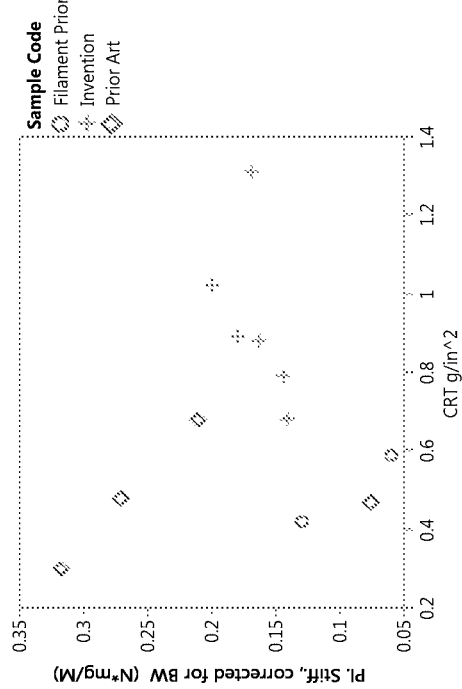

Referring to FIG. 33 below, the upper movable fixture 1000 consist of a cylindrical probe 1001 made of machined aluminum with a 19.00±0.05 mm diameter and a length of 38 mm. The end of the cylindrical probe 1002 is hemispheric (radius of 9.50±0.05 mm) with the opposing end 1003 machined to fit the crosshead of the tensile tester. The fixture includes a locking collar 1004 to stabilize the probe and maintain alignment orthogonal to the lower fixture. The lower stationary fixture 1100 is an aluminum fork with vertical prongs 1101 that supports a smooth aluminum sample shaft 1101 in a horizontal position perpendicular to the probe. The lower fixture has a vertical post 1102 machined to fit its base of the tensile tester and also uses a locking collar 1103 to stabilize the fixture orthogonal to the upper fixture.

The sample shaft 1101 has a diameter that is 85% to 95% of the inner diameter of the roll and longer than the width of the roll. The ends of sample shaft are secured on the vertical prongs with a screw cap 1104 to prevent rotation of the shaft during testing. The height of the vertical prongs 1101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Return the crosshead to the original gage length.

Remove all of the test rolls from their packaging and allow them to condition at about 23° C.±2C.° and about 50%±2% relative humidity for 2 hours prior to testing. Rolls with cores that are crushed, bent or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read at the data point closest to 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm.

Wet Web-Web CoF Test Method

This method measures wet coefficient of friction ("CoF") of a fibrous structure using a Thwing-Albert Vantage Materials Tester with a 5N load cell, along with a horizontal platform, pulley, and connecting wire (Thwing-Albert item #769-3000). The platform is horizontally level, 50.8 cm long, by 15.24 cm wide. The pulley is secured to the platform directly below the load cell in a position such that the connecting wire is vertically straight from its load cell connection point to its contact with the pulley, and horizontally level from the pulley to a Plexiglas sled. A sheet of abrasive cloth (utility cloth sheet, aluminum oxide P120) 7.62 cm wide by 15.24 cm long is adhered to the central region of testing platform (long side parallel to long dimension of platform).

The Plexiglas sled (2.9 cm in length, 2.54 cm in width, 1.0 cm in height, with a leading edge round curve (0.3 cm radius) extending from the bottom of the front of the sled with the radius extending from the center of a 0.08 cm diameter hole cut through the width of the sled at a point 0.3 cm from bottom of sled and 0.3 cm from leading edge of sled. The sled handle is connected through the 0.08 cm diameter hole drilled though the sled. A 0.08 cm diameter stainless steel wire is bent in a triangular shape for attaching the o-ring of the connecting wire to the sled. A 2.54 cm wide strip of abrasive cloth (utility cloth sheet, aluminum oxide P120) is adhered to the sled from the trailing edge of the bottom face, around the leading edge, to the trailing edge on the top face. The edges of the sled and the abrasive cloth should be flush. The complete sled apparatus (minus the extra weights, described below) should weigh 9.25 (+/−2) grams.

Other equipment and supplies include a weight: 200 g cylindrical shaped, 2.86 cm diameter and 3.81 cm tall; a calibrated adjustable pipette, capable of delivering between 0 to 1 milliliters of volume, accurate to 0.005 ml; deionized (DI) water; and a top loading balance with a minimum resolution of 0.001 g.

The wet web-to-web CoF, as described here, is measured by rubbing one stack of wet usable unit (uu) material against another stack of wet uu material, at a speed of 15.24 cm/min, over two intervals of distance of 1.27 cm each. The average of the two peak forces (one from each 1.27 cm interval) is divided by the normal force applied to obtain a wet web-to-web CoF reading.

Cut two or more strips from a usable unit (uu) of sample to be tested, 5.0-6.5 cm long in the MD, and 2.54 (+/−0.05) cm wide in the CD (all cut strips should be the exact same dimensions). Stack the strips on top one another, with the sample sides of interest facing outwards. The number of strips used in the stack depends on the uu basis weight, according to the following calculation (INT function rounds down to the nearest integer):

$$N_{strips} = INT(70/BW_{uu}) + 1$$

where: Nstrips=Number of uu strips in stack $BW_{uu}$=basis weight of usable unit in grams per square meter (gsm).

This stack is henceforth referred to as the "sled-stack". Cut another equal number of strips from one or more uus of test material, 7.5-10 cm long in the MD, and 4.5-6.5 cm wide in the CD (all cut strips should be the exact same dimensions). Stack these strips on top one another, with the sample sides of interest facing outward, and all edges aligned on top one another. This stack is referred to henceforth as the "base-stack".

Using the calibrated balance, measure the weight (to the nearest 0.001 g) of the sled-stack ($W_{sled-stack1}$), then the base-stack ($W_{base-stack}$). Place the "sled-stack" on the bottom (rounded) side of sled (i.e., the side with the abrasive surface), with one short-side end aligned with the trailing end of the sled. Place the "base stack" on the abrasive fabric adhered to the testing platform, with its long side parallel to the long-side of the abrasive fabric.

Add DI water in the amount of 4.0 times the dry mass of each stack. Use a calibrated pipette, and adjust to nearest 0.005 ml. Deliver the liquid one drop at a time, in such a way that the exposed stack surface receives an equal distribution of the total volume.

Gently wrap the wetted "sled stack" around the sled (through the wire sled handle), ensuring that the back edge of the stack is flush with the trailing edge of the sled, wrinkle-free, and not overly strained.

Next, gently place the sled (with stack attached) down on top of the wetted "base web" in a position such that the sled's trailing edge is between 1-1.5 cm from the back edge of the "base stack" (i.e., edge furthest from pulley).

After ensuring that the connecting wire is aligned properly in the pulley groove, attach the connecting-wire loop to the sled hook. The force reading on the instrument may show a little tension—20 grams or less.

Place 200 g weight on top of the sled, positioned such that the back edge of the weight is even with the back (trailing) edge of the sled.

Set the program to move the cross-head at a speed of 15.24 cm/min for a distance of 1.27 cm (Pull #1), collecting data at a rate of 25 data points/sec. After Pull #1, the cross-head pauses for 10 seconds, then restarts again at 1.27 cm/min for another 0.5 inches (Pull #2). The script captures the peak force from pull #1 and #2, calculates an average of the 2 peaks, and divides this value by the normal force applied (e.g., 200 g weight plus the ≈9 g sled weight). Repeat the measurement three more times. Reported value is the average of the four.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply sanitary tissue product comprising:
 a. a first ply comprising: a plurality of wood pulp fibers and a plurality of thermoplastic meltblown filaments selected from the group consisting of polyester thermoplastic meltblown filaments, nylon thermoplastic meltblown filaments, polyolefin thermoplastic meltblown filaments, biodegradable thermoplastic meltblown filaments, compostable thermoplastic meltblown filaments, and mixtures thereof, wherein the plurality of thermoplastic meltblown filaments exhibit a length of greater than or equal to 5.08 cm, wherein a first portion of the plurality of wood pulp fibers are in the form of a first wet laid fibrous structure and a second portion of the plurality of wood pulp fibers are commingled together with a portion of the thermoplastic meltblown filaments in the form of a coform fibrous structure; and
 b. a second ply comprising a second wet laid fibrous structure comprising a plurality of wood pulp fibers, wherein the portion of the thermoplastic meltblown filaments in the form of the coform fibrous structure of the first ply are spun from a die and directly laid on top of the second wet laid fibrous structure such that the multi-ply sanitary tissue product exhibits a Low Load Wet Resiliency of greater than 0.95 as measured according to the Wet and Dry Compressive Modulus Test Method and a Bending Modulus of less than 10.00 $(mg*cm \cdot g)/mils^3$ as measured according to the Flexural Rigidity and Bending Modulus Test Method.

2. The multi-ply sanitary tissue product according to claim 1 wherein the plurality of thermoplastic meltblown filaments comprises a polyolefin thermoplastic meltblown filaments.

3. The multi-ply sanitary tissue product according to claim 1 wherein the plurality of wood pulp fibers are selected from the group consisting of hardwood pulp fibers, softwood pulp fibers, and mixtures thereof.

4. The multi-ply sanitary tissue product according to claim 1 wherein at least one of the plurality of thermoplastic meltblown filaments is selected from the group consisting of biodegradable thermoplastic meltblown filaments, compostable thermoplastic meltblown filaments and mixtures thereof.

5. The multi-ply sanitary tissue product according to claim 1 wherein at least one of the plurality of thermoplastic meltblown filaments is selected from the group consisting of polylactic acid thermoplastic meltblown filaments, polyhydroxyalkanoate thermoplastic meltblown filaments, polyesteramide thermoplastic meltblown filaments, polycaprolactone thermoplastic meltblown filaments, and mixtures thereof.

6. The multi-ply sanitary tissue product according to claim 1 wherein at least one of the plurality of thermoplastic meltblown filaments is a polylactic acid thermoplastic meltblown filament.

7. The multi-ply sanitary tissue product according to claim 1 wherein at least one of the plurality of thermoplastic meltblown filaments is a polyhydroxyalkanoate thermoplastic meltblown filament.

8. The multi-ply sanitary tissue product according to claim 1 wherein the multi-ply sanitary tissue product further exhibits a TS7 of less than 17.0 dB $V^2$ rms as measured according to the Emtec Test Method.

9. A multi-ply sanitary tissue product comprising:
 a. a first ply comprising: a plurality of wood pulp fibers and a plurality of thermoplastic meltblown filaments selected from the group consisting of polyester thermoplastic meltblown filaments, nylon thermoplastic meltblown filaments, polyolefin thermoplastic meltblown filaments, biodegradable thermoplastic meltblown filaments, compostable thermoplastic meltblown filaments, and mixtures thereof, wherein the plurality of thermoplastic meltblown filaments exhibit a length of greater than or equal to 5.08 cm, wherein a first portion of the plurality of wood pulp fibers are in the form of a first wet laid fibrous structure and a second portion of the plurality of wood pulp fibers are commingled together with a portion of the thermoplastic meltblown filaments in the form of a coform fibrous structure; and
 b. a second ply comprising a second wet laid fibrous structure comprising a plurality of wood pulp fibers, wherein the portion of the thermoplastic meltblown filaments in the form of the coform fibrous structure of the first ply are spun from a die and directly laid on top of the second wet laid fibrous structure such that the multi-ply sanitary tissue product exhibits a Low Load Wet Resiliency of at least 0.95 as measured according to the Wet and Dry Compressive Modulus Test Methods and a TS7 of less than 17.0 dB $V^2$ rms as measured according to the Emtec Test Method.

10. The multi-ply sanitary tissue product according to claim 9 wherein the wood pulp fiber is selected from the group consisting of hardwood pulp fibers, softwood pulp fibers, and mixtures thereof.

11. The multi-ply sanitary tissue product according to claim 10 wherein the wood pulp fiber is a softwood pulp fiber.

12. The multi-ply sanitary tissue product according to claim 11 wherein the softwood pulp fiber is a southern softwood kraft pulp fiber.

* * * * *